United States Patent
Clark et al.

(10) Patent No.: US 12,436,729 B2
(45) Date of Patent: Oct. 7, 2025

(54) NEUROSTIMULATION SYSTEMS AND METHODS

(71) Applicant: BrainFM, Inc., Brooklyn, NY (US)

(72) Inventors: Daniel Clark, Brooklyn, NY (US); Kevin J. P. Woods, Brooklyn, NY (US)

(73) Assignee: BrainFM, Inc., Brooklyn, NY (US)

( * ) Notice: Subject to any disclaimer, the term of this patent is extended or adjusted under 35 U.S.C. 154(b) by 235 days.

(21) Appl. No.: 17/856,617

(22) Filed: Jul. 1, 2022

(65) Prior Publication Data

US 2023/0073174 A1    Mar. 9, 2023

Related U.S. Application Data

(63) Continuation-in-part of application No. 17/804,407, filed on May 27, 2022, and a continuation-in-part of
(Continued)

(51) Int. Cl.
  *G06F 3/16* (2006.01)
  *A61B 5/00* (2006.01)
  (Continued)

(52) U.S. Cl.
  CPC ............ *G06F 3/165* (2013.01); *G10L 25/06* (2013.01); *A61B 5/165* (2013.01); *A61B 5/486* (2013.01);
  (Continued)

(58) Field of Classification Search
  CPC ......... G06F 3/165; A61B 5/165; A61B 5/486; A61B 5/7415; G10H 20/30; G10H 2250/311; G10H 2240/085; G10H 2240/141; G10H 2220/371; G10H 2210/061; G10H 1/0025; G16H 50/50; G16H 40/63; G16H 20/70; A61M 21/00; A61M 21/02; A61M 2021/0016;
  (Continued)

(56) References Cited

U.S. PATENT DOCUMENTS 5,730,140 A * 3/1998 Fitch .................... A61B 5/0205
                                                    600/514
8,666,749 B1 * 3/2014 Subramanya ......... G06F 16/683
                                                    704/277
(Continued)

FOREIGN PATENT DOCUMENTS

WO    WO-2014096832 A1 *  6/2014  ........... G10H 1/0008

OTHER PUBLICATIONS

Non-Final Office Action issued in U.S. Appl. No. 17/505,453 mailed on May 4, 2023 (32 pages).

*Primary Examiner* — Carolyn R Edwards
*Assistant Examiner* — Kuassi A Ganmavo
(74) *Attorney, Agent, or Firm* — Akerman LLP

(57) ABSTRACT

The present application discloses and describes neurostimulation systems and methods that include, among other features, (i) neural stimulation through audio with dynamic modulation characteristics, (ii) audio content serving and creation based on modulation characteristics, (iii) extending audio tracks while avoiding audio discontinuities, and (iv) non-auditory neurostimulation and methods, including non-auditory neurostimulation for anesthesia recovery.

20 Claims, 23 Drawing Sheets

Related U.S. Application Data application No. 17/556,583, filed on Dec. 20, 2021, now Pat. No. 11,392,345, and a continuation-in-part of application No. 17/505,453, filed on Oct. 19, 2021, now Pat. No. 11,966,661, and a continuation-in-part of application No. 17/366,896, filed on Jul. 2, 2021, now Pat. No. 11,957,467.

(60) Provisional application No. 63/268,168, filed on Feb. 17, 2022.

(51) Int. Cl.
   *A61B 5/16* (2006.01)
   *A61M 21/00* (2006.01)
   *A61M 21/02* (2006.01)
   *G10L 25/06* (2013.01)
   *G10L 25/51* (2013.01)
   *G11B 27/031* (2006.01)
   *G16H 20/70* (2018.01)
   *G16H 40/63* (2018.01)
   *G16H 50/50* (2018.01)

(52) U.S. Cl.
   CPC ............ *A61B 5/7415* (2013.01); *A61M 21/00* (2013.01); *A61M 2021/0016* (2013.01); *A61M 21/02* (2013.01); *A61M 2230/005* (2013.01); *G10H 2210/061* (2013.01); *G10H 2220/371* (2013.01); *G10H 2240/085* (2013.01); *G10H 2240/141* (2013.01); *G10H 2250/135* (2013.01); *G10L 25/51* (2013.01); *G11B 27/031* (2013.01); *G16H 20/70* (2018.01); *G16H 40/63* (2018.01); *G16H 50/50* (2018.01); *H04R 2225/41* (2013.01)

(58) Field of Classification Search
   CPC .. A61M 2021/0027; A61M 2205/3317; A61M 2205/332; A61M 2205/3375; A61M 2230/005; H04R 2225/41; G11B 27/031; G10L 25/51; G10L 25/06
   See application file for complete search history.

(56) References Cited

U.S. PATENT DOCUMENTS

| | | | | |
|---|---|---|---|---|
| 2002/0181711 | A1* | 12/2002 | Logan | G11B 27/28 381/1 |
| 2003/0089218 | A1 | 5/2003 | Gang | |
| 2006/0065106 | A1* | 3/2006 | Pinxteren | G10L 25/48 84/615 |
| 2006/0080100 | A1* | 4/2006 | Pinxteren | G10L 25/48 704/E11.002 |
| 2007/0221044 | A1* | 9/2007 | Orr | G10H 1/0025 84/609 |
| 2007/0243515 | A1* | 10/2007 | Hufford | G09B 5/067 434/319 |
| 2007/0270667 | A1* | 11/2007 | Coppi | A61B 5/222 600/300 |
| 2007/0291958 | A1* | 12/2007 | Jehan | G10H 1/0025 381/103 |
| 2008/0097633 | A1 | 4/2008 | Jochelson | |
| 2011/0169603 | A1 | 7/2011 | Fithian | |
| 2013/0064379 | A1* | 3/2013 | Pardo | H04S 7/40 381/56 |
| 2014/0330848 | A1 | 11/2014 | Chen | |
| 2015/0133749 | A1* | 5/2015 | Janata | A61B 5/14542 600/300 |
| 2015/0356876 | A1 | 12/2015 | Wang | |
| 2016/0154880 | A1* | 6/2016 | Hoarty | H04N 21/236 707/770 |
| 2016/0247496 | A1* | 8/2016 | Pachet | G10H 1/36 |
| 2017/0043236 | A1 | 2/2017 | Li | |
| 2017/0124074 | A1 | 5/2017 | Cama | |
| 2019/0387998 | A1* | 12/2019 | Garten | A61M 21/00 |
| 2020/0213790 | A1 | 7/2020 | Osborne | |

* cited by examiner

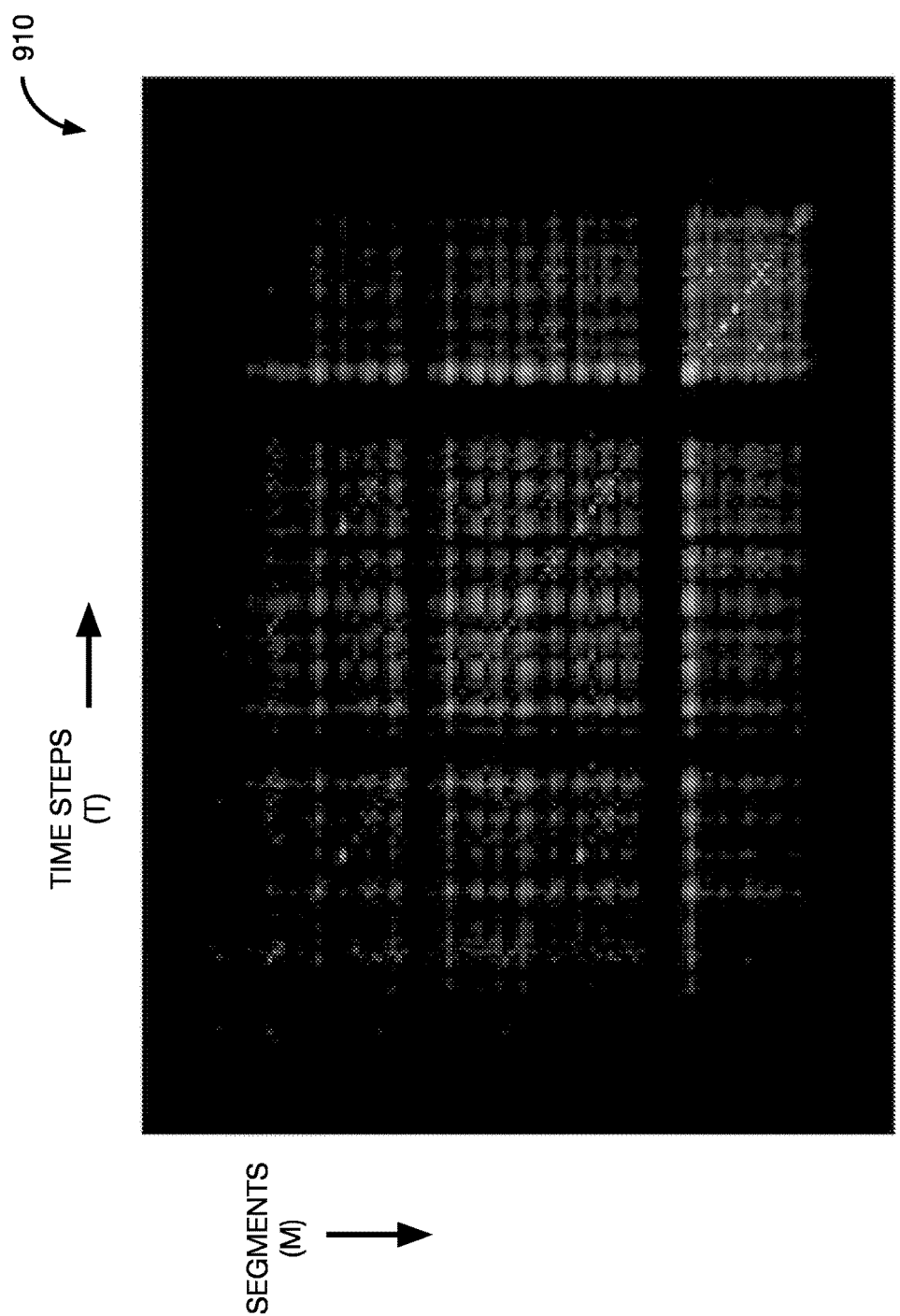

NEUROSTIMULATION SYSTEMS AND METHODS

CROSS-REFERENCE TO RELATED APPLICATIONS

This application is a continuation-in-part of: (i) U.S. application Ser. No. 17/366,896, titled "Neural Stimulation Through Audio With Dynamic Modulation Characteristics," filed on Jul. 2, 2021, and currently pending; (ii) U.S. application Ser. No. 17/505,453, titled "Audio Content Serving And Creation Based On Modulation Characteristics," filed on Oct. 19, 2021, and currently pending; (iii) U.S. application Ser. No. 17/556,583, titled "Extending Audio Tracks While Avoiding Audio Discontinuities," filed on Dec. 20, 2021, and currently pending; and (iv) U.S. application Ser. No. 17/804,407, titled "Neurostimulation And Methods For Anesthesia Recovery," filed May 27, 2022, and currently pending, which claims priority to U.S. Prov. App. 63/268,168 titled "Perioperative Functional Audio for Anxiety and Cognitive Recovery From Anesthesia," filed on Feb. 17, 2022, and currently pending. The entire contents of U.S. application Ser. Nos. 17/366,896; 17/505,453; 17/556,583; 17/804,407; and 63/268,168 are incorporated by reference herein.

This application also incorporates by reference the entire contents of: (i) U.S. application Ser. No. 11/251,051, titled "Method for incorporating brain wave entrainment into sound production," filed on Oct. 14, 2005, and issued on Mar. 9, 2010, as U.S. Pat. No. 7,674,224; (ii) U.S. application Ser. No. 15/857,065, titled "Method to increase quality of sleep with acoustic intervention," filed Dec. 28, 2017, and issued on May 19, 2020, as U.S. Pat. No. 10,653,857; and (iii) U.S. application Ser. No. 16/276,961, titled "Noninvasive neural stimulation through audio," filed Feb. 15, 2019, and issued on Dec. 21, 2021, as U.S. Pat. No. 11,205,414.

OVERVIEW

For decades, neuroscientists have observed wave-like activity in the brain called neural oscillations. Various aspects of these oscillations have been related to mental states including alertness, attention, relaxation, and sleep. The ability to effectively induce and modify such mental states by noninvasive brain stimulation through one or more modalities (e.g., audio and non-audio) is desirable.

The present disclosure relates to neurostimulation systems and methods that include, among other features, (i) neural stimulation through audio with dynamic modulation characteristics, (ii) audio content serving and creation based on modulation characteristics, (iii) extending audio tracks while avoiding audio discontinuities, and (iv) non-auditory neurostimulation and methods, including non-auditory neurostimulation methods for anesthesia recovery.

Accordingly, some aspects of the present disclosure relate to neural stimulation, particularly, noninvasive neural stimulation using audio and several features and techniques related thereto.

Further aspects of the present disclosure relate to neural stimulation, particularly, noninvasive neural stimulation using one or more of auditory and non-auditory sensory modalities such that multi-modal entrainment may be used to increase the benefit of neurological stimulation. Additionally, this disclosure also describes a novel use of sensory neuromodulation for recovery from anesthesia.

BRIEF DESCRIPTION OF THE DRAWINGS

Other objects and advantages of the present disclosure will become apparent to those skilled in the art upon reading the following detailed description of exemplary embodiments and appended claims, in conjunction with the accompanying drawings, in which like reference numerals have been used to designate like elements, and in which:

FIG. 9B depicts an illustrative self-similarity matrix, according to some embodiments of the present disclosure;

The figures are for purposes of illustrating example embodiments, but it is understood that the inventions are not limited to the arrangements and instrumentality shown in the drawings. In the figures, identical reference numbers identify at least generally similar elements.

DETAILED DESCRIPTION

Figure 1A:
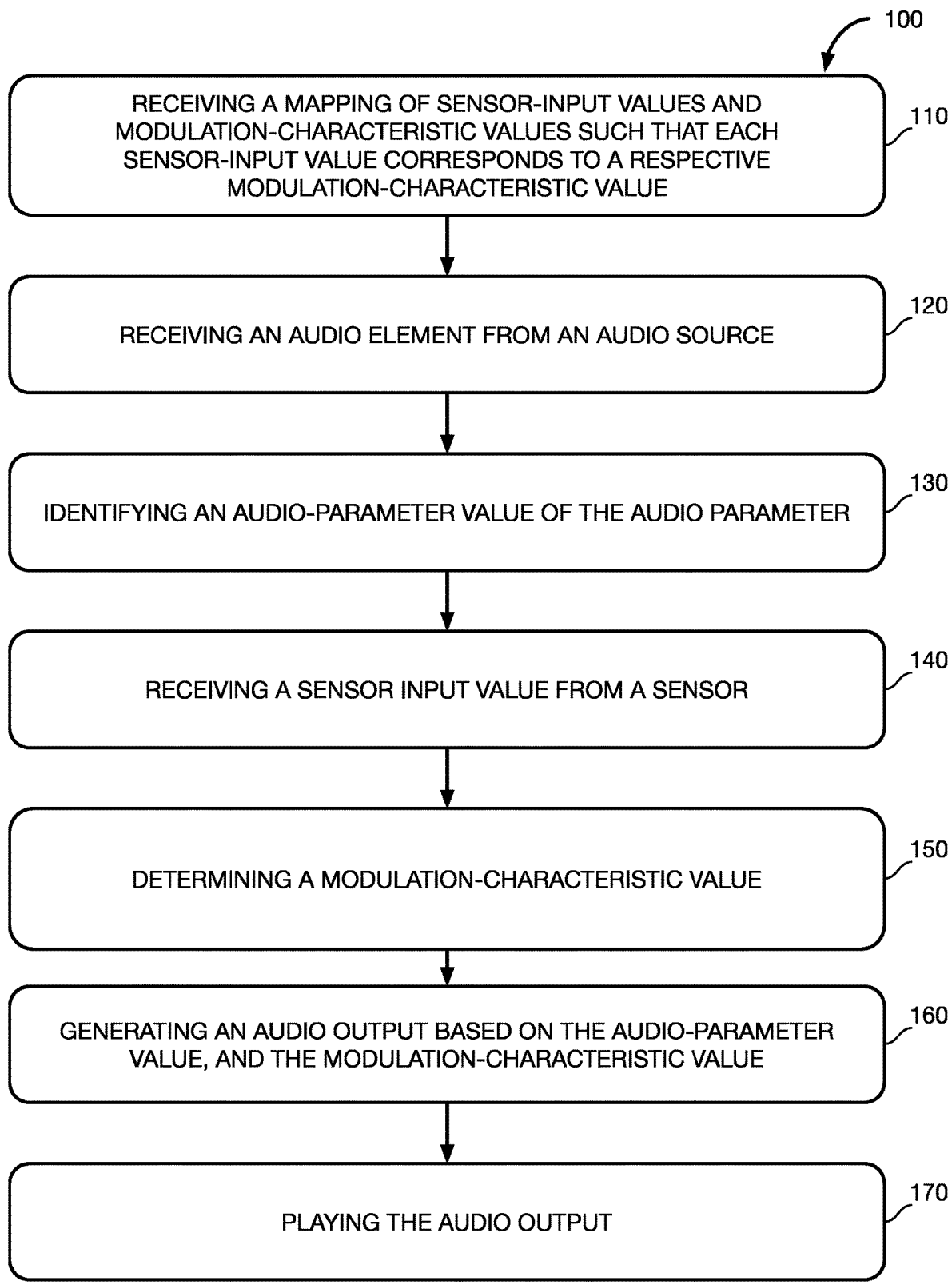
FIG. 1A depicts a flow diagram of an illustrative method according to an example embodiment of the present disclosure.

The present application discloses and describes neurostimulation systems and methods that include, among other features, (i) neural stimulation through audio with dynamic modulation characteristics, (ii) audio content serving and creation based on modulation characteristics, (iii) extending audio tracks while avoiding audio discontinuities, and (iv) non-auditory neurostimulation and methods, including non-auditory neurostimulation for anesthesia recovery. Although the disclosure is divided into different sections for ease of understanding, many features and functions disclosed and described in one section are equally applicable to features and functions disclosed and described in other sections. In operation, any feature(s) and/or function(s) of the systems and methods disclosed herein can be used in combination with any other feature(s) and/or function(s) of the systems and methods disclosed herein without limitation.

For example, any one or more features described with reference to neural stimulation through audio with dynamic modulation characteristics may be combined with any one or more features described with reference to audio content serving and creation based on modulation characteristics, extending audio tracks while avoiding audio discontinuities, and/or non-auditory neurostimulation and methods, including non-auditory neurostimulation for anesthesia recovery.

Similarly, any one or more features described with reference to audio content serving and creation based on modulation characteristics may be combined with any one or more features described with reference to neural stimulation through audio with dynamic modulation characteristics, extending audio tracks while avoiding audio discontinuities, and/or non-auditory neurostimulation and methods, including non-auditory neurostimulation for anesthesia recovery.

Further, any one or more features described with reference to extending audio tracks while avoiding audio discontinuities may be combined with any one or more features described with reference to neural stimulation through audio with dynamic modulation characteristics, audio content serving and creation based on modulation characteristics, and/or non-auditory neurostimulation and methods, including non-auditory neurostimulation for anesthesia recovery.

Finally, any one or more features described with reference to non-auditory neurostimulation and methods, including non-auditory neurostimulation for anesthesia recovery, may be combined with any one or more features described with reference to neural stimulation through audio with dynamic modulation characteristics, audio content serving and creation based on modulation characteristics, and/or extending audio tracks while avoiding audio discontinuities.

A. NEURAL STIMULATION THROUGH AUDIO WITH DYNAMIC MODULATION CHARACTERISTICS

Certain embodiments disclosed herein enable the modification of modulation characteristics of an audio source to effectively induce and modify brain stimuli to induce desirable mental states.

Some example embodiments include: receiving, by a processing device, a mapping of sensor-input values and modulation-characteristic values, wherein each sensor-input value maps to a respective modulation-characteristic value; receiving, by the processing device, an audio element from an audio source, wherein the audio element comprises at least one audio parameter; identifying, by the processing device, an audio-parameter value of the audio parameter; receiving, by the processing device, a sensor-input value from a sensor; determining, by the processing device, from the mapping of sensor-input values and modulation-characteristic values, a modulation-characteristic value that corresponds to the sensor-input value; generating, by the processing device, an audio output based on the audio-parameter value and the modulation-characteristic value; and playing, by the processing device, the audio output. In some cases, user-associated data can be received by the processing device in addition to the sensor-input value and the determining of the modulation-characteristic value can be based on either or both of sensor-input value or the user-associated data.

In various example embodiments, the modulation-characteristic value may correspond to a modulation characteristic comprising modulation rate, phase, depth, or waveform shape. In example embodiments, the audio source may comprise at least one of an audio signal, digital music file, musical instrument, or environmental sounds. In example embodiments, the audio parameter may comprise at least one of tempo, root mean square energy, loudness, event density, spectrum, temporal envelope, cepstrum, chromagram, flux, autocorrelation, amplitude modulation spectrum, spectral modulation spectrum, attack and decay, roughness, harmonicity, or sparseness.

In some example embodiments, the sensor-input value may correspond to a sensor type comprising at least one of an inertial sensor (e.g., accelerometer, gyrometer or gyroscope, and magnetometer), a microphone, a camera, or a physiological sensor. In example embodiments the physiological sensor may comprise one or more sensors that measure heart rate, blood pressure, body temperature, EEG, MEG, Near infrared (fNIRS), or bodily fluid. In some example embodiments, the receiving of the sensor-input may comprise receiving background noise from the microphone, inertial data from an accelerometer, images from a camera, etc. In some example embodiments, the sensor-input value may correspond to a measure of user activity on a device such as, for example, a smart phone, computer, tablet, or the like. In some example embodiments, the measure of user activity may be the number of, type of, or time applications are being interacted with on the device.

In some example embodiments, generating the mapping of sensor-input values and modulation-characteristic values can be based on a type of sensor and/or a modulation characteristic. In some example embodiments, the mapping of sensor-input values and modulation-characteristic values may be stored in a data table. In some embodiments, the audio output can be transmitted from the processing device to an external device for playback.

In some embodiments, a processing device comprising a processor and associated memory is disclosed. The processor can be configured to: receive, a mapping of sensor-input values and modulation-characteristic values, wherein each sensor-input value corresponds to a respective modulation-characteristic value, receive an audio element from an audio source, wherein the audio element comprises at least one audio parameter, identify an audio-parameter value of the audio parameter, receive a sensor-input value from a sensor, determine from the mapping of sensor-input values and modulation-characteristic values, a modulation-characteristic value that corresponds to the sensor-input value, generate an audio output based on the audio-parameter value and the modulation-characteristic value, and play the audio output.

The present disclosure describes systems, methods, apparatuses and computer executable media configured to vary the modulation characteristics of audio to affect neural activity. Modulation characteristics may include depth of modulation at a certain rate, the rate itself, modulation depth across all rates (i.e., the modulation spectrum), phase at a rate, among others. These modulation characteristics may be from the broadband signal or in sub-bands (e.g., frequency regions, such as bass vs. treble). Audio/audio element, as used herein, can refer to a single audio element (e.g. a single digital file), an audio feed (either analog or digital) from a received signal, or a live recording.

In various exemplary embodiments described herein, the presently disclosed techniques can be effective when audio stimulation is provided by predetermined frequencies, which are associated with known portions of the cochlea of the human ear and may be referenced in terms of the cochlea, or in terms of absolute frequency. Furthermore, the presently disclosed techniques may provide for a selection of modulation characteristics configured to target different patterns of brain activity. These aspects are subsequently described in detail.

In various exemplary embodiments described herein, audio can be modulated according to a stimulation protocol to affect patterns of neural activity in the brain to affect behavior and/or sentiment. Modulation can be added to audio (e.g., mixed) which can in turn be stored and retrieved for playback at a later time. Modulation can be added (e.g., mixed) to audio for immediate (e.g., real-time) playback. Modulated audio playback may be facilitated from a playback device (e.g., smart speaker, headphone, portable device, computer, etc.) and may be single or multi-channel audio. Users may facilitate the playback of the modulated audio through, for example, an interface on a processing device (e.g., smartphone, computer, etc.). These aspects are subsequently described in detail.

FIG. 1A illustrates an example method 100 performed by a processing device (e.g. smartphone, computer, etc.) according to an example embodiment of the present disclosure. The method 100 may include one or more operations, functions, or actions as illustrated in one or more of blocks 110-170. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

Method 100 can include a block 110 of receiving a mapping of sensor-input values and modulation-characteristic values such that each sensor-input value corresponds to a respective modulation-characteristic value. The mapping can be based on a predetermined or real-time computed map. Non-limiting examples of mappings include: a phone with an accelerometer that detects movement and reports an estimate of user productivity and mapping this productivity estimate to modulation depth such that the level of modulation increases if estimated productivity slows down; a mobile device with an accelerometer detects movements and reports user started a run (e.g. by using the CMMotionActivity object of Apple's iOS Core ML framework) which maps to a slight shift in the phase of modulation relative to the phase of the underlying music, at an increased run speed; and a microphone that detects background noise in a particular frequency band (e.g., HVAC noise concentrated in bass frequencies) which maps to increased modulation depth in that sub-band, for masking. In an example embodiment, the mapping can be based on a type of sensor and/or a modulation characteristic. Other examples exist. The mapping can be stored in a data table as shown in the example below in table 1 or stored as a function, such as, for example, $f(x)=x^2$ where x is the sensor-input value and $f(x)$ is the modulation characteristic value.

TABLE 1

| Sensor input values (High-frequency Heart Rate Variability (HF-HRV), ms) | Modulation-characteristic values (Desired final mixdown modulation depth, % normalized re.max) |
| --- | --- |
| 20 | 90 |
| 30 | 80 |
| 40 | 70 |
| 50 | 60 |
| 60 | 50 |
| 70 | 40 |
| 80 | 30 |
| 90 | 25 |
| 100 | 22 |
| 110 | 19 |
| 120 | 17 |
| 130 | 15 |
| 140 | 13 |
| 150 | 12 |
| 160 | 11 |
| 170 | 10 |
| 180 | 10 |
| 190 | 10 |
| 200 | 10 |

In an example embodiment, modulation rate, phase, depth, and waveform can be four non-exclusive modulation characteristics. Modulation rate can be the speed of the cyclic change in energy, and can be defined, for example, in hertz. Phase is the particular point in the full cycle of modulation, and can be measured, for example, as an angle in degrees or radians. Depth can indicate the degree of amplitude fluctuation in the audio signal. In amplitude modulation, depth can be expressed as a linear percent reduction in signal power or waveform envelope from peak-to-trough, or as the amount of energy at a given modulation rate. Waveform may express the shape of the modulation cycle, such as a sine wave, a triangle wave or some other custom wave. These modulation characteristics can be extracted from the broadband signal or from sub-bands after filtering in the audio-frequency domain (e.g., bass vs. treble), by taking measures of the signal power over time or by calculating a waveform envelope (e.g., the Hilbert envelope).

According to example embodiments, a stimulation protocol may provide one or more of a modulation rate, phase, depth and/or waveform for the modulation to be applied to audio data that can be used to induce neural stimulation or entrainment. Neural stimulation via such a stimulation protocol may be used in conjunction with a cochlear profile to induce different modes of stimulation in a user's brain.

At block 120, an audio element is received at the processing device from an audio source. The audio element can be, for example, a digital audio file retrieved by the processing device from local storage on the processing device or from remote storage on a connected device. In an example, the digital audio file is streamed to the processing device from a connected device such as a cloud server for an online music service (e.g., Spotify, Apple Music, etc.). In another example, the audio element may be received by the processing device from an audio input such as a microphone. The audio source can include, for example, an audio signal, digital music file, musical instrument, or environmental sounds. The audio element can be in the form of one or more audio elements read from a storage medium, such as, for example, an MP3 or WAV file, received as an analog signal, generated by a synthesizer or other signal generator, or recorded by one or more microphones or instrument transducers, etc. The audio elements may be embodied as a digital music file (.mp3, .wav, .flac, among others) representing sound pressure values, but could also be a data file read by other software which contains parameters or instructions for sound synthesis, rather than a representation of sound itself. The audio elements may be individual instruments in a musical composition, groups of instruments (bussed outputs), but could also be engineered objects such as frequency sub-bands (e.g., bass frequencies vs treble frequencies). The content of the audio elements may include music, but also non music such as environmental sounds (wind, water, cafe noise, and so on), or any sound signal such as a microphone input.

In an example embodiment, to achieve better brain stimulation, a wide spectrum of audio elements may be used. Accordingly, the audio elements may be selected such that they have a wide (i.e., broadband) spectral audio profile—in other words, the audio elements can be selected such that they include many frequency components. For example, the audio elements may be selected from music composed from many instruments with timbre that produces overtones across the entire range of human hearing (e.g., 20-20 kHz).

At block 130, an audio-parameter value of the audio parameter can be identified. The audio element may be characterized by one or more audio parameters. For example, audio parameters may include tempo; RMS (root mean square energy in signal); loudness (based on perceptual transform); event density (complexity/business); spectrum/spectral envelope/brightness; temporal envelope ('outline' of signal); cepstrum (spectrum of spectrum); chromagram (what pitches dominate); flux (change over time); autocorrelation (self-similarity as a function of lag); amplitude modulation spectrum (how is energy distributed over temporal modulation rates); spectral modulation spectrum (how is energy distributed over spectral modulation rates); attack and decay (rise/fall time of audio events); roughness (more spectral peaks close together is rougher; beating in the ear); harmonicity/inharmonicity (related to roughness but calculated differently); and/or zero crossings (sparseness). One or more of these may be performed, for example, as multi-timescale analysis of features (different window lengths); analysis of features over time (segment-by-segment); broadband or within frequency sub-bands (i.e. after filtering); and/or second order relationships (e.g., flux of cepstrum, autocorrelation of flux).

At block 140, a sensor-input value can be received from a sensor. The sensor can be on the processing device or it can be on an external device and data from the sensor can be transferred to the processing device. In one example, the sensor on a processing device, such as an accelerometer on a mobile phone, can be used to determine how often the phone is moved and can be a proxy for productivity. In another example, the sensor on an activity tracker (external device), for e.g. an Oura ring or Apple watch, can be used to detect if the user is awake or not, how much they are moving, etc.

In some embodiments, the sensors can be occasional-use sensors responsive to a user associated with the sensor. For example, a user's brain response to modulation depth can be measured via EEG during an onboarding procedure which may be done per use or at intervals such as once per week or month. In other embodiments, the sensors can be responsive to the user's environment. For example, characterizing the acoustic qualities of the playback transducer (headphones/speakers) or room using a microphone, electrical measurement, an audiogram, or readout of a device ID. The sensors can measure environmental factors that may be perceived by the user such as color, light level, sound, smell, taste, and/or tactile.

In some embodiments, behavioral/performance testing can be used to calibrate the sensors and/or to compute sensor-input values. For example, a short experiment for each individual to determine which depth is best via performance. Similarly, external information can be used to calibrate the sensors and/or to compute sensor-input values. For example, weather, time of day, elevation of the sun at user location, the user's daily cycle/circadian rhythm, and/or location. Calibration tests, such as measuring calibrating depth of modulation in the music to individual users' sound sensitivity based on a test with tones of increasing loudness can also be used to calibrate the sensors and/or to compute sensor-input values. Of course, each of these techniques can be used in combination or separately. A person of ordinary skill in the art would appreciate that these techniques are merely non-limiting examples, and other similar techniques can also be used for calibration of the sensors.

In example embodiments, the sensor-input value can be obtained from one or more sensors such as, for example, an accelerometer (e.g., phone on table registers typing, proxy for productivity); a galvanic skin response (e.g. skin conductance); video (user-facing: eye tracking, state sensing; outward-facing: environment identification, movement tracking); microphone (user-sensing: track typing as proxy for productivity, other self-produced movement; outward-sensing: environmental noise, masking); heart rate monitor (and heart rate variability); blood pressure monitor; body temperature monitor; EEG; MEG (or alternative magnetic-field-based sensing); near infrared (fnirs); or bodily fluid monitors (e.g., blood or saliva for glucose, cortisol, etc). The one or more sensors may include real-time computation. Non-limiting examples of a real-time sensor computation include: the accelerometer in a phone placed near a keyboard on table registering typing movements as a proxy for productivity; an accelerometer detects movements and reports user started a run (e.g. by using the CMMotionActivity object of Apple's iOS Core ML framework), and microphone detects background noise in a particular frequency band (e.g., HVAC noise concentrated in bass frequencies) and reports higher levels of distracting background noise.

In some embodiments, the received sensor-input value can be sampled at pre-defined time intervals, or upon events, such as the beginning of each track or the beginning of a user session or dynamically on short timescales/real-time: (e.g., monitoring physical activity, interaction with phone/computer, interaction with app, etc.).

In an example embodiment, block 140 can include receiving user-associated data in addition and/or alternatively to the previously described sensor-input value from the sensor (not shown). Alternatively, the block 140 can include receiving only the sensor-input value or user-associated data.

In example embodiments, user-associated data can include self-report data such as a direct report or a survey, e.g., ADHD self-report (ASRS survey or similar), autism self-report (AQ or ASSQ surveys or similar), sensitivity to sound (direct questions), genre preference (proxy for sensitivity tolerance), work habits re. music/noise (proxy for sensitivity tolerance), and/or history with a neuromodulation. Self-report data can include time-varying reports such as selecting one's level of relaxation once per minute, leading to dynamic modulation characteristics over time in response. User-associated data can include behavioral data/attributes such as user interests, a user's mental state, emotional state, etc. Such information can be obtained from various sources such as the user's social media profile. User-associated data can include factors external to but related to the user such as the weather at the user's location; the time after sunrise or before sunset at the user's location; the user's location; or whether the user is in a building, outdoors, or a stadium.

At block 150, a modulation-characteristic value can be determined. In one example, the modulation-characteristic value is selected from the mapping of sensor-input values and modulation-characteristic values that correspond to the sensor-input value. In another example, the modulation-characteristic value can be calculated by applying the sensor-input values to a mapping function (e.g. $f(x)=x^2$ where x is the sensor-input value and $f(x)$ is the modulation characteristic value).

At block 160, an audio output is generated based on the audio-parameter value and the modulation-characteristic value. The audio output can be generated by varying one or more of a modulation rate, phase, depth and/or waveform in real-time, at intervals, or upon events, such as the beginning of each track or the beginning of a user session. An example goal of the audio output is to achieve a desired modulation characteristic. Details of performing the block 160 are described subsequently in the discussion of responsive modulation determination module in FIG. 2.

At block 170, the modulated audio content is played back via one or more audio drivers of one or more playback devices, such as, for example, a smart speaker, a mobile device, a computer/laptop, an ipad, and the like. In one example, the processing device is the same device as the playback device, and the audio content is played via one or more audio drivers on the processing device itself. In another example, the processing device transmits the audio content (e.g., as a digital file over a data network) to a playback device for playback. In another example, the audio content is played back on the processing device as well as one or more other playback devices.

Figure 1B:
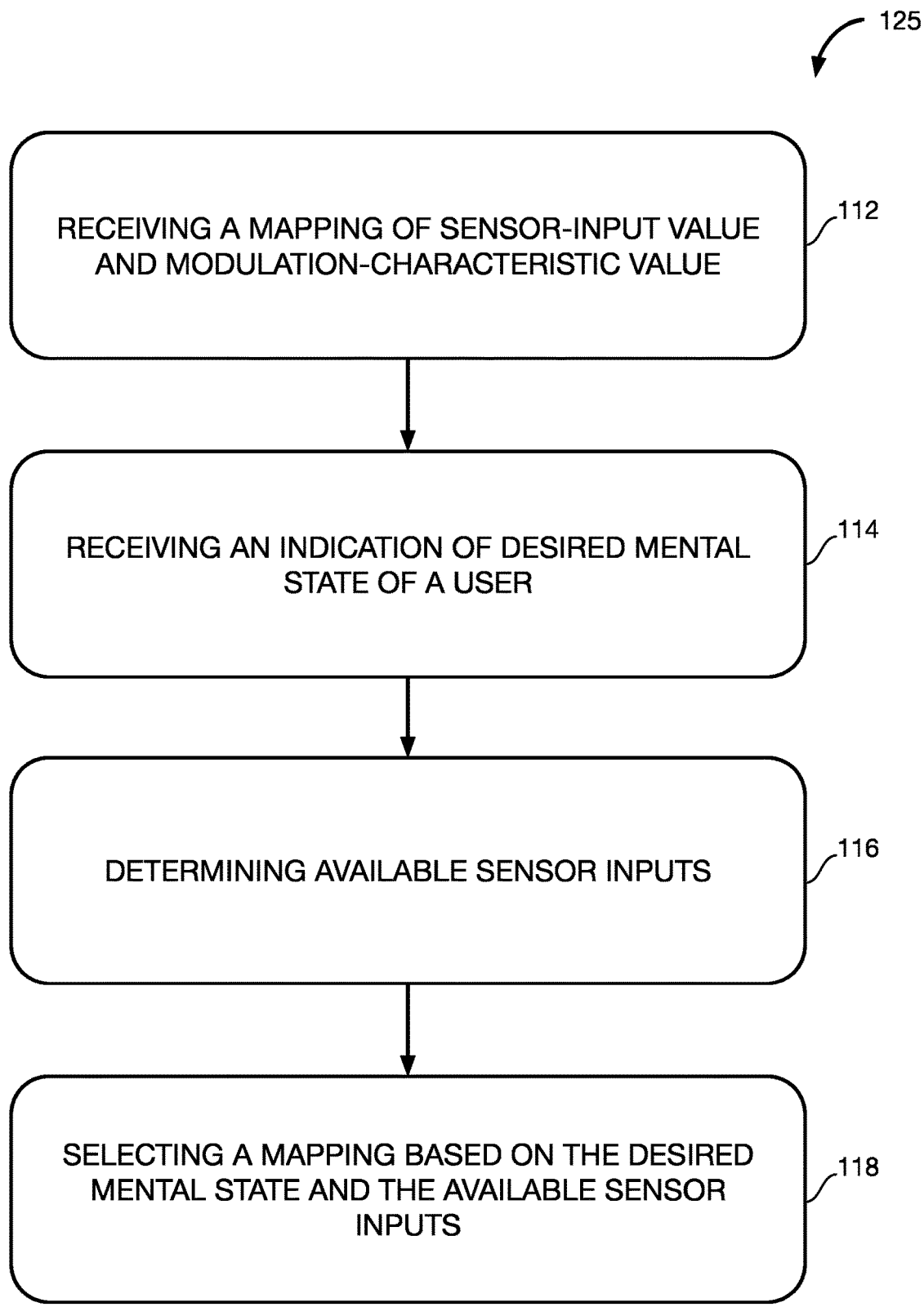
FIG. 1B depicts a flow diagram of an illustrative method according to an example embodiment of the present disclosure.

FIG. 1B illustrates an example method 125 performed by a processing device (e.g. smartphone, computer, etc.) according to an example embodiment of the present disclosure. Method 125 depicts generating a mapping of sensor-input values and modulation-characteristic values, as previously discussed in step 110 of FIG. 1A. According to example embodiments of the present disclosure, the method 125 can be performed by the same processing device that performs the method 100. Alternatively, method 125 can be performed by a different processing device (e.g. smartphone, computer, etc.). The method 125 may include one or more operations, functions, or actions as illustrated in one or more of blocks 112, 114, 116, and 118. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

Method 125 can include a block 112, where a mapping of sensor-input value and modulation-characteristic value can be received and/or generated. Aspects of such a mapping have been previously described with respect to step 110 of method 100.

At block 114 an indication of a desired mental state of a user is received. Non-limiting examples of a desired mental state can include focus, relax, sleep, and meditate. Each of these example desired mental states can be further distinguished by a target activity and duration. For example, focus can be distinguished by deep work, creative flow, study and read, and light work; relax can be distinguished by chill, recharge, destress, and unwind; sleep can be distinguished by deep sleep, guided sleep, sleep and wake, and wind down; and meditate can be distinguished by unguided and guided. The duration of the mental state may be specified, for example, by a time duration (e.g., minutes, hours, etc.), or a duration triggered by an event (e.g., waking, etc.). The indication may be received via a user interface on a processing device such as, for example, through an interface on the brain.fm™ application executing on an iPhone™ or Android™ device. Alternatively and/or additionally, the indication may be received over a network from a different processing device.

At block 116, available sensor inputs can be determined. Available sensor inputs can comprise one or more inputs previously described with respect to block 140 of method 100. At block 118, a mapping is selected based on the desired mental state and the available sensor inputs. In some examples, certain sensor inputs may be more applicable to certain desired mental states. For example, a sleep indication from an Oura ring may be more applicable to the sleep mental state than the focused mental state. In another example, an accelerometer on a mobile device may be more applicable to a focus state than a sleep mental state. A person of ordinary skill in the art would appreciate that the aforementioned examples are non-limiting examples, and many such other examples may exist.

In some examples, multiple sensor inputs may be available, and the processing device may select one (or multiple) sensor inputs to map to a modulation characteristic for a desired mental state. For example, a microphone, accelerometer, application monitor, and Oura ring may be a list of available sensor inputs. In one example, the processing device may determine that the microphone should be used with modulation depth for relax mental state, and the accelerometer should be used with modulation frequency for focus mental state. In another example, the processing device may determine that the accelerometer should be used with modulation frequency for meditation mental state and a sleep indicator from the Oura ring should be used with modulation depth for sleep mental state. In some examples, multiple sensors may be determined to be used with a particular modulation characteristic, and the determination of which sensor(s) to use may be determined dynamically based on the information (or lack of information) available from a sensor.

Figure 2:
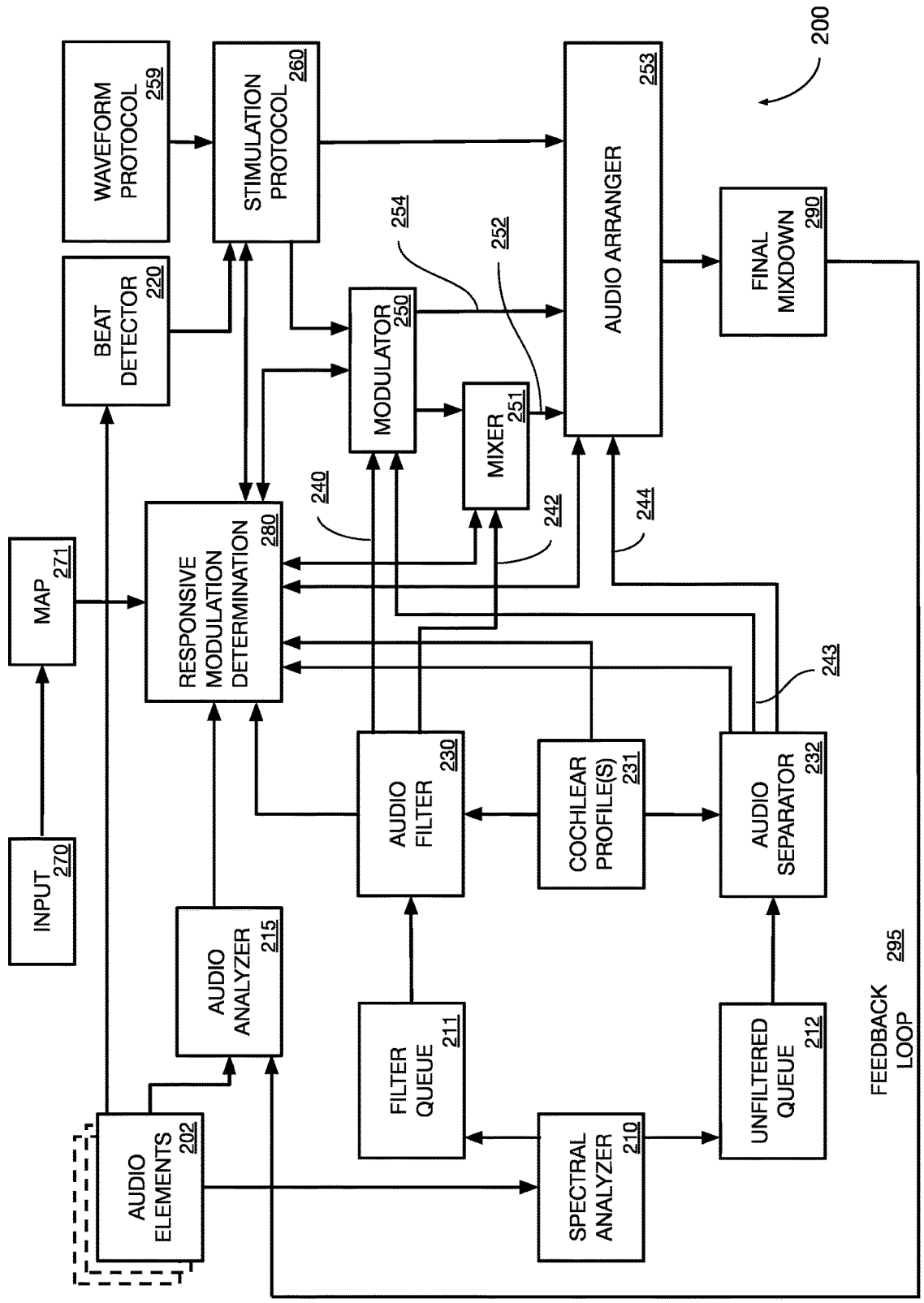
FIG. 2 depicts a process flowchart according to an example embodiment of the present disclosure.

FIG. 2 depicts an example process flowchart 200 to combine a modulation characteristic with audio content. Elements may be added or removed from process flow 200 without deviating from the inventive concepts of the present application.

In an example embodiment, one or more audio elements 202 can be provided to spectral analyzer module 210. Spectral analyzer module 210 can analyze the frequency components of the one or more audio elements 202. Spectral analysis, as used herein, may refer to sonographic representations and mathematical analysis of sound spectra, or by mathematically generated spectra. A spectral analyzer may use one or more of methods known to those skilled in the art, which methods include parametric or non-parametric; real-time or precomputed; assumption-based (e.g., 'frequency estimation' or a priori knowledge about tones, etc.) or non-assumption based (i.e., without any a priori knowledge); time-frequency analysis (representing how the signal changes over time); or spectral analysis (without time). Spectral range, spectral region, or sub-bands can refer to specific bands of frequencies within the spectra. As described in greater detail below, the spectral analyzer module 210 may be used to determine how the frequency components of the one or more audio elements 202 can be utilized to implement the non-invasive neural stimulation techniques of the present disclosure.

In an example embodiment, spectral analyzer module 210 analyzes the frequency components of each of the one or more audio elements 202. If it is determined that the one or more audio elements 202 are composed of a large variety of frequency components across the spectrum, the one or more audio elements 202 can be sent to the filter queue module 211, which is a queue for audio filter module 230. Because the stimulation protocol 260 may be applied to a specific frequency or a relatively narrow range of frequencies, the one or more audio elements 202 that contain a large variety of frequency components may undergo filtering in the audio filter module 230 to separate these large varieties of frequency components. For example, audio elements that contain audio from a plurality of instruments may contain audio data with frequency components that cross the audible frequency spectrum. Because the stimulation protocol 260 can only be applied to a subset of these frequencies, such audio elements are sent to audio filter module 230. In other words, the filtering of the audio filter module 230 selects a frequency range from an audio element for modulation. It will be understood by those skilled in the art, that filter queue module 211 and unfiltered queue 212 are optional, and audio components may alternatively be processed with, for example, immediate or parallel filtering, or separation.

In an example embodiment, if it is determined that one or more audio elements 202 has a single frequency component, or if most of the acoustic energy of the one or more audio elements is centered around a narrow band, then the one or more audio elements 202 are sent to unfiltered queue 212. In other words, if the one or more audio elements 202 are largely constrained to a sufficiently narrow frequency range, the stimulation protocol 260 may be applied to the entire one or more audio elements 202, and therefore, no further filtering would be required. Accordingly, the one or more audio elements 202 are sent to audio separator module 232. Audio separator module 232 looks at the spectral data of the one or more audio elements and pairs it with a cochlear profile to determine if the one or more audio elements should be modulated or not.

Additionally, spectral data may be sent from spectral analyzer module 210 to one or more of audio filter module 230 and audio separator module 232. This spectral data may be used, for example, in conjunction with cochlear profile 231, to determine which portions of the one or more audio elements 202 are to be modulated according to stimulation protocol 260.

In an example embodiment, both the audio filter module 230 and audio separator module 232 can be configured to filter audio elements for modulation (in the case of the audio filter module 230) or select audio elements for modulation (in the case of separator module 232) based upon one or more cochlear profiles 231. Cochlear profile 231 may provide instructions to the audio filter module 230 and/or audio separator module 232 based upon frequency ranges that correspond to regions of the cochlea of the human ear. According to an example embodiment, cochlear profile refers to a list of frequency bands to be modulated. Frequencies not included in the list of frequency bands of the cochlear profile can be excluded from modulation. The cochlear profile may apply to many users or be derived from measurements of an individual's hearing.

The frequency data obtained by filtering the one or more audio elements in the audio filter module 230 can be (i) sent to modulator 250 for modulation according to stimulation protocol 260 (line 240), or (ii) sent to mixer 251 without modulation (line 242) for recombination with the modulated components for inclusion in a final audio element.

In an example embodiment, audio filter module 230 may receive instructions from the cochlear profile 231 for each audio element being filtered. These instructions may indicate which frequency range within the one or more audio elements 202 are to be modulated; for example, the frequencies corresponding to the less sensitive portions of the human cochlea. In carrying out this operation, audio filter module 230 may use one or more bandpass filters (or high/low-pass filters) to extract the chosen frequency components for modulation 240. According to example embodiments, band stop filters, equalizers, or other audio processing elements known to those skilled in the art may be used in conjunction with or as an alternative to the band pass filter to separate the contents of filter queue module 211 into frequency components for modulation 240 and frequency components that will not receive modulation 242.

The audio content for modulation 240, 243 can be passed to modulator 250 after being filtered by audio filter 230 or separated out by audio separator 232 in accordance with cochlear profiles 231. The remainder of the frequency components 242, 244 can be passed directly (i.e., unmodulated) to the mixer 251 where modulated and unmodulated frequency components can be recombined to form a combined audio element 252. As explained further below, in some embodiments, the audio arranger 253 also mixes concurrent audio elements and thus functions as a mixer in such embodiments. Similarly, modulated elements 254 and unmodulated elements 244, 242 (via the mixer as shown in 252) can be passed separately into the audio arranger 253 which also acts as a mixer of concurrent audio. Audio arranger 253, described in detail subsequently, can directly receive the one or more audio elements that the system declined to filter or modulate. This process from the spectral analyzer module 210 through to the audio arranger 253 (where elements are recombined) can be done for each of the one or more audio elements in the filter and unfiltered queue modules (211 and 212, respectively).

Similarly, audio separator module 232 may receive instructions from the cochlear profile 231 selected for each of the one or more audio elements. Based upon the instructions provided by cochlear profile 231, audio separator module 232 may separate the audio elements contained in unfiltered queue 212 into audio elements to be modulated (line 243) and audio elements not to be modulated (line 244). Accordingly, audio output from the audio separator 232 can be (i) sent to modulator 250 (line 243); or (ii) sent to the audio arranger 253 without modulation (line 244) for recombination and inclusion in the final audio output.

In an example embodiment, modulator 250 may apply stimulation protocol 260 to the frequency components for modulation 240 and the audio elements to be modulated 243. The stimulation protocol 260 may specify the duration of the auditory stimulation, as well as the desired stimulation across that timeframe. To control the stimulation, the stimulation protocol 260 may continually instruct the modulator 250 as to the rate, depth, waveform, and phase of the modulations.

In an example embodiment, to ensure that the stimulation protocol 260 aligns with the rhythmic elements of the audio elements being modulated, the phases of the stimulation modulation and the rhythmic elements of the audio element may be aligned. For example, applying 2 Hz modulation to a 120 BPM MP3 file may not align with the rhythmic elements of the MP3 file if the phase of the stimulation modulation is not aligned with the MP3 file. For example, if the maxima of the stimulation modulation is not aligned with the drum beats in the MP3 file, the drum beats would interfere with the stimulation modulation, and the stimulation protocol may cause audio distortion even through the stimulation modulation is being applied with a frequency that matches the rate of a 2 BPM audio element.

Such distortion may be introduced because, for example, MP3 encoding may add silence to the beginning of the encoded audio file. Accordingly, the encoded music would start later than the beginning of the audio file. If the encoded music begins 250 milliseconds after the beginning of the encoded MP3 file, stimulation modulation that is applied at 2 Hz starting at the very beginning of the MP3 file can be 180° out of phase with the rhythmic components of the MP3 file. To synchronize the modulations to the beats in the file, the phase of the modulation can be shifted by 180°. If the phase of the modulation is adjusted by 180°, the modulation cycle can synchronize with the first beat of the encoded music.

In an example embodiment, to ensure that the stimulation modulation aligns with the rhythmic elements of the audio elements being modulated, the audio elements can be provided to a beat detector, an example of which is illustrated as beat detector module 220 of FIG. 2. Beat detection can be a process of analyzing audio to determine the presence of rhythms and their parameters, such that one can align the rhythms of one piece of audio with the rhythms of another. Accordingly, beat detector module 220 may detect rhythms in music or rhythmic auditory events in non-music audio. Beat detector module 220 may detect the phase (peak and trough locations) and rate of the rhythms. Rhythmic information may already be known about the one or more audio elements 202 through, for example, metadata included in (or associated with) the one or more audio elements 202. This rhythmic information may indicate the phase where the rhythm of the audio element begins (e.g., at a particular phase) or that the rhythmic element has a defined rhythm rate (e.g., defined in BPM of the audio element). Beat detector module 220 may be configured to read or interpret this data included in the one or more audio elements 202. Beat detector module 220 can define an audio element by a single tempo but may also track a changing beat over time.

According to example embodiments, the beat detector module 220 may be configured to analyze the content of the one or more audio elements to determine information such as the phase and BPM of audio elements 202. For example, according to an example, five musical pieces can be selected, and each musical piece can be represented as a WAV file, six minutes long. Beat detector module 220 may determine that each of the musical pieces has a BPM of 120. Beat detector module 220 may further determine that each musical piece starts immediately, and therefore, each musical piece has a starting phase of 0. According to other examples, beat detector module 220 may determine that each musical piece has a silent portion prior to the start of the musical piece, such as the 250-millisecond delay provided by some MP3 encoding. Beat detector module 220 may detect this delay and convert the time delay into a phase shift of the rhythmic elements of the music based upon the BPM of the musical piece. As illustrated in FIG. 2, the data determined by beat detector module 220 is provided to stimulation protocol 260. This data may be used to ensure that the modulation provided by the stimulation protocol aligns with the rhythmic elements of the audio elements being modulated.

In an example embodiment, stimulation protocol 260 can be based upon data provided by the beat detector module 220, and waveform protocol 259. Waveform protocol 259 can define the modulating waveshape and may be used to shape neural activity more precisely within each cycle, rather than just setting the rate (cycles per second). The waveform shape may be used to target specific patterns of brain activity or specific brain regions by specifying the waveform of the modulation pattern applied to the audio elements being modulated. Entrainment to sound by the brain may vary in strength, extent, and consequence, depending on the shape of the modulation driving the entrainment. Sine waveform modulation may be used if stimulation is intended to target a single frequency of neural oscillations, and more complex waveforms may be used to drive multiple frequencies of neural oscillations.

In an example embodiment, waveform protocol 259 may be configured to provide waveforms that target specific patterns of activity or areas of the brain. Since the waveform is shaped using the presently disclosed techniques, more complex activity patterns can be targeted or activity in specific regions of the brain can be altered. Neural oscillatory waveforms may differ dramatically depending on the region of the brain being measured; different regions of the brain exhibit different waveform shapes in their neural oscillations. Even if two brain regions are firing at the exact same rate, the purpose of the oscillation may be different, and the different purpose may be expressed through different waveforms. Matching the waveform of the stimulation to the brain region being targeted may enhance the effectiveness of neural stimulation and may enhance the targeting of specific brain regions. Similarly, the waveform shape can be tuned to elicit activity patterns (measured at one point or many across the brain) different from those elicited by a sine-modulated waveform at the same rate.

In an example embodiment, once a stimulation protocol 260 has been generated, the protocol that may take into account the output of one or more of beat detector module 220 and waveform protocol 259. The stimulation protocol 260 can be provided to modulator 250. The stimulation protocol 260 may specify the duration of the auditory stimulation, as well as the desired stimulation across that timeframe. To control the stimulation, the stimulation protocol 260 may continually instruct the modulator 250 as to the rate, depth, waveform and phase of the modulations. As described previously, the stimulation protocol 260 may instruct the modulator 250 based upon the output of beat detector module 220 to ensure the rates are multiples or factors of the BPM measured by rhythmic content in the audio elements 202. A modulation waveform may be specified in the waveform protocol 259 and used to effect neural oscillatory overtones and/or to target specific brain regions, which can be provided to the modulator 250 via stimulation protocol 260. Finally, modulation phase control of the modulator 250 may be provided by stimulation protocol 260 based upon the beat detector module 220 ensuring the phase of modulation matches the phase of rhythmic content in the one or more audio elements 202. Modulation depth control can be used to manipulate the intensity of the stimulation.

In an example embodiment, a response modulation determination module (RMD) 280 may determine what parameters to pass to various elements in the audio processing chain which may include a modulator 250, mixer 251, audio arranger 253, stimulation protocol 260, or other audio processing modules. The RMD 280 may control these parameters in a smooth coordinated manner, given input 270 transformed by mapping function 271 into a single-dimensional desired modulation characteristic (e.g., low-to-high modulation depth at a particular rate) which can vary over time. The goal of the RMD 280 is that the audio output after the final mixdown achieves the desired modulation characteristic over the range required by the input 270 via the map 271, as previously discussed with respect to block 160. The RMD 280 may calculate how to achieve this given the processed audio elements (or knowledge of these elements sufficient to estimate a solution), which are analogous to arrows 240-244 which go to the modulator, mixer, and arranger, but are also provided to the RMD to calculate the required path 380 of FIG. 3. Instead of exact copies of audio as passed by 240-244, summary information such as sub-band envelopes, or subsamples, may be passed instead.

The RMD 280 can have knowledge of and control over possible parameterizations of the stimulation protocol 260, modulator 250, mixer 251, and/or audio arranger 253 (together these parameters represent a high-dimensional input space to the RMD 280). The RMD 280 may define a path through the input space that results in a smooth increase in the output (the value of a particular modulation characteristic at the final mixdown), for example, by sampling two or more points in the input-output space and inferring the input points between them via interpolation or the like. Once the path through input space is defined by the RMD 280, its role is simply to transfer the values from the input 270 and map 271 to the modulator 250, mixer 251, and/or audio arranger 253. Those skilled in the art will see that there are alternate ways in which RMD 280 may optimize parameters using, for example, linear regression, machine learning, or a map.

The RMD 280 may find this optimal path under various constraints, which may be implemented as cost functions by a constraints checker (subsequently described with respect to FIG. 3). These may include reducing overall dissimilarity (other than modulation) between pre- and post-processed audio, having all audio elements contribute to the final mixdown in some form, reducing impact on other aspects of the music's beat patterns, preserving relationships between groups of audio elements, and other constraints which may affect the aesthetic or neural-effective value of the output, up to predefined tolerance levels. In an example embodiment, a constraints checker may impose a cost function on various aspects of the analyzed output from audio analyzer 215, which can be taken into consideration by the receiving module (maximum-finder or path-creator) in deciding whether an input-output pair is acceptable in the final path.

Constraints can be used to impose alternative goals for the output audio. For example, adding a cost for brightness (high-frequency energy which may be undesirable to the listener), may find parameter solutions that balance the desired modulation characteristic against that constraint, for example by mixing down a cymbal track even though it adds to modulation depth (thus reducing the maximum possible modulation depth for the song). The cochlear profile 231 used to separate and filter audio elements with respect to their frequency ranges can also be used by the RMD 280 as a constraint in this way, for example by penalizing output mixes with too much energy in particular frequency ranges. Thus, those skilled in the art will recognize that the RMD 280 as described may be useful not only for the responsive determination of modulation but also for any other characteristic or features of audio, for example, brightness.

Figure 3:
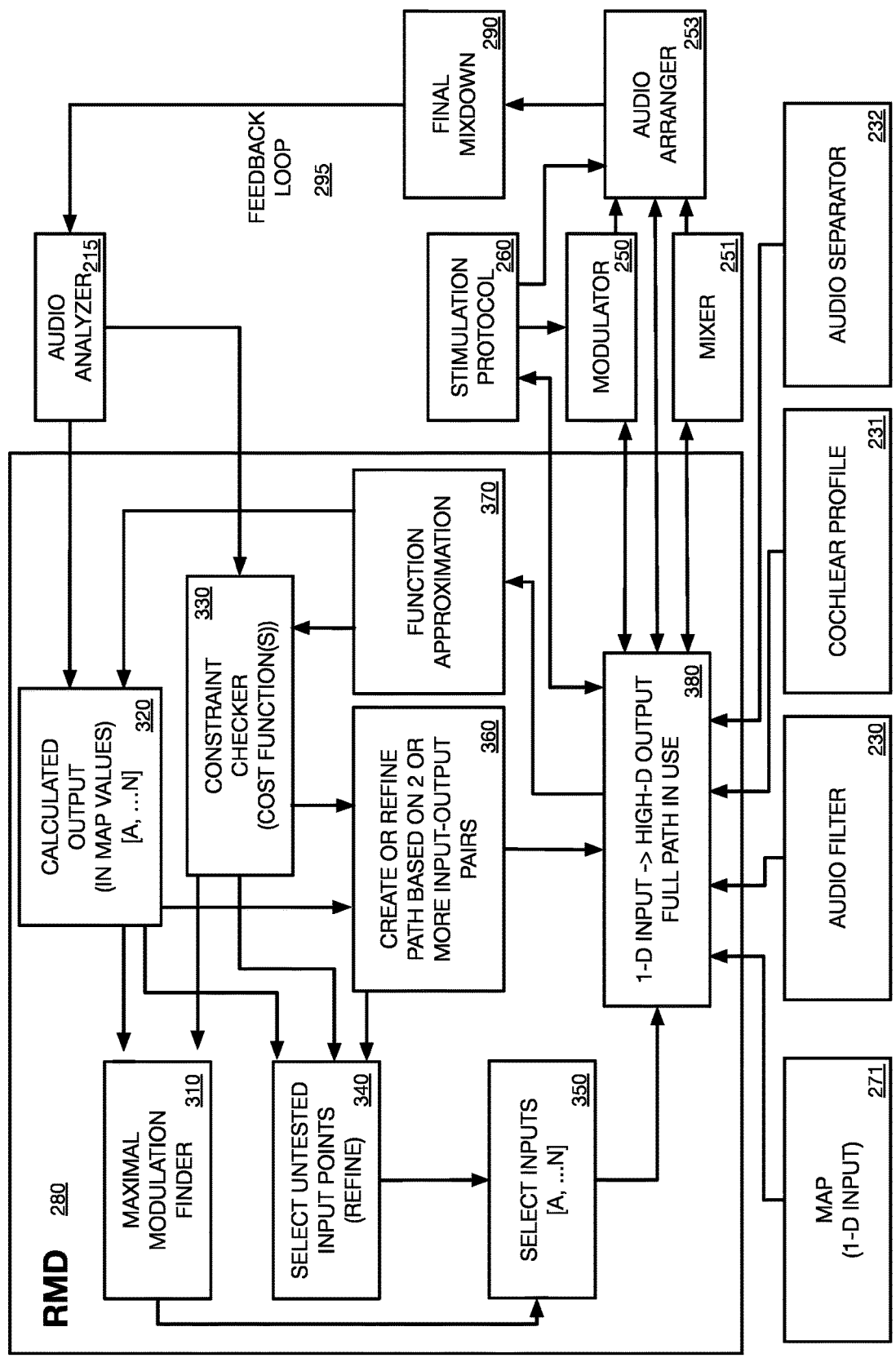
FIG. 3 depicts a process flowchart according to an example embodiment of the present disclosure.

FIG. 3 depicts an example process flowchart illustrating the interaction between the RMD 280 and the map 271, audio analyzer module 215, modulator 250, mixer 251, audio arranger 253, audio filter 230, cochlear profile 231, audio separator 232, and stimulation protocol 260. In various example embodiments, the RMD 280 may sample the input-output space by making use of the full processing chain with a feedback loop 295. The RMD 280 can contain a separate system to do similar computations. For example, samples of the audio element of at least 100 ms (capturing a 10 Hz cycle) or longer may be used. Alternatively, samples of up to 1 s (1000 ms) may be sufficient to achieve a good estimate of modulation characteristics.

In an example embodiment, analytic methods (function approximation 370) may be used to solve for the whole input-output space, instead of using the full processing chain to sample the space point-by-point. For example, since sound combines linearly and the modulating waveshapes are slow relative to the underlying audio signal, it can be efficient to model how the audio combines just at the modulated peaks and troughs, ignoring the majority of the modulating cycle and underlying audio. Alternatively, operating on subsamples of the audio signal can be an efficient way to estimate the input-output relationships that would result from the full processing chain. This may give the full input-output space at some resolution and the global maximum output could be selected (and corresponding inputs known). Analytic methods like this can be used to set the initial input to the RMD 280, or in lieu of the processing chain entirely (to establish the RMD 280 path without full audio processing or simulation).

The role of the RMD 280 can be to find a path of two or more points through the high-dimensional space of inputs to modulator 250 and/or mixer 251, that results in a smooth change in the desired modulation characteristics (depth, rate, spectrum, etc.) after the final mixdown 290, while satisfying constraints like reducing changes to the original audio outside of its modulation characteristics. This path (high-D to 1-D map) can be established by first establishing a putative maximum and minimum for the path, then interpolating between these points in input space (and/or extrapolating if needed). This path can also be defined by other means like sampling a large number of input space points or can be guided by human input for its initialization.

In an example embodiment, the RMD 280 may start by asking what is the heaviest amount of modulation that can be delivered under the constraints specified, which will include aesthetic constraints. This is a putative maximum output value, and maps to a specific point on the input space.

Finding this value can be the role of the maximal modulation finder 310. This can be done by any number of optimization methods such as coordinate or gradient descent, branch-and-bound methods, or others. Heuristic methods can also be used that include knowledge of the problem space, such as special rules (e.g., 'never turn down the bassiest element'). The maximal modulation finder can use knowledge of aesthetic tolerances (what sort of signal is unacceptable for the listener) which can come from models of psychophysical data or by testing listeners directly. The maximal modulation finder 310 may finally accept an input vector (i.e., a point in high-dimensional space) that produces the highest output modulation value balanced against constraints which might be imposed as a cost function on other features measured by audio analyzer 215 such as roughness, distortion, difference from original, or other constraints. This input is taken as point A and passed to the path-creator as a putative maximum, along with other input-output points, likely including a putative minimum.

In some embodiments, the putative minimum modulation level may in a simple case be defined as 'no added modulation' (input vector at $[0, \ldots, 0]$), or the minimum level might be defined by a point in the input space where the output modulation characteristic (e.g., energy at a particular modulation rate) is yet lower than the unprocessed case. For example, this could involve up-mixing audio elements with rates other than the target, such that the overall modulation spectrum has a dip at the target, and this input setting (controlling the mixer) is defined as the RMD minimum. Such a global minimum can be found with a similar constrained optimization process to that used to find the global maximum.

In an example embodiment, these putative max and min modulation levels defined by the RMD 280 may be defined as corresponding to the max and min values in the range of values taken by map 271, or as some subsection or supersection along that dimension. Then, output 'final mixdowns' with input-map values between these extremes can be obtained by setting the inputs to midway along the line connecting them in input space (interpolation). This can be a role of the path-creation module 360. More broadly the path-creation module may take two or more points in a high-dimensional input space (that have been accepted or refined as good input points to have along the path) and creates a one-dimensional path through the high-dimensional space via interpolation, extrapolation, or any other inference process. This may allow one-dimensional control of the high-dimensional inputs, which can then be smoothly varied over this range.

In some cases, a simple linear interpolation through the input space may not produce a smoothly-changing output modulation level, and so points along and nearby the interpolated line can be sampled to determine the smoothness of the output (measured modulation characteristics) after final mixdown, and the input-output path can be warped accordingly by the RMD 280 (this is depicted inside the RMD 280 in the 'Refine' process 340). This process of optimization along the path can involve finding best solutions through machine learning methods including gradient descent.

In an example embodiment, the RMD 280 may require knowledge of the stimulation protocol (the applied modulation), but there are aspects of the stimulation protocol that may be superseded by the RMD 280, since the input 270 (e.g., from sensors) may be used to dictate modulation characteristics usually imposed by the stimulation protocol, such as modulation depth or rate. In a sense the RMD 280 functions partly as an automatic responsive stimulation protocol module (in that it changes modulation characteristics over time). The RMD 280 and stimulation protocol 260 may both control the same parameter of modulator 250, for example the applied modulation depth sensor-input value received at input 270 may then be 'additional' to the underlying stimulation protocol. Or, since the stimulation protocol is part of the processing-feedback loop training the RMD 280, the RMD 280 may effectively negate the stimulation protocol and produce only the output required by map 271. In an example embodiment, the stimulation protocol 260 may be barred from controlling parameters controlled by the RMD.

In example embodiments, the input-output problem solved by the RMD 280 under constraints can be approached by any number of optimization methods (including those involving machine learning or adaptive algorithms). Two simple methods of exploring the input-output space and estimating global minima and maxima can be: Modulation determination by trial-and-error (random search), and modulation determination by an optimization algorithm.

With a trial-and-error method, the RMD 280 may for example start with the understanding that the values it gets from map 271 are exactly the values that should be passed to the modulator 250 and/or mixer 251, and/or audio arranger 253. After being processed through to the final mixdown 290, a feedback loop 295 can be used by the RMD 280 to detect that the final output is not as desired, but now it has two input-output reference points. From here, depending on these points, the system may extrapolate to infer further input-output points along that axis, or may decide to take a different direction, for example if the detriment to the original audio was too great (or some other constraint was violated). When an acceptable vector is found, extrapolation can continue up to the limit of constraints, thus defining the maximum value (heaviest modulation level to allow).

With the optimization algorithm, instead of starting with a random vector, the RMD 280 may find its single best estimate of a global maximum: what settings produce the heaviest acceptable modulation? This may be done by sampling the space widely and seeding a local search algorithm such as nearest-neighbor or gradient descent; machine learning methods can be used in aid of this optimization problem. These processes including trial-and-error method and optimization algorithm may be implemented in maximal modulation finder 310 and may use the whole processing chain to sample the space, and/or contain internal simulations or function approximations. Once a solution is found, interpolation through the input space from $[0, \ldots, 0]$ to this global maximum $[X, \ldots, Z]$ may map to the range of the modulation characteristic demanded by the sensor-input value, e.g., modulation depth 0-100%. In this case, the system may, for example, infer via linear interpolation that modulation depth of 50% is produced when the modulator and mixer inputs are set to $[X/2, \ldots, Z/2]$.

The RMD 280 may perform path-determination at various intervals, for example a single input-output path could apply for the entire duration of the original audio, essentially assuming any unsampled durations are similar to any sampled durations. Or, for example, operating in a continuous fashion and changing over time as the audio does. For recorded audio elements this might involve time-windowing and modifying the input-output function for each window. If working in real time such a system may require a buffering period of at least one modulation-window (100 ms-1 s or more) to determine how to change the inputs to the modulator 250 and/or mixer 251 to account for changes in the underlying audio elements. In a 'monitoring mode' audio analyzer module 215 may run through the feedback loop 295 continuously or at set intervals, and the RMD 280 may only update if there is a sufficient discrepancy between expected and observed levels of modulation (e.g., as a musical piece changes). In a resource-unlimited mode, the RMD 280 may treat each time-window separately and find the best parameters to solve for the desired output modulation in a continuous manner (second-by-second).

The modulator 250 may use a low-frequency oscillator, which contains ongoing rate, phase, depth, and waveform instruction. Low frequency oscillation (LFO) is a technique where an oscillator, that operates at a lower frequency than the signal being modulated, modulates the audio signal, thus causing a difference to be heard in the signal without the actual introduction of another audio source. An LFO is often used by electronic musicians to add vibrato or various effects to a melody. In this case it can be used to affect modulation characteristics, for example modulating the amplitude, frequency, stereo panning or filters according to the stimulation protocol 260 or control signals from the RMD 280.

The modulator 250 can be used to modulate frequency components 240 and unfiltered audio elements 243. Frequency components 240 may be modulated and then mixed with their counterpart unmodulated components 242 in mixer 251 to produce final filtered, modulated audio elements 252, which are then sent to the audio arranger 253. Audio elements 243, on the other hand, are modulated in full, so they need not be remixed, and are therefore sent directly to the audio arranger 253.

An audio arranger 253 can be a device or process that allows a user to define a number of audio components to fill an audio composition with music wherever the score has no implicit notes. Accordingly, in an example embodiment, an audio arranger 253 may arrange all audio content across the timeline of the stimulation protocol 260. As illustrated in FIG. 2, stimulation protocol 260 may send its timeframe to the audio arranger 253. In this embodiment, audio arranger 253 creates the final audio arrangement. The audio arranger 253 can be used to ensure that modulated content is always present and is always coupled with unmodulated content. Filtered, modulated audio elements 252 automatically contain modulated and unmodulated content, but the audio arranger 253 would still arrange them for maximum coverage across the timeline. Modulated audio elements 254 and unmodulated audio elements 244 may be arranged such that a modulated element is always paired with an unmodulated element, such that there are always at least two elements present throughout the timeline. Since the audio arranger 253 also mixes concurrent audio elements, it also functions as a mixer and in an example embodiment may be controlled by the RMD 280 as the modulator 250 and mixer 251 are, since its parameter settings affect the final output characteristics.

The audio arranger 253 may take component elements, then replicate and distribute them over arbitrarily long timescales. Input from the user (human 'composer') might include: Density of elements in time (i.e., spacing in time), density of concurrent elements (i.e., spacing not-in-time), spatialization (e.g., panning, virtual movement), variability introduced across the elements (e.g., automated changes in key, tempo, or other musical or acoustic features), and change-over-time of the above (e.g., user-defined trajectories over input space).

According to an example embodiment, elements may be placed by evaluating their musical or acoustic features, determining whether there will be conflicts, and avoiding conflicts. Elements that are well suited for arrangement may be determined based on relationships (e.g., temporal, or spectral). For example, elements that overlap in frequency and thus mask each other or interact on the cochlea, may be disallowed to co-occur in time.

Once arrangement is complete, the arranged audio element can be sent to the final mixdown 290 which may provide a final mixdown and encodes the full audio onto an electronic medium. Final mixdown may refer to the final output of a multi-track audio arrangement. A multitrack recording has more than one individual track, or more than one piece of audio layered on top of another, to be played simultaneously. The final output of multitrack audio can also be referred to as the mixdown. The mixdown can optionally be fed back to audio analyzer 215 to form a feedback loop 295 whereby RMD 280 can iteratively approach optimal modulation characteristics.

B. AUDIO CONTENT SERVING AND CREATION BASED ON MODULATION CHARACTERISTICS

Modulation in sound drives neural activity and can support mental states. Sounds that have similar modulation-domain representations may have similar effects on the brain. Analysis of modulation characteristics of pre-existing tracks can allow tracks to be selected to achieve desired mental states, with or without further modification of those tracks. In example embodiments, the present disclosure describes a personalization of audio content based on user-related characteristics and/or the determined effectiveness to a user of similar audio content to achieve a desired mental state.

In example embodiments, the present disclosure provides techniques for serving and creating audio for playback to induce a mental state based on what is effective/ineffective for a user. A measure of effectiveness is not limited to a binary measurement (i.e., effective or ineffective) but can be based on a scale of measurement (e.g. analog rating–X/5 stars, X level of effectiveness as judged by sensors, listening time, etc.).

In example embodiments, the effectiveness of audio in helping the user reach a desired mental state can be determined by user input. Additionally, or alternately, the effectiveness can be determined without an active input by the user. For example, whether an audio was effective to help the user sleep better (desired mental state) can be determined either directly (by asking the user) or indirectly using a smart device such as, for example, an Oura ring (e.g., sleep score, sleep parameters, etc.), an Apple watch (e.g., sleep parameters), a smartphone (e.g., was phone used during 'sleep time'), etc. In another example, a clinical or academic sleep study performed with participants who are not the user, may be used to determine the effectiveness of an audio to help the user sleep better. Other examples exist.

Another non-limiting example, whether an audio was effective to help the user stay focused can be determined either directly (by asking the user) or indirectly using a smart device such as a smart watch (e.g., did the user stay seated?), smart phone (e.g., did the user use their phone during focus time?), etc. In yet another non-limiting example, whether an audio was effective to help the user relax can be determined either directly (e.g., by asking the user) or indirectly using a smart device such as an Oura ring (e.g., was their resting heart rate lower than a threshold?), smart watch (e.g., did their heart rate and blood pressure decrease during a relaxing track?), etc.

In example embodiments, user preference regarding a type of audio can also be taken into consideration. The combination of preferred audio & effective modulation characteristics tailored to a desired mental state may provide a better desired response than an arbitrary audio with modulation characteristics. For example, a user's preferred music genre (e.g., Country, Jazz, Reggae, Pop, etc.) may be taken into consideration. Alternatively, or additionally, a user's artist preference (e.g., Willie Nelson, John Coltrane, Bob Marley, Kanye West, etc.) may be taken into consideration. Alternatively, or additionally, a user's preferred audio characteristic(s) (e.g., brightness, upbeat, dissonance, etc.) may also be used.

In example embodiments, amplitude modulation analysis can be performed by considering the frequency content of sound envelopes (i.e., the 'outline' of broadband or sub band waveforms). Amplitude modulation in sound can drive rhythmic activity in the brain, which may be leveraged to support mental states like focus, sleep, relaxation, meditation, physical exertion (e.g., exercise), and the like. Amplitude modulation analysis is distinct from frequency domain analysis in that the former describes slow rates of change (under 1 kHz) and involves the modulation of a carrier signal whereas the latter describes the sinusoidal components making up the signal itself. Other recommendation systems may not have awareness of modulation-domain analysis (which in the human auditory system involves a modulation-frequency filter bank in the brainstem, similar to the audio-frequency filter bank in the cochlea) and its effects on mental states, and so such recommendation systems may not use modulation-domain analysis and may not target mental states with amplitude modulation.

In example embodiments, modulation-frequency domain analysis (i.e., extraction of modulation characteristics) identifies properties of amplitude fluctuations at rates between 0 Hz-1000 Hz at any audio frequency, whereas audio-frequency analysis quantifies energy at frequencies across the range of human hearing, from 20 Hz-20 kHz.

In example embodiments, the following techniques can be used for extracting the modulation characteristics from audio: 1) Fast Fourier Transform (fft) of broadband or subband envelopes; 2) modulation domain bandpass filtering; and 3) visual filtering on spectrographic representation. Each of these techniques are described in detail subsequently.

Some example embodiments include: receiving, by a processing device, user-associated data related to a user; determining, by the processing device, one or more desired modulation characteristic values based on the user-associated data; obtaining, by the processing device, a set of one or more target audio tracks, wherein each target audio track represents at least one or more modulation characteristic values; comparing, by the processing device, the desired modulation characteristic values with the modulation characteristic values of at least one target audio track from the set of one or more target audio tracks; selecting, by the processing device, a target audio track from the at least one target audio track based on the comparing, wherein the modulation characteristic values of the target audio track substantially matches the desired modulation characteristic values; and playing, by the processing device, the target audio track.

In various example embodiments, the user-associated data can comprise self-reported user data and/or a target mental state of the user. The self-reported user data can include user information regarding sound sensitivity, age, ADHD and/or preferences for a target audio track and/or preferred audio characteristics. The target mental state can comprise focus, relax, sleep, exercise, and/or meditation. The user-associated data can comprise an audio content with an effectiveness measurement such that the effectiveness measurement indicates an effectiveness of the audio content for the user.

Some example embodiments can include determining, by the processing device, one or more modulation characteristic values of the audio content based on modulation synthesis parameters and/or modulation domain analysis. Other example embodiments can include modifying, by the processing device, the one or more modulation characteristic values of the audio content to match the desired modulation characteristic values based on the effectiveness measurement of the audio content. The modifying can include dynamically modifying modulation characteristics of the audio content.

Some example embodiments can further include selecting, by the processing device, a subsequent target audio track from the set of one or more target audio tracks based on the comparing such that the modulation characteristic values of a beginning portion of the subsequent target audio track aligns in a predetermined manner with an end portion of the target audio track; and chaining, by the processing device, the target audio track and the subsequent target audio track.

Some example embodiments include: receiving, by a processing device, a user's target mental state; receiving, by the processing device, a reference audio content with an effectiveness measurement that indicates an effectiveness of the reference audio content to achieve the target mental state for the user; determining one or more modulation characteristic values of the reference audio content and/or one or more additional audio parameter values of the reference audio content; obtaining, by the processing device, a set of one or more target audio tracks, wherein each target audio track includes one or more modulation characteristic values and one or more additional audio parameter values; comparing, by the processing device, for at least one target audio track from the set of one or more target audio tracks, the modulation characteristic values of the reference audio content with the modulation characteristic values of the at least one target audio track and the additional audio parameter values of the reference audio content with the additional audio parameter values of the at least one target audio track; and modifying, by the processing device, the at least one target audio track from the set of one or more target audio tracks based on the comparing such that the modulation characteristic values of the at least one target audio track substantially match the modulation characteristic values of the reference audio content and the audio parameter values of the at least one target audio track substantially match the additional audio parameter values of the reference audio content.

In some embodiments, a processing device comprising a processor and associated memory is disclosed. The processing device can be configured to: receive user-associated data related to a user; determine one or more desired modulation characteristic values based on the user-associated data; obtain a set of one or more target audio tracks, wherein each target audio track represents at least one or more modulation characteristic values; compare the desired modulation characteristic values with the modulation characteristic values of at least one target audio track from the set of one or more target audio tracks; select a target audio track from the at least one target audio track based on the comparing, wherein the modulation characteristic values of the target audio track substantially match the desired modulation characteristic values; and play the target audio track.

In some embodiments, a processing device can be configured to: receive a user's target mental state; receive an audio content with an effectiveness measurement that indicates an effectiveness of the audio content to achieve the target mental state for the user; determine one or more modulation characteristic values of the audio content and one or more additional audio parameter values of the audio content; obtain a set of one or more target audio tracks, wherein each target audio track includes one or more modulation characteristic values and one or more additional audio parameter values; compare, for at least one target audio track from the set of one or more target audio tracks, the modulation characteristic values of the reference audio content with the modulation characteristic values of the at least one target audio track and the additional audio parameter values of the reference audio content with the additional audio parameter values of the at least one target audio track; and modify the at least one target audio track from the set of one or more target audio tracks based on the comparing such that the modulation characteristic values of the at least one audio track substantially match the modulation characteristic values of the reference audio content and the audio parameter values of the at least one target audio track match the additional audio parameter values of the reference audio content.

The present disclosure additionally describes systems, methods, apparatuses and computer executable media for personalizing, for a user, a selection of one or more target audio tracks for playback. The personalizing can be based on one or more of the following aspects: a user-associated data (e.g., target mental state of a user, self-report data, behavioral data for a user, effectiveness ratings of audio tracks previously played by a user, sensor-input values for a sensor associated with a user, etc.), a reference audio track, and modulation characteristics of the one or more target audio tracks, whereby the modulation characteristics can be based on modulation synthesis parameters and/or modulation domain analysis of the one or more target audio tracks. The target audio tracks can be selected for a user based on their effectiveness towards a user's desired mental state based on their modulation characteristics, rather than mere aesthetic rating and/or music parameters (e.g., tonality, instrumentation, chords, timbre, etc.) as provided by known services.

In example embodiments, modulation characteristics may include depth of modulation at a certain rate, the rate itself, modulation depth across all rates (i.e., the modulation spectrum), phase at a rate, among others. These modulation characteristics may be from the broadband signal or in subbands (e.g., frequency regions, such as bass vs. treble). The subbands used may be based on cochlear subbands (i.e., the frequency decomposition employed at the human auditory periphery). Audio/audio track/audio content, as used herein, can refer to a single audio element (e.g., a single digital file), an audio feed (either analog or digital) from a received signal, or a live recording. As used herein, audio/audio track/audio content can be a temporal portion of an audio track/content (e.g., one or more snippets of an audio track/content), a spectral portion of an audio track/content (e.g., one or more frequency bands or instruments extracted from an audio track/content) or a complete audio track/content.

In the past, technologies have been targeted to the full range of audio frequencies perceptible to humans. The present disclosure describes technologies that may target specific subregions of that range. In various exemplary embodiments described herein, the modulation can be effective when applied at predetermined frequencies, which are associated with known portions of the cochlea of the human ear and may be referenced in terms of the cochlea, or in terms of absolute frequency. For example, predetermined frequencies can be associated with portions of the cochlea of the human ear that are more sensitive for neuromodulation. Additionally, predetermined frequencies can be associated with portions of the cochlea of the human ear that are perceived less sensitively such that the modulation is not distracting to a user. Note that these are specific regions within the full range of human hearing. Furthermore, the presently disclosed techniques may provide for a selection of modulation characteristics configured to target different patterns of brain activity. These aspects are subsequently described in detail.

In various exemplary embodiments described herein, audio can be modulated in order to affect patterns of neural activity in the brain to affect perception, cognition, action, and/or emotion. Modulation can be added to audio (e.g., mixed) which can in turn be stored and retrieved for playback at a later time. Modulation can be added to audio (e.g., mixed) for immediate (e.g., real-time) playback. Modulated audio playback may be facilitated from a playback device (e.g., smart speaker, headphone, portable device, computer, etc.) and may be single or multi-channel audio. Modulated audio playback may be facilitated through a playback device that transforms the audio into another sensory modality such as vibration or modulated light, rather than being an audible signal. Users may facilitate the playback of the modulated audio through, for example, an interface on a processing device (e.g., smartphone, computer, etc.). These aspects are subsequently described in detail.

Figure 4:
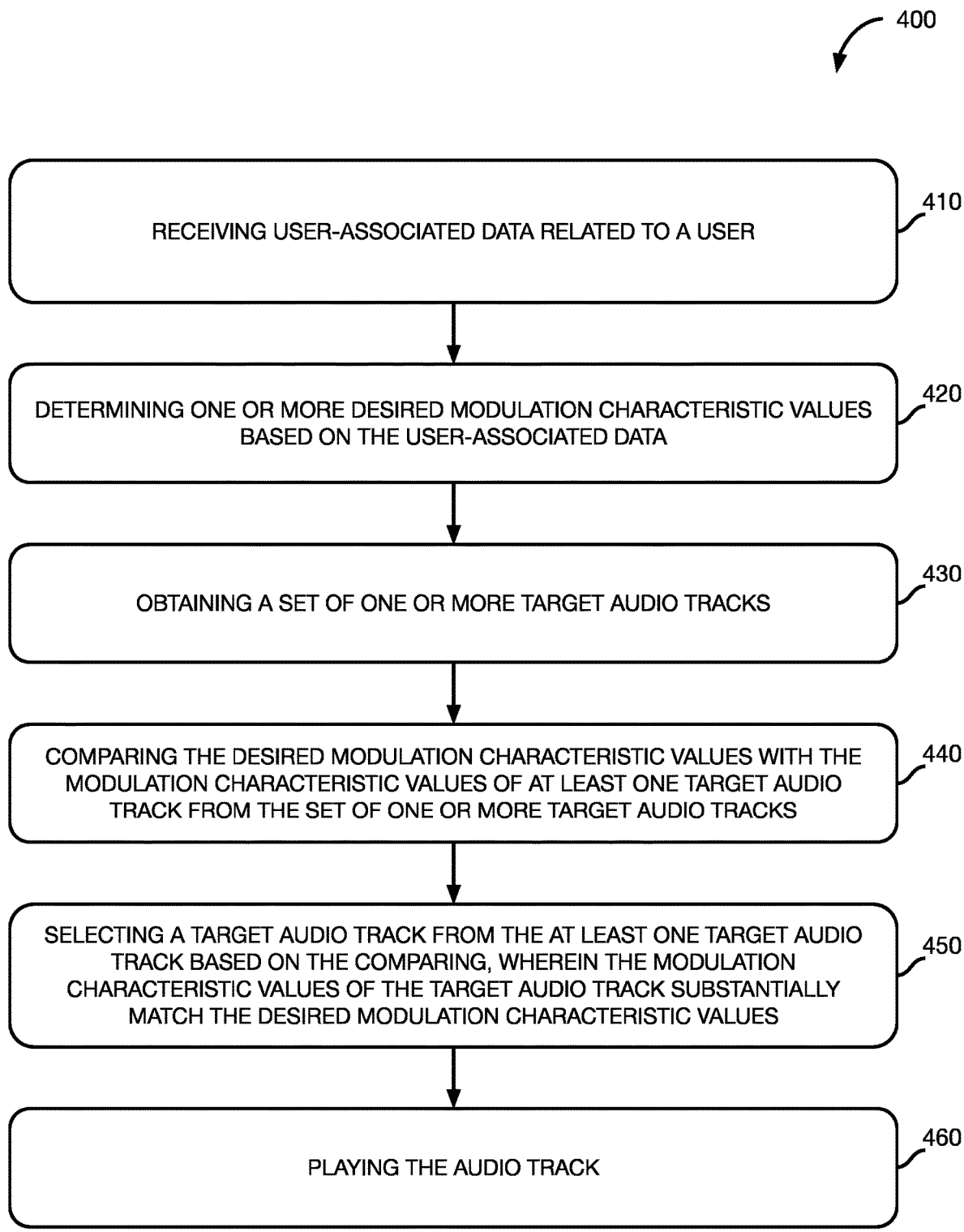
FIG. 4 depicts a flow diagram of an illustrative method according to an example embodiment of the present disclosure.

FIG. 4 illustrates an example method 400 performed by a processing device (e.g., smartphone, computer, smart speaker, etc.) according to an example embodiment of the present disclosure. The method 400 may include one or more operations, functions, or actions as illustrated in one or more of blocks 410-460. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

Method 400 can include a block 410 of receiving user-associated data. In example embodiments, user-associated data can comprise self-report data such as, for example, a direct report or a survey, e.g., ADHD self-report (e.g., ASRS survey or similar), autism self-report (e.g., AQ or ASSQ surveys or similar), sensitivity to sound (e.g., direct questions), genre preference (e.g., proxy for sensitivity tolerance), work habits re. music/noise (e.g., proxy for sensitivity tolerance), and/or history with a neuromodulation. Self-report data can also include time-varying reports such as selecting one's level of relaxation once per minute, leading to dynamic modulation characteristics over time in response. User-associated data can also comprise other user surveys such as, for example, onboarding questions (e.g., questions of users new to the presently disclosed system/methods etc.), personality questionnaires (e.g. questions related to personality of a user), etc.

In example embodiments, user-associated data can comprise effectiveness ratings of audio tracks previously played by a user. The effectiveness ratings can be based on explicit ratings provided by the user (e.g., the user provides a 5-star rating to a track, etc.) or implicit ratings (e.g., a user skipping the track repeatedly reflects a lower rating, a user repeatedly playing a track or submitting a track to the server reflects a higher rating, etc.).

In example embodiments, user-associated data can comprise behavioral data/attributes such as user interests, a user's mental state, emotional state, etc. User-associated data can include data about the user's current temporary condition (i.e., states) and/or the user's unchanging persistent conditions (i.e., traits). User-associated data can be obtained from various sources such as user input, the user's social media profile, etc. User-associated data can comprise factors external to, but related to, the user such as, for example, the weather at the user's location; the time after sunrise or before sunset at the user's location; the user's location; or whether the user is in a building, outdoors, or a stadium.

In example embodiments, user-associated data can comprise sensor-input values obtained from one or more sensors associated with the user. The sensors may include, for example, an inertial sensor such as an accelerometer (e.g., phone on table registers typing which may be used as a proxy for productivity); a galvanic skin response (e.g., skin conductance); a video or image camera (e.g., user-facing: eye tracking, state sensing; outward-facing: environment identification, movement tracking); and a microphone (e.g., user-sensing: track typing as proxy for productivity, other self-produced movement; outward-sensing: environmental noise, masking, etc.). The sensors may include a physiological sensor such as, for example, a heart rate monitor; a blood pressure monitor; a body temperature monitor; an EEG; a MEG (or alternative magnetic-field-based sensing); a near infrared sensor (fnirs); and/or bodily fluid monitors (e.g., blood or saliva for glucose, cortisol, etc.).

The sensors may include real-time computation. Non-limiting examples of a real-time sensor computation include: the accelerometer in a phone placed near a keyboard on a table registering typing movements as a proxy for productivity; an accelerometer detecting movements and reporting a user has started a run (e.g. by using the CMMotionActivity object of Apple's iOS Core ML framework), and microphone detecting background noise in a particular frequency band (e.g., HVAC noise concentrated in bass frequencies) and reporting higher levels of distracting background noise. In an example embodiment, where the audio content includes background noise, determining modulation characteristics (described subsequently) can be optional.

The sensors can be on the processing device and/or on an external device and data from the sensor can be transferred from the external device to the processing device. In one example, the sensor on a processing device, such as, for example, an accelerometer on a mobile phone, can be used to determine how often the phone is moved and can be a proxy for productivity. In another example, the sensor on an activity tracker (e.g., external device) such as, for example, an Oura ring or Apple watch, can be used to detect if the user is awake or not, how much they are moving, etc.

In some embodiments, the sensors can be occasional-use sensors used to calibrate the music to stable traits of the user or their environment. For example, a user's brain response to modulation depth can be measured via EEG during an onboarding procedure which may be done per use or at intervals such as once per week or month. In other embodiments, the sensors can be responsive to the user's environment. For example, characterizing the acoustic qualities of the playback transducer (e.g., for headphones/speakers) or the room using a microphone, electrical measurement, an audiogram, or readout of a device ID. The sensors can measure environmental factors that may be perceived by the user such as, for example, color, light level, sound, smell, taste, and/or tactile.

In some embodiments, behavioral/performance testing can be used to calibrate the sensors and/or to compute sensor-input values. For example, a short experiment for each individual to determine which modulation depth is best via their performance on a task. Similarly, external information can be used to calibrate the sensors and/or to compute sensor-input values. For example, weather, time of day, elevation of the sun at user location, the user's daily cycle/circadian rhythm, and/or location. Calibration tests, such as calibrating depth of modulation in the music to individual users' sound sensitivity based on a test with tones fluctuating in loudness can also be used to calibrate the sensors and/or to compute sensor-input values. Each of these techniques can be used in combination or separately. A person of ordinary skill in the art would appreciate that these techniques are merely non-limiting examples, and other similar techniques can also be used for calibration of the music based on sensors.

In some embodiments, the sensor-input value can be sampled at predetermined time intervals, or upon events, such as the beginning of each track or the beginning of a user session or dynamically on short timescales/real-time (e.g., monitoring physical activity, interaction with phone/computer, interaction with app, etc.).

In example embodiments, user associated data can include one or more of a target mental state for the user (e.g., sleep, focus, meditation, etc.), user-associated inputs (e.g., history of subjective reports, effectiveness ratings of previous tracks, onboarding questions, personality questionnaires, behavioral input, sensor input values, etc.), and modulation characteristics of one or more reference audio tracks.

At block 420, one or more desired modulation characteristics values can be determined based on the user-associated data. In example embodiments, modulation rate, phase, depth, and waveform can be four non-exclusive modulation characteristics. Modulation rate can be the speed of the cyclic change in energy, and can be defined, for example, in hertz. Modulation phase is the particular point in the full cycle of modulation, and can be measured, for example, as an angle in degrees or radians. Modulation depth can indicate the degree of amplitude fluctuation in the audio signal. In amplitude modulation, depth can be expressed as a linear percent reduction in signal power or waveform envelope from peak-to-trough, or as the amount of energy at a given modulation rate. Modulation waveform may express the shape of the modulation cycle, such as a sine wave, a triangle wave, or some other custom wave. These modulation characteristics can be extracted from the broadband signal or from subbands after filtering in the audio-frequency domain (e.g., bass vs. treble), by taking measures of the signal power over time, or by calculating a waveform envelope (e.g., the Hilbert envelope).

In example embodiments, modulation characteristic values in the audio can be determined using various techniques. Non limiting examples of such techniques can include Fast Fourier Transform (FFT) on the envelope (e.g., 'waveform outline') techniques, modulation domain bandpass filtering that provides phase and amplitude of modulation, visual filtering on spectrographic representation (e.g., use a spectrogram/cochleagram to run a 2D fourier transform, visual filter like convolution with a gabor patch, etc.), or other known techniques. The FFT and the bandpass filtering techniques can be based on subband envelopes. The visual filtering technique can get subbands via a spectrographic representation.

An example visual filtering of a spectrogram technique is described in: Singh N C, Theunissen F E. Modulation spectra of natural sounds and ethological theories of auditory processing. J Acoust Soc Am. 2003 December; 114 (6 Pt 1):3394-411. doi: 10.1121/1.1624067. PMID: 14714819. An example technique for FFT of subband envelopes is described in: Greenberg, S., & Kingsbury, B. E. (1997, April). The modulation spectrogram: In pursuit of an invariant representation of speech. In 1997 IEEE International Conference on Acoustics, Speech, and Signal Processing (Vol. 3, pp. 1647-1650). IEEE. An example technique for modulation filterbank method described in: Moritz, N., Anemüller, J., & Kollmeier, B. (2015). An auditory inspired amplitude modulation filter bank for robust feature extraction in automatic speech recognition. IEEE/ACM Transactions on Audio, Speech, and Language Processing, 23(11), 1926-1937. All of these publications are incorporated in their entirety by reference.

In example embodiments, to determine the desired modulation characteristics, a user may be asked after playing an audio track, "Did this track help you to focus?" and presented with a (e.g., thumbs-up and thumbs-down) selection to choose a response. The user can then be presented target audio content (as subsequently described with respect to blocks 440-460) that has similar modulation characteristics (i.e., to drive brain rhythms similarly) to tracks they rated (e.g., thumbs-up). Similarly, a user may be asked for access to their personal focus-music playlist (e.g., to be used as reference tracks), which can be analyzed to determine what modulation characteristics the user finds effective.

In example embodiments, to determine the desired modulation characteristics, a smart device may communicate with the processing device to provide an evaluation of the effectiveness of a reference track. In one example, one or more messages are transmitted between a first application running on the processing device to a second application (e.g., Oura, Apple Health, FitBit, etc.) on an external device (e.g., smart device such as a smart ring, watch, phone, etc.). The one or more messages may include, among other possibilities, a specific type of mental state and/or activity (e.g., sleep, focus, run, etc.) and a time interval (e.g., start/end time, absolute time, etc.) to make the evaluation. The external device may in turn send one or more messages to the processing device indicating a determined mental state and/or evaluation (e.g., based on information gathered during the time interval). In some embodiments, the first and second applications may be the same. In some embodiments, the external device can be the same as the processing device.

In example embodiments, a user model can be generated based on user-associated data that can include user-related input and the user's target mental state. For example, user-related input can be in the form of one or more of (1) information about the user (ADHD, age, listening preferences, etc.); (2) sensor data; and (3) reference tracks with explicit (e.g., stars) or implicit (e.g., provided to the system) rating. A user's mental state can be explicitly provided, inferred, or assumed by the system.

The user model can be defined over a set of modulation characteristics for a user's desired mental state. The user model can prescribe regions in the modulation-characteristic space that are most effective for a desired mental state. The user model may be a function defining predicted efficacy of music, in a high-dimensional space, with dimensions of modulation rate, modulation depth, audio brightness and audio complexity. The user model may be based on prior research that relates modulation characteristics to mental states. For example, if the user says they have ADHD and are of a particular age and gender, then the user model may incorporate this information to determine desired modulation characteristics for a particular target mental state of the user. The determination may, for example, be based on a stored table or function which is based on prior research about ADHD (e.g., users with ADHD require a relatively high modulation depth). Another non-limiting example for defining and/or modifying a user model can be based on reference tracks and ratings provided by a user. The reference tracks can be analyzed to determine their modulation characteristics. The determined modulation characteristics along with the ratings of those tracks can be used to define or modify the user model.

In example embodiments, the user model can be updated over time to reflect learning about the user. The user model can also incorporate an analysis of various audio tracks that have been rated (e.g., {for effectiveness {focus, energy, persistence, accuracy}, or satisfaction}, positively or negatively). The inputs to generate a user model can include ratings (e.g., scalar (X stars), binary (thumbs up/down)), audio characteristics (e.g., modulation characteristics, brightness, etc.) For example, a user known to have ADHD may initially have a user model indicating that the target audio should have higher modulation depth than that of an average target track. If a user subsequently provides a reference track with a positive indication, and it is determined that the reference track has a low modulation depth (e.g., 0.2 out of 1), then the target modulation depth may be updated in the user model (e.g., to an estimate that a low depth is optimal). If the user subsequently provides three more reference tracks with positive indications, and it is determined that the tracks have modulation depths of 0.8, 0.7, and 0.9, then the target modulation depth may be further updated in the user model (e.g., reverting to an estimate that a high depth is optimal). In this example, the user model represents estimated effectiveness as a function of modulation depths from 0-1.

In example embodiments, the user model can predict ratings over the modulation characteristic space. For example, if each input track is a point in high-dimensional space (e.g., feature values) each of which has been assigned a color from blue to red (e.g., corresponding to rating values); then the prediction of ratings may be determined by interpolating across known values (e.g., target input tracks) to estimate a heatmap representation of the entire space. In another example, regions of the space can be predicted to contain the highest rating values via linear regression (i.e., if the relationships are simple) or machine learning techniques (e.g., using classifiers, etc.).

In example embodiments, the user model can be distinctive both in terms of the features used (e.g., modulation features relevant to effects on the brain and performance, rather than just musical features relevant to aesthetics) and in terms of the ratings, which can be based on effectiveness to achieve a desired mental state such as, for example, productivity, focus, relaxation, etc. rather than just enjoyment.

In example embodiments, the user model can be treated like a single reference input track if the output to the comparison is a single point in the feature space (e.g., as a "target") to summarize the user model. This can be done by predicting the point in the feature space that should give the highest ratings and ignoring the rest of the feature space. In this case the process surrounding the user model may not change.

In certain embodiments, a user model may not be required. For example, if multiple reference tracks and ratings are provided as input, the processing device can forgo summarizing them as a model and instead work directly off this provided data. For example, each library track can be scored (e.g., predicted rating) based on its distance from the rated tracks (e.g., weighted by rating; being close to a poorly rated track is bad, etc). This can have a similar outcome as building a user model but does not explicitly require a user model.

In embodiments where only one reference track is used as input, it may be desirable to forgo a user model altogether, and directly compare the reference track to one or more target tracks. This is similar to a user model based only on the one reference track. If the reference track and the one or more target tracks are compared directly, they can be represented in the same dimensional space. Thus, the audio analysis applied to the reference track should result in an output representation that has the same dimensions as the audio analysis that is applied to the one or more target tracks.

At block 430, a set of one or more target audio tracks or a library of target audio tracks can be obtained. The target audio tracks can be, for example, digital audio files retrieved by the processing device from local storage on the processing device or from remote storage on a connected device. In an example, the target audio tracks can be streamed to the processing device from a connected device such as a cloud server for an online music service (e.g., Spotify, Apple Music, etc.). In another example, the target audio tracks may be received by the processing device from an audio input such as a microphone. The sources of the target audio tracks can include, for example, an audio signal, digital music file, musical instrument, or environmental sounds.

In example embodiments, the target audio tracks can be in digital form (e.g., MP3, AAC, WAV, etc.), received as an analog signal, generated by a synthesizer or other signal generator, or recorded by one or more microphones or instrument transducers, etc. The target audio tracks may be embodied as a digital music file (.mp3, .wav, .flac, among others) representing sound pressure values, but can also be a data file read by other software which contains parameters or instructions for sound synthesis, rather than a representation of sound itself. The target audio tracks may be individual instruments in a musical composition, groups of instruments (e.g., bussed outputs), but could also be engineered objects such as frequency subbands (e.g., bass frequencies vs treble frequencies). The content of the target audio tracks may include music, but also non-music such as environmental sounds (wind, water, cafe noise, and so on), or any sound signal such as a microphone input.

In example embodiments, to achieve better brain stimulation, target audio tracks may be selected such that they have a wide (i.e., broadband) spectral audio profile—in other words, the target audio tracks can be selected such that they include many frequency components. For example, the target audio tracks may be selected from music composed from many instruments with timbre that produces overtones across the entire range of human hearing (e.g., 20-20 kHz).

Each target audio track in the set of target audio tracks can include one or more modulation characteristics. Non-limiting examples of these modulation characteristics are modulation depth (i.e., energy/strength of modulation at a particular rate or rates), modulation rate (e.g., dominant modulation rate or rates; i.e., local or global maxima in the modulation spectrum), modulation spectrum (i.e., energy at each modulation rate over a range of rates), joint acoustic and modulation frequency (e.g., modulation rates/spectrum in audio frequency sub bands; e.g., modulation spectrum in the bass region vs. treble region), modulation phase relationships across audio frequency bands, spectro-temporal modulation, metadata such as creator tags and/or labelling indicating any of the above even if not measured directly (e.g., metadata can be added to the audio track at the time of creation from parameters used to make the music, etc.), statistical descriptions of the above; first moment and higher-order moments (e.g., mean, variance, skewness, kurtosis, etc. of X), time-varying trajectories of the above (i.e., X over time), derivatives of the above; first order and higher order (instantaneous change, acceleration, etc. of X); etc.

At block 440, the desired modulation characteristic values can be compared with the modulation characteristic values of at least one target audio track from the set of target audio tracks. Various techniques can be used for the comparison. In example embodiments, the processing device can take as input either one or more target audio tracks from the set of target audio tracks to compare against the desired modulation characteristic values. If there are many rated reference audio tracks, each reference audio track's rating value and location in feature space can be considered to define regions in the feature space that are expected to have high ratings (i.e., a user model). This can be framed as a classification problem and can be tackled with any number of methods such as, for example, cluster analysis, decision trees, and/or neural networks.

For example, the difference of 2D modulation spectra (e.g., audio frequency and modulation frequency) between the desired spectrum (as determined by the user model or reference track(s)) and a given target track can be determined by subtraction or by division (% value). Similarly, the difference of 1D modulation spectra (e.g., energy at each modulation frequency across all audio frequencies) can also be determined by subtraction or by division (% value). For example, a 1D modulation spectrum desired by the user model may have normalized power values of 1, 1, 5, 6, 1 at modulation rates of 2 Hz, 4 Hz, 8 Hz, 16 Hz, and 32 Hz, respectively. The 1D modulation spectrum of a first audio track may have normalized power values of 1, 1, 6, 6, 1, at modulation rates of 2 Hz, 4 Hz, 8 Hz, 16 Hz, and 32 Hz, respectively. The 1D modulation spectrum of a second audio track may have normalized power values 2, 3, 6, 10, 1 at modulation rates of 2 Hz, 4 Hz, 8 Hz, 16 Hz, and 32 Hz, respectively. In this example the first audio track, rather than the second audio track, is more similar to the desired spectrum, since the difference of normalized power values is smaller (e.g., 0, 0, 1, 0, 0 versus 1, 2, 1, 4, 0). Similarity in time-averaged properties, versus similarity over time (i.e., average vs. trajectories) can also be used for the comparison.

At block 450, a target audio track can be selected from the set of at least one target audio tracks based on the comparing, wherein the modulation characteristic values of the target audio track best match the desired modulation characteristic values. If the comparing is defined as a function over the space, this may be done by selecting the target audio track with the highest predicted efficacy under a user model (if used). If the model is defined by a single 'best' point or region in the space rather than a function, then determining the best match can be done by finding the closest track (euclidean distance in multiple dimensions). For example, if the model dimensions are modulation depth at 4 Hz and modulation depth at 12 Hz, and if the desired (highest predicted efficacy) under the user model is at a depth of 3 and 7 for 4 Hz and 12 Hz respectively, then an audio track with depths of 4 and 8 at 4 Hz and 12 Hz respectively, would have a calculated euclidean distance from the target of sqrt((7−3)^2+(8−4)^2)=5.67. This value would be compared against the distance value from other tracks to select the closest target track to the desired modulation characteristic value(s).

In some embodiments, the target audio track may be modified as subsequently described in block 660. For example, if the user provides input that they have ADHD, then the user model may indicate that the target audio track should have a spectral slope (treble-bass balance) of 0.6. If, however, the library of target audio tracks contains only audio tracks with spectral slope between 0.1-0.4, then the target audio track with the highest slope (closest to 0.6) may be selected, and further modified to have spectral slope of 0.6. The modification may be done, for example, by low pass filtering.

At block 460, the selected target audio track can be played via one or more audio drivers of one or more playback devices, such as, for example, a smart speaker, a mobile device, a computer/laptop, an ipad, and the like. In one example, the processing device is the same device as the playback device, and the target audio track can be played via audio drivers on the processing device itself. In another example, the processing device can transmit the target audio track (e.g., as a digital file over a data network) to a playback device for playback. In another example, the target audio track can be played on the processing device as well as other playback devices. In another example, the target audio track can be stored (e.g., in a playlist) for future playback.

In example embodiments, the selection of a target audio track for playback at block 460 responsive to the user-associated data at block 410 can be based on a measure of the effectiveness of the user reaching a target mental state with one or more previously played reference audio tracks; these could be tracks included in the library of target tracks but are defined as reference tracks once used as input to the system along with user-associated data (e.g., ratings of those tracks). For example, a target audio track can be selected based on effectiveness rating of previously played reference audio track(s) by the user and modulation characteristics of one or more target audio tracks. This is different from known technology that selects audio tracks based on aesthetic rating and/or music parameters. Another non-limiting example can be that a second audio track is selected for playback based on a first track by implicitly determining (e.g., based on user history, or user devices such as Oura ring that recognizes sleep patterns, etc.,) if the first track is effective. In such a scenario, knowledge of a desired mental state may not be required.

Figure 5:
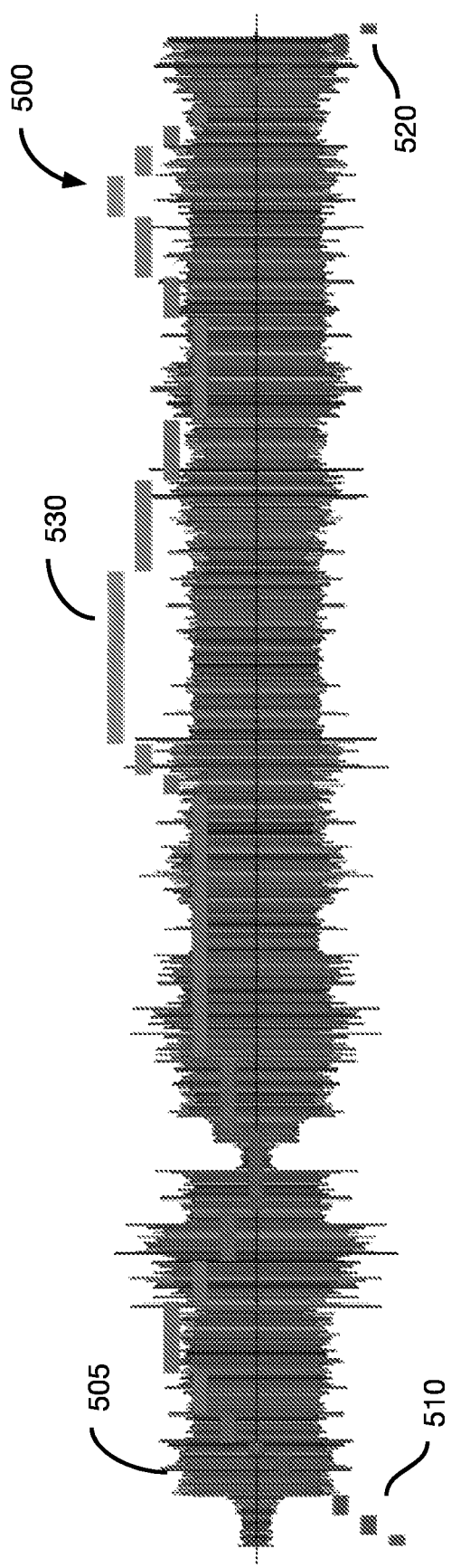
FIG. 5 depicts a waveform of an audio track overlaid with its analyzed modulation depth trajectory according to an example embodiment of the present disclosure.

FIG. 5 shows a waveform of an example audio track 505 overlaid with its analyzed modulation depth trajectory according to an embodiment of the present disclosure. In this example, the modulation depth 500 starts low 510, ends low 520, and varies over time during the body of the audio content, with a high plateau 530 starting about halfway through the track. This pattern may be beneficial to provide a targeted mental state such as focus, mediation, relaxation, etc.

Figure 6:
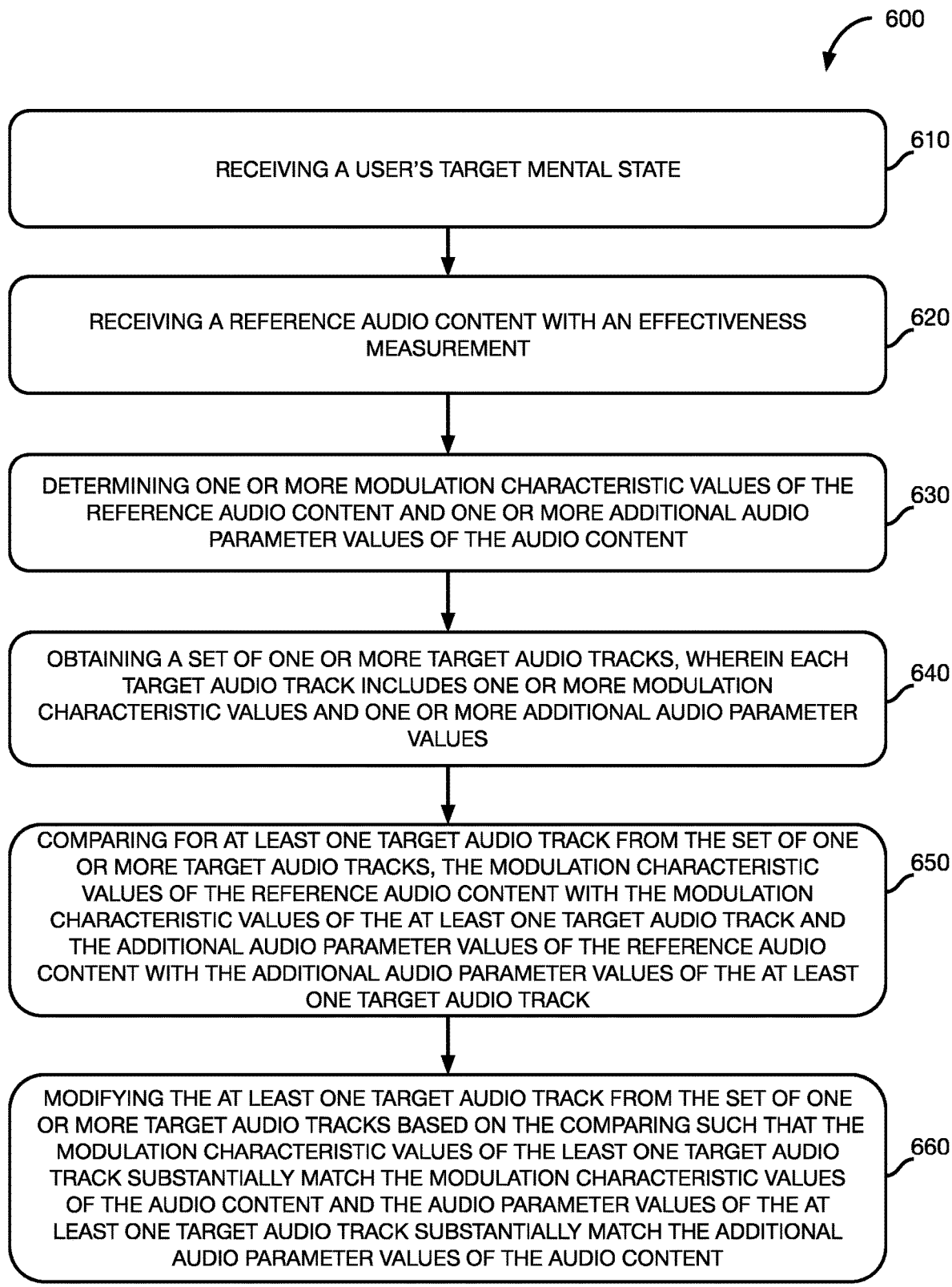
FIG. 6 depicts a process diagram of an illustrative method according to an example embodiment of the present disclosure.

FIG. 6 illustrates an example method 600 performed by a processing device (e.g., smartphone, computer, smart speaker, etc.) according to an example embodiment of the present disclosure. According to example embodiments of the present disclosure, method 600 can be performed by the same processing device that performs method 400. Alternatively, method 600 can be performed by a different processing device (e.g., smartphone, computer, etc.). The method 600 may include one or more operations, functions, or actions as illustrated in one or more of blocks 610-660. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

At block 610, a user's target mental state can be received. Certain aspects of block 610 have been previously described with respect to method 400. Non-limiting examples of a user's target mental state can include focus, relax, sleep, and meditate. Each of these example desired mental states can be further distinguished by a target activity and duration. For example, focus can be distinguished by deep work, creative flow, study and read, light work, etc.; relax can be distinguished by chill, recharge, destress, unwind, etc.; sleep can be distinguished by deep sleep, guided sleep, sleep and wake, wind down, etc.; and meditate can be distinguished by unguided and guided. The duration of the mental state may be specified, for example, by a time duration (e.g., minutes, hours, etc.), or a duration triggered by an event (e.g., waking, etc.). The indication may be received via a user interface on a processing device such as, for example, through an interface on the Brain.fm™ application executing on an iPhone™ or Android™ device. Alternatively, and/or additionally, the indication may be received over a network from a different processing device.

At block 620, a reference audio content with an effectiveness measurement can be received. Certain aspects of block 610 have been previously described with respect to method 400. The effectiveness measurement may indicate an effectiveness of the reference audio content to achieve the target mental state for the user. The effectiveness measurement can be implicitly defined as effective by the user merely providing a reference audio content to the system.

At block 630, one or more modulation characteristic values of the reference audio content and one or more additional audio parameter values of the reference audio content can be determined. Certain aspects of block 630 have been previously described with respect to method 400. Non-limiting examples of audio parameters may include tempo; RMS (root mean square energy in signal); loudness; event density; spectrum/spectral/envelope/brightness; temporal envelope; cepstrum (e.g., spectrum of spectrum); chromagram (e.g., what pitches dominate); flux (e.g., change over time); autocorrelation; amplitude modulation spectrum (e.g., how energy distributed over temporal modulation rates); spectral modulation spectrum (e.g., how energy distributed over spectral modulation rates); attack and decay (e.g., rise/fall time of audio events); roughness (e.g., more spectral peaks close together is rougher); harmonicity/inharmonicity (i.e., related to roughness but calculated differently); and/or zero crossings (i.e., sparseness).

Various techniques can be used to identify additional audio parameter values associated with audio content. Non-limiting examples of such techniques can include multi-timescale analysis of features (e.g., different window lengths); analysis of features over time; broadband or within frequency subbands (i.e. after filtering); and/or second order relationships (e.g., flux of cepstrum, autocorrelation of flux). Additionally, or alternatively, additional audio parameter values may be identified in a metadata field associated with audio content.

At block 640, a set of one or more target audio tracks can be obtained such that each target audio track includes one or more modulation characteristic values and one or more additional audio parameter values. Certain aspects of block 640 have been previously described with respect to method 400. In some embodiments, the obtained set of one or more target audio tracks can be based on, for example, a target mental state of the user, an aesthetic perception of whether a reference audio track sounds good, and/or unique properties of a reference audio track relative to others (i.e., distinctiveness).

At block 650, for at least one target audio track from the set of one or more target audio tracks, the one or more modulation characteristic values of the reference audio content can be compared with the one or more modulation characteristic values of the at least one target audio track and the additional one or more audio parameter values of the reference audio content can be compared with the one or more additional audio parameter values of the at least one target audio track. Certain aspects of block 650 have been previously described with respect to method 400.

At block 660, the at least one target audio track from the set of target audio tracks can be modified based on the comparing such that the one or more modulation characteristic values of the at least one target audio track substantially matches the one or more modulation characteristic values of the reference audio content and the one or more audio parameter values of the at least one target audio track substantially matches the one or more additional audio parameter values of the reference audio content. For example, if a user with ADHD prefers listening to a particular pop song to focus, then the modulation characteristics of that pop song can be modified (e.g. change the modulation depth to 12-20 Hz) based on the target "focus" mental state for the user. In one embodiment where the selected target audio track is sufficiently similar in the comparing, block 660 can be omitted.

In an example embodiment, the processing device may select a subsequent target audio track from the set of target audio tracks based on the comparing (as described by block 650) such that the modulation characteristic values of a beginning portion of the subsequent target audio track aligns in a predetermined manner with an end portion of the reference audio track. In this case the processing device may use the heads and tails of audio tracks instead of the entire track. The processing device may then sequentially combine, or chain, the reference audio track and the subsequent selected target audio track. When the audio tracks are combined, the start and end regions (e.g., where modulation depth is low) can be removed to avoid a dip in modulation depth (e.g., potentially disrupting the effect of modulation). The resulting combination of audio tracks can have more consistent modulation depth and may be valuable to the user by maintaining the desired mental state.

In one embodiment, heads and tails of audio tracks can be used to chain audio tracks together to create a playlist with modulation characteristics and/or other audio characteristics (e.g., as described above) that are smooth and continuous across track changes. In another embodiment, audio tracks can be chained based on contrasting (i.e., maximally different) modulation characteristics and/or other audio characteristics. In yet another embodiment, target audio tracks can be chained based on a combination of both contrasting and similar modulation characteristics and/or other audio characteristics.

In an example embodiment, an acoustic analysis can be performed on the modified target audio content. The analysis can include determining a distance, in measurement space (i.e., the space of measured modulation characteristics and/or audio characteristics), between the modified target audio content and a reference audio content. The determined distance can define a cost function in the space of modifiable parameters. The cost function can then be evaluated by applying optimization techniques, which can involve selecting multiple sample points in the parameter space, modifying the audio, and finding the distance in measurement space at each sampled point in the parameter space. The target audio content can also be modified repeatedly until a global minimum in the cost function can be adequately estimated. The target audio content can then be further modified according to the estimated optimum parameters or the modified target audio can be retrieved if already close to this optimum.

Alternatively, in an example embodiment, a mapping can be provided that translates between parameter space and measurement space such that a movement in parameter space would result in a known movement in measurement space. Similarly, the parameter space and measurement space can be chosen to be heavily interrelated, e.g., if the parameter space is the depth and rate of broadband tremolo, and the measurement space is the depth and rate of broadband modulation. In these cases, the optimization over a latent function (i.e., minimization of the cost function defined by the reference-target difference in measurement space at each point in the target-modification parameter space) is not required since the location of the modified target in measurement space can be estimated directly by the change in parameters during modification.

In example embodiments, one or more target audio tracks can be modified to move toward a particular location in a significant feature space, e.g., modulation depth and rate. The parameter space, e.g., the many knobs that can be turned to modify the audio, may not be the same as the measurement space (feature space), which relates the music to effects on the brain.

In example embodiments, the set of one or more target audio tracks can include a single target audio track only. In such a case, that single target audio track can be modified along various dimensions as described with respect to block 660. The modulation characteristic of the single target audio track can be modified based on user inputs (e.g., prescribed modulation characteristics values). For example, if a user completes a survey that shows they have ADHD, and it is known that they will benefit from a particular modulation depth at 12-20 Hz rate, then the user can select the closest target audio track from a library of target audio tracks. The selected target audio track may still not be ideal. In such a case, the target audio track can be modified to have the desired modulation characteristics values.

Figure 7A:
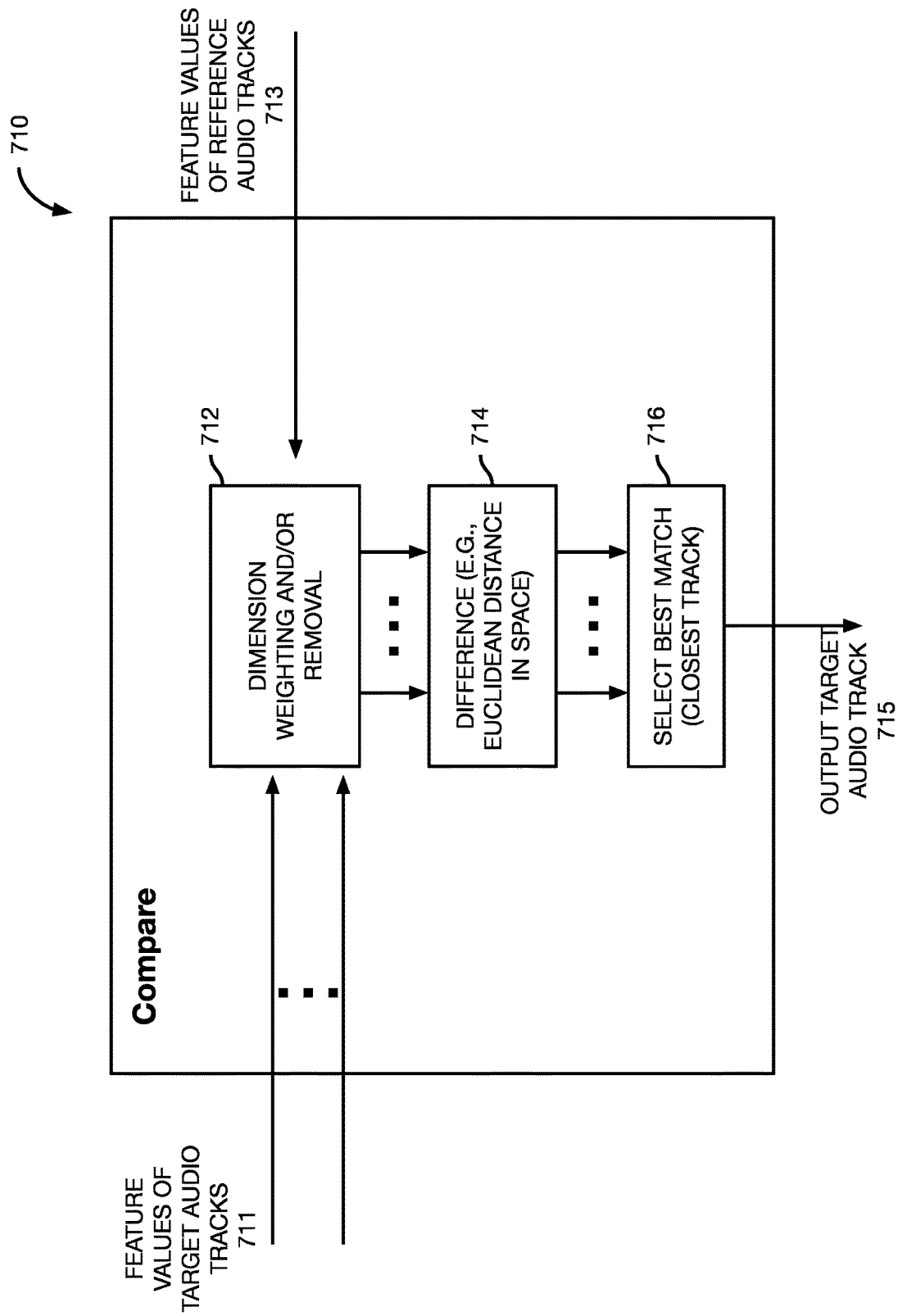
FIG. 7A depicts a process diagram of an illustrative method according to an example embodiment of the present disclosure.

FIG. 7A provides an example illustration of the comparison process flow 710 as previously described with respect to block 650 of method 600, when using a single reference track rather than a user model. The process flows 710 may include one or more operations, functions, or actions as illustrated in one or more of blocks 711-716. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

As shown in FIG. 7A, feature values of the target audio tracks 711 and feature values of the reference audio tracks 713 are input to the comparison block 710. In this example, a dimension weighting and/or removal block 712 takes these input values and determines which feature dimensions (if any) should be reweighted or removed to establish a feature space that is common to the target and reference tracks, and is most relevant to the user's desired mental state. For example, if only the reference track(s) have an analyzed dimension of 'modulation phase', but the target track does not, this dimension could be removed prior to comparison. Similarly, if the user is known to want a mental state of Focus, but analyzed dimensions exist that are known to be irrelevant to focus, these dimensions could be removed by process 712/722 prior to comparison in blocks 714/724.

A difference block 714 takes the output of dimension weighting and/or removal block 712 and determines the difference (e.g., in Euclidean distance space) between reference and targets. In an example embodiment, modification 660 may not move a target audio track arbitrarily in feature space; there are limited directions and distances based on audio processing techniques, the target audio track to be modified, and other constraints. For example, consider one rated audio track T and two audio tracks A and B in a library of audio tracks. In this example, it may be the case that T-A>T-B (i.e., the difference between T and A is greater than the difference between T and B; so, B seems best), but the distance T-B cannot be traversed by available audio modification techniques, whereas T-A can be traversed by available audio modification techniques. A practical example may be if T and A differ greatly in brightness (e.g., spectral tilt), which can be modified by filtering/EQ without impacting other dimensions, whereas T and B differ in the phase of modulation across frequency bands, which is not easy to modify (e.g., may require removing instruments, etc). In this case, B may be selected as being more similar in the process 710 (method 400), but A may be selected for modification in the process 720 (method 600). In block 716, the best match is selected and the target audio track is output at 715.

Figure 7B:
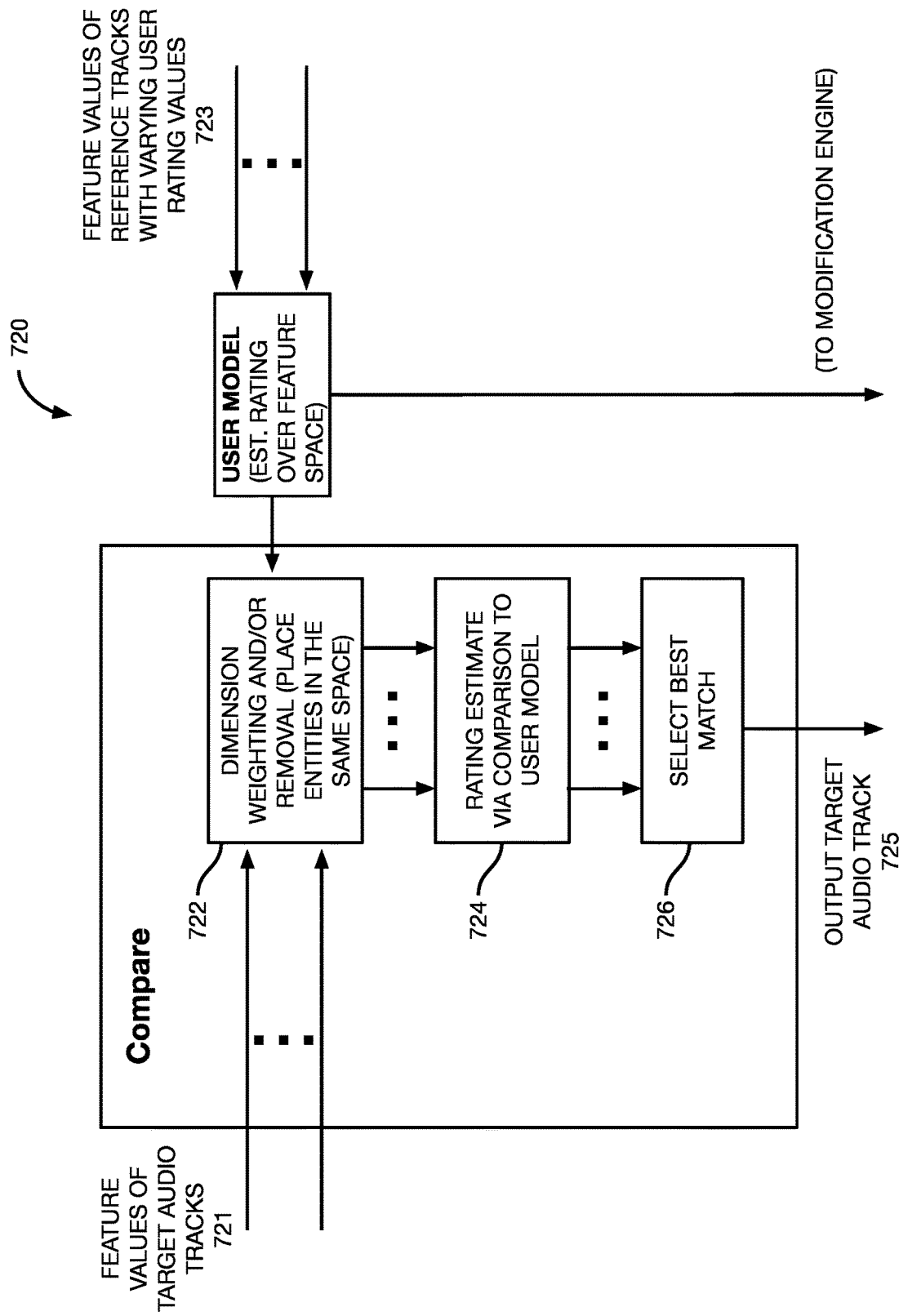
FIG. 7B depicts a process diagram of an illustrative method according to an example embodiment of the present disclosure.

FIG. 7B provides an example illustration of the comparison process flow 720 as previously described with respect to block 650 of method 600, when a user model is used The process flows 710, 720 may include one or more operations, functions, or actions as illustrated in one or more of blocks 711-726. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

Unlike in method 400, method 600 may consider how modification can move a target audio track through the feature space. Thus, process 720, in addition to establishing a common feature space between target and reference as in process 710, may reweight the feature space to reflect the possibilities of movement by audio modification. For example, a dimension corresponding to brightness (e.g., which may be easy to manipulate) may be compressed such that a difference in that dimension is down-weighted in the comparison. This allows process 720 to find a target audio track which can be modified to be the best match 726 (optimal features under the user model), whereas process 710 aims to find a target audio track that substantially matches the desired modulation characteristics 716 (closest match to a reference track known to have desirable characteristics).

C. EXTENDING AUDIO TRACKS WHILE AVOIDING DISCONTINUITIES

The present disclosure additionally describes systems, methods, apparatuses and computer executable media for extending audio tracks while avoiding discontinuities.

Current audio playback systems are generally based on sequentially playing audio tracks; e.g., playing a first audio track from start to finish followed by a second audio track, and so forth. This has the effect of presenting variety to the user which may maintain the user's continued interest in and engagement with the audio. However, this may not be the desired result for audio used to aid focus (e.g., focusing on a task rather than paying attention to the music), sleep, or relaxation. Furthermore, switching from one audio track to the next may introduce discontinuities in audio characteristics such as a brief silence in the audio and/or a change in the audio modulation, rhythm, instrumentation, and the like. With popular music, such discontinuities may occur every 3-5 minutes (the length of a normal music track). This switching between tracks may be disruptive to the listener attempting to maintain a desired mental state (e.g., being focused). One potential solution may be to loop (e.g., repeat) a single track, but often this may still result in discontinuities because of the different audio characteristics between the "outro" (e.g., final portion) and "intro" (e.g., initial portion) of the audio track. It is therefore desirable to extend an audio track, creating a version longer than the original track by repeating audio from the original track by non-perceptible, seamless joining of various portions of the audio track such that a listener can maintain a desired mental state for a desired length of time.

Embodiments disclosed herein describe techniques for extending an audio track with non-perceptible, seamless joining of different portions of the audio track. The joining may be based on the similarity of audio characteristics within the audio track, such as similarity between amplitude modulation characteristics of different portions of the audio track. The similarity analysis for amplitude modulation may include determining characteristics (e.g., constituent frequencies) of the sound envelope, rather than the constituent frequencies of the audio itself. The sound envelope, which may move slower than the frequencies of the audio itself, is known to be a more perceptible feature of sound in the mammalian brain. Research shows that mammalian auditory system involves a modulation-frequency filter bank (e.g., allowing the brain to discriminate between modulation frequencies of the sound envelope) in the brain stem and audio-frequency filter bank (e.g., allowing the brain to discriminate between frequencies in the audio signal itself) in the cochlea. Research also shows that amplitude modulation may drive rhythmic activity in the brain, which may then be leveraged to support mental states like focus, sleep, relaxation, and/or various other mental states.

The modulation-frequency domain may generally include 0.1 Hz-100 Hz (compared to audible frequency range of 20 Hz-20 KHz). Modulation frequencies (or modulation rates) may refer to the spectra of amplitude changes in an underlying higher-frequency signal (the audio-frequency "carrier"). Extraction of the modulation characteristics may include, e.g., determining the envelope of a sound (broadband or filtered sub-bands) via a technique like Hilbert transform; followed by a spectral analysis of this envelope via methods like Fast Fourier Transforms (FFTs) or modulation domain bandpass filtering (e.g., to determine the spectrum of the sound envelope), visual filtering on the spectrographic representation of the sound envelope, and/or any other technique of extracting modulation characteristics.

The usage of modulation characteristics for audio track extension for determining similarity is just an example; and usage of other characteristics is also within the scope of this disclosure. For example, one or more embodiments may use acoustic characteristics such as audio-frequency, brightness, complexity, musical surprise, etc. that may bear on effectiveness, distractibility, and modification of mental states, etc. One or more of these characteristics may be used to provide an audio output targeted to elicit a desired mental state, whereby the duration of the audio track can be arbitrarily adjusted to different time durations without sounding repetitive, without introducing discontinuities, or otherwise losing its effectiveness of eliciting a desired mental state.

For example, an earlier segment may be joined to a later segment having similar audio characteristics as the earlier segment. Using the joining between the various portions of the audio track, the audio track may be extended. For instance, a five-minute music piece may be extended to an hour of playback. These embodiments of track extension may be applicable to environmental sounds, speech, music with poorly defined beats (e.g., ambient, metrically-variable music), music with well-defined beats, and/or any other type of audio content.

In an example method of extending an audio track, multi-dimensional features of the audio track (e.g., amplitude modulation features) may be extracted. The extracted multi-dimensional features may be in the form of a spectrogram, a cochleagram, and/or any other form of audio features. The extracted multi-dimensional features may be used to generate an "image" representation of the sound. For example, the image representation may be a 2-dimensional image with the frequency spectrum (e.g., of the sound envelope) on the y-axis and the time on the x-axis.

To determine the similarity between different portions of the audio track, the audio track (e.g., the features extracted from the audio track) may be divided into a plurality of segments. The size of the segment may be based on the extracted multi-dimensional features. In the case of rhythmic sounds such as music, the segment size may comprise a certain number of beats (e.g., four beats; one beat is often assigned the value of a quarter-note in western popular music); for non-rhythmic sound such as ambient sound, the segment size may be based on a time duration (e.g., an absolute time duration of 3 seconds).

Each of the segments may then be compared with the entirety of the audio track. For example, a timestep smaller than the segment size may be chosen, and a given segment may be slid across the audio track using the timestep. At each time step, the features of the segment may be compared to the features of the underlying portion of the audio track associated with the current timestep. The comparison may include, for example, cross-correlation, difference, division, and/or any other type of similarity analysis. Therefore, the sliding and comparison operations for each segment may generate a similarity vector indicating the similarity between the segment and different portions of the audio track at each timestep.

The sliding and comparison operations may be performed for each of the segments of the audio track thereby generating a similarity vector for each segment. The similarity vectors for all the segments may be combined to generate a self-similarity matrix. In an example self-similarity matrix, each row may be a similarity vector for a different segment and may contain column entries for each time step. Therefore, if there are M number of segments and T number of timesteps, the self-similarity matrix has 2 dimensions with size M*T. An element (X, Y) of the self-similarity matrix may be a numerical value indicating the similarity between the corresponding segment X and the corresponding underlying portion of the audio track at timestep Y.

Similarity between different portions of the audio track may be determined based on an analysis of the self-similarity matrix. For example, within the self-similarity matrix, the elements may include peaks (e.g., an element with a higher value than its neighbors) showing a higher similarity between the corresponding portions. The joining for audio track extension may be for the segments corresponding to these peaks. A thresholding may be applied during an analysis of the self-similarity matrix and the segments associated with a predetermined number of highest-valued peaks may be identified as candidates for joining. In addition to similarity (as indicated by the peaks), the joining may be based on other considerations such as whether the corresponding segment appears toward the beginning of the audio track or towards the end of the audio track, whether the corresponding segment was used for extension before, and/or any other considerations.

When two segments are selected for joining, a cross-correlation (and/or any other form of similarity analysis) may be performed between the envelopes of the segments. The cross-correlation may determine an additional time-shift between the two segments, smaller than the segment size, which may be imposed before they are joined.

The optimal point for joining two segments (e.g., via a rapid crossfade) may then be determined by finding a location with relatively low energy such as, for example, a zero crossing or where the sound envelope has a low value. When the joining point is determined, the corresponding segments are joined to extend the audio track.

In an embodiment, a computer-implemented method is provided. The method may include extracting multi-dimensional features from an audio signal; segmenting the audio signal into a first plurality of segments each having a segment size and extracted multi-dimensional features; segmenting the audio signal into a second plurality of segments each having the segment size and the extracted multi-dimensional features; selecting at least one segment from the first plurality of segments, and for each selected segment: comparing the multi-dimensional features of the segment with the multi-dimensional features of the second plurality of segments; generating a self-similarity matrix having values indicating comparisons of the multi-dimensional features of the selected segment with multi-dimensional features of the second plurality of segments; selecting a first segment from the first plurality of segments and a second segment from the second plurality of segments, wherein the first and second segments correspond to a value in the self-similarity matrix that is greater than a threshold; and joining a first portion of the audio signal and a second portion of the audio signal, wherein the first portion of the audio signal includes the first segment, and wherein the second portion of the audio signal includes the second segment.

In another embodiment, a system is provided. The system may include a processor; and a tangible, non-transitory computer readable medium storing computer program instructions, that when executed by the processor, cause the system to perform operations comprising: extracting multi-dimensional features from an audio signal; segmenting the audio signal into a first plurality of segments each having a segment size and extracted multi-dimensional features; segmenting the audio signal into a second plurality of segments each having the segment size and the extracted multi-dimensional features; selecting at least one segment from the first plurality of segments and for each selected segment: comparing the multi-dimensional features of the segment with the multi-dimensional features of the plurality of segments; generating a self-similarity matrix having values indicating comparisons of the multi-dimensional features of the selected segment with multi-dimensional features of the second plurality of segments; selecting a first segment from the first plurality of segments and a second segment from the second plurality of segments, wherein the first and second segments correspond to a value in the self-similarity matrix that is greater than a threshold; and joining a first portion of the audio signal and a second portion of the audio signal, wherein the first portion of the audio signal includes the first segment, and wherein the second portion of the audio signal includes the second segment.

In yet another embodiment, a tangible, non-transitory computer readable medium is provided. The tangible, non-transitory computer readable medium may store computer program instructions, that when executed by a process, may cause operations including extracting multi-dimensional features from an audio signal; segmenting the audio signal into a first plurality of segments each having a segment size and extracted multi-dimensional features; segmenting the audio signal into a second plurality of segments each having the segment size and the extracted multi-dimensional features; selecting at least one segment from the first plurality of segments and for each selected segment: comparing the multi-dimensional features of the segment with the multi-dimensional features of the plurality of segments; generating a self-similarity matrix having values indicating comparisons of the multi-dimensional features of the selected segment with multi-dimensional features of the second plurality of segments; selecting a first segment from the first plurality of segments and a second segment from the second plurality of segments, wherein the first and second segments correspond to a value in the self-similarity matrix that is greater than a threshold; and joining a first portion of the audio signal and a second portion of the audio signal, wherein the first portion of the audio signal includes the first segment, and wherein the second portion of the audio signal includes the second segment.

Figure 8:
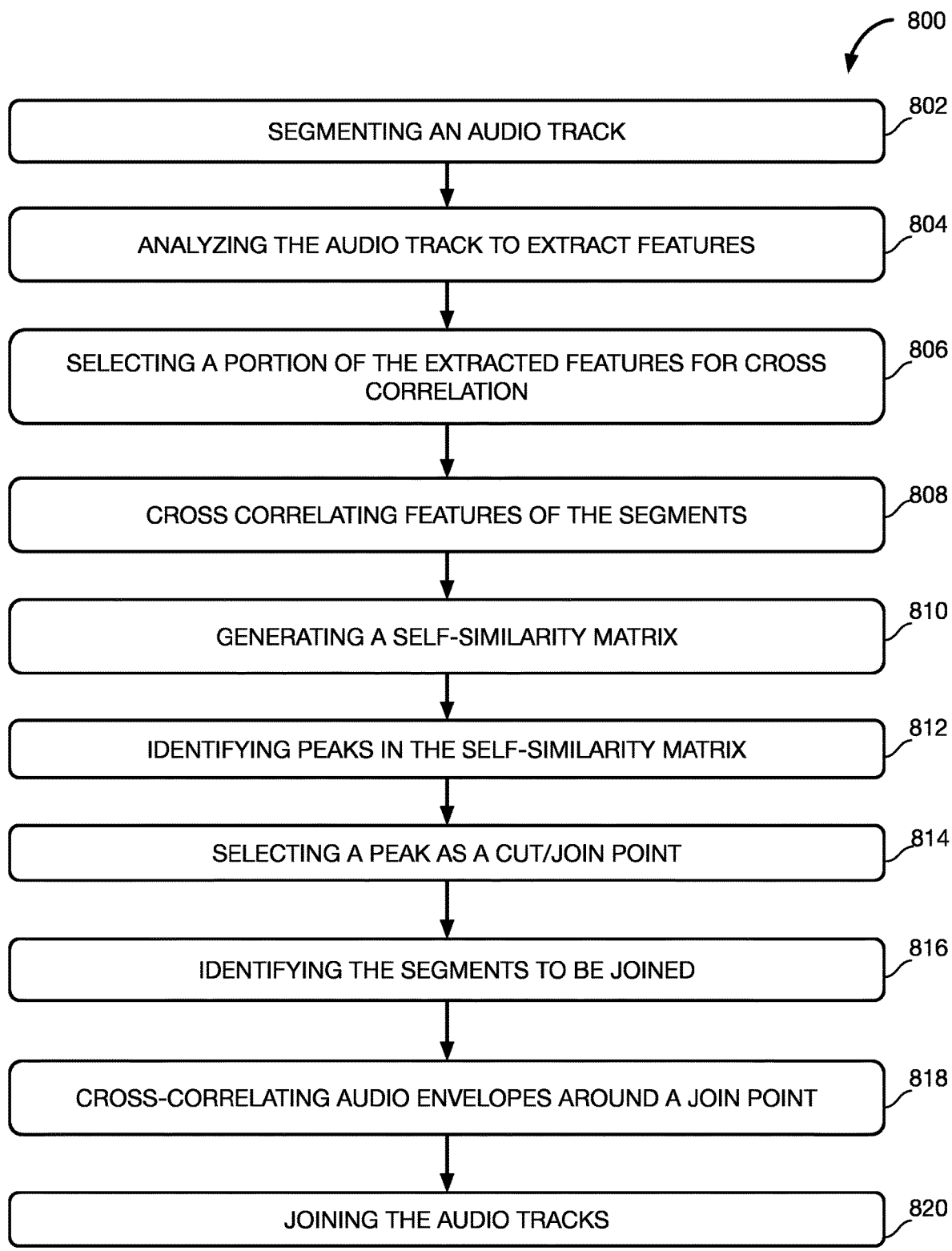
FIG. 8 depicts a flow diagram of an illustrative method of extending an audio track, according to some embodiments of the present disclosure.

FIG. 8 illustrates an example method 800 performed by a processing device (e.g., smartphone, computer, smart speaker, etc.), according to some embodiments of the present disclosure. The method 800 may include one or more operations, functions, or actions as illustrated in one or more of blocks 802-820. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

At block 802, an audio track may be segmented. The segmentation may be based on one or more temporal aspects of the audio track. In the embodiments where the audio track contains music, the segmentation may be based on rhythmic or temporal aspects of the music such as beats and/or tempo. For example, a beat-finder or a tempo-finder may be run on the audio track to determine the metrical grid of the music (e.g., to determine how the music is temporally organized, and the rate of notes over time). For example, the determined metrical grid may include the length (e.g., in milliseconds) of a measure, a quarter-note, a half-note, a whole-note, etc. Using the determined metrical grid, the segment size may be selected as having, for example, 4 or 8 beats (1 or 2 measures for 4/4 time signature), which may amount to several seconds of the audio track (e.g., 1-5 seconds). However, in the embodiments where the audio track is non-rhythmic (e.g., audio track containing an ambient sound), the segmentation may be performed using a time duration (e.g., 1-5 seconds) without necessarily tracking the beats.

The length of the segments (e.g., 1-5 seconds) may be considered relatively long in the context of audio applications, however the relatively longer segments may more likely provide a coherent joining. An aspect of the disclosure is to find segments in the audio track that can be interchanged without disrupting larger-scale structure in the audio (e.g., for a given segment, finding segments that are surrounded by a similar context). For music, a longer segment may encompass a musically meaningful amount of time. If the segment is relatively short (e.g., 200 ms) for an audio track containing music, joining segments may have acoustic continuity but may be musically disruptive.

In some embodiments, the segments may be non-overlapping, e.g., a second segment may begin at the end of the first segment. In other embodiments, the segments may be overlapping, e.g., a portion of the second segment may lie within the first segment (e.g., the second segment may begin before the first segment ends). The segments may have a same length or may have different lengths.

As an analogy to joining audio segments for an audio track containing music, consider joining text segments of a written passage. If text segments include only single letters and the joining is between the single letter segments, the result may be an incomprehensible, jumbled text. If the text segments include single words and the joining is between single word segments, the result may also be incomprehensible, jumbled text (albeit less bad than the one generated using single letter segments). However, if the segments include several words or a phrase, the joining between these segments may result in a more comprehensible text (possibly even syntactically well-formed). An exception to using the longer segments may be operating on non-musical audio (e.g., ambient sound such as a café noise), where shorter segments may be used because a musical continuity or coherence may not necessarily be an issue.

At block 804, the audio track may be analyzed to extract multi-dimensional features. For example, multi-dimensional features (or representations) such as spectrogram or cochleagram (e.g., indicating frequency over time), MFCCs (Mel Frequency Cepstral Coefficients), modulation characteristics (e.g., indicating spectral or temporal modulation over time), and/or other audio features may be extracted from an audio track. The analysis and extraction may be performed on the broadband audio signal (e.g., entire signal) or a portion of the audio signal (e.g., a frequency sub-band of the signal). As an example, the extracted multi-dimensional features may include amplitude modulation features of the audio track. The amplitude modulation features may correspond to energy across different modulation frequencies over time in the sound envelope of the audio track. Amplitude modulations in the sound envelope have effects on the human brain and mental states that differ depending on the characteristics of the modulation.

At block 806, a portion of the extracted multi-dimensional features may be selected for cross-correlation. In some embodiments, the selected features may include spectrogram or cochleagram, which may indicate energy in frequency bands over time. In other embodiments, the selected features may include a portion of the spectrogram, where the portion may be restricted for a frequency range for a more efficient analysis. Additionally or alternatively, the selected features may include Mel-frequency cepstral coefficients (MFCCs), modulation characteristics, and/or any other type of extracted audio features. The selection of features may be based on additional analyses of the audio. For example, if an audio analysis determines that the high frequency region of a spectrogram contains relatively little energy or relatively little information, that region may be discarded during the selection; this may be desirable in this example to reduce computational cost. The selected features (or features in general) may be referred to as feature vectors. For instance, each segment may have a corresponding feature vector containing the corresponding features as they change over the duration of the segment.

At block 808, a feature vector of one or more segments may be cross-correlated with the feature vector of other segments forming at least a portion of the audio track. For example, a timestep (generally shorter than the segment size) may be selected, and a given segment may be slid through at least a portion of the audio track in the increments of the time step. At each time step, the cross-correlation (or any other similarity measurement) between the segment and the underlying portion of the audio track that the segment is sliding over is recorded. This sliding process may yield a cross-correlation function (or any other similarity indication) that may indicate which segments in the at least a portion of the audio track best match the sliding segment. It should however be understood that cross-correlation is just an example of comparing the features of the sliding segment with the features of the underlying portion of the audio track, and other forms of comparison are also within the scope of this disclosure. Alternatives to cross-correlation may include, for example, difference, division, etc.

In some embodiments, the timestep for cross-correlation may be a unit fraction of segment size in samples (where the digital audio file is a sequence of samples intended to be played back at a predefined sample rate to generate a pressure waveform). For example, if a segment has N samples, the cross-correlation timestep may contain N/2, N/3, N/4, N/5, . . . , etc. samples. The segment size may be chosen so as to allow cross-correlation at particular resolutions, e.g., a smaller segment size and corresponding smaller timestep for a higher resolution. Regardless of the segment and timestep sizes, the sliding and comparing operations for each segment may generate a similarity vector.

At block 810, a self-similarity matrix is generated. The self-similarity matrix may be based on cross-correlations (and/or any form of comparison) performed in block 808 and may contain the similarity vectors generated for the plurality of segments. In other words, within the self-similarity matrix, a given row may represent the cross-correlation of the corresponding segment with the segments forming at least a portion of the audio track. Accordingly, the self-similarity matrix may have a size of M (rows)*T (columns) with M being the number of segments and T being the number of timesteps in the at least a portion of the audio track (which may be based on the size of timesteps—the smaller the timestep, the larger the T). The self-similarity matrix may represent the similarity of the M predefined segments to other segments forming at least a portion of the audio track. However, as described above, cross-correlation is just but an example of the comparison, and other forms of comparisons are also within the scope of this disclosure. For example, other forms of comparisons such as sliding dot-product, subtraction, and/or division are alternatives or additions to cross-correlation.

At block 812, peaks in the self-similarity matrix may be identified. Each peak in the self-similarity matrix corresponds to a pair of segments that are more likely to be similar to each other than to neighboring segments. Therefore the identified peaks may be used in the subsequent steps for joining the likely similar segments. Identifying the peaks to use in joining may include detecting peaks that are higher than other peaks by thresholding a larger set of peaks, for example by keeping the highest peaks (e.g., 5 highest peaks) while dropping a peak when a higher one is found, or finding all peaks and keeping only the highest 5% of peaks. At the end of block 812, a list of the highest peaks and/or the segment-pairs with the highest peaks from the self-similarity matrix may be generated.

At block 814, a peak may be selected as a cut/join point. The selection may be based on factors such as peak height (e.g., which may indicate the level of similarity between corresponding segment and the underlying portion of the audio track), location (e.g., the location of the corresponding segment within the audio track), and/or history of usage of the corresponding segment (e.g., a previously used segment may be avoided for joining to reduce the probability of undesirable repetition in music). These are just a few example considerations in the peak selection, and other peak selection considerations are also within the scope of this disclosure.

At block 816, the segments to be joined may be identified. The identified segments may correspond to the peak selected as the cut/join point. Accordingly, the identified segments may include (i) the segment at the peak itself (e.g., the portion of the track representation that was being slid over when the high-valued comparison occurred), and (ii) the predetermined segment corresponding to the row containing the peak (e.g., the segment that was sliding over to create the row in the self-similarity matrix). The identified segments, when joined in the subsequent steps, may be conceptualized as effectively jumping the audio track backward or forward in time. For instance, a first identified segment (of the pair indicated by a selected peak) may be further along in time (e.g., closer to the end of the original audio track) than a second identified segment (e.g., which may be closer than the first identified segment to the start of the original audio track). Therefore, when the second identified segment is joined after the first identified segment, the audio track may be extended by effectively jumping the audio track backward in time. Alternatively, when the first identified segment is joined after the second identified segment, the audio track may be extended by effectively jumping forward in time (i.e., skipping the portion of audio between the second and first audio segments) to a similar segment.

In some embodiments, the block 816 feature of identifying segments to be joined comprises identifying sections to be joined based on user input and/or user feedback.

For example, if a user has indicated a preference for a portion or section of music that is currently playing or was recently played (e.g., a "like" indication, a "rewind" or "replay" command, or similar indication received via a graphical user interface and/or microphone), then that portion or section of audio can be up-weighted for the segment identification process, thereby increasing the likelihood that the preferred audio (or portions or sections thereof) will be selected for joining at block 816.

Similarly, if a user has indicated an aversion to a portion or section of music that is currently playing or was recently played (e.g., a "dislike" indication, a "fast-forward" or "skip" command, or similar indication received via a graphical user interface and/or microphone), then that portion or section of audio can be down-weighted for the segment identification process, thereby decreasing the likelihood that the disfavored audio (or portions or sections thereof) will be selected for joining at block 816.

Some embodiments additionally include (i) identifying one or more acoustic and/or musical characteristics of portion or section of audio for which the user has indicated a preference, and (ii) using the identified one or more acoustic and/or musical characteristics of that portion or section of audio to identify other tracks (and/or portions and/or segments of tracks) that are good candidate tracks (or portions and/or segments) for extending tracks, including but not limited to up-weighting the identified good candidates for consideration during the block 816 feature of identifying segments to be joined.

Such embodiments may further include (i) identifying one or more acoustic and/or musical characteristics of portion or section of audio for which the user has indicated an aversion, and (ii) using the identified one or more acoustic and/or musical characteristics of that portion or section of audio to identify other tracks (and/or portions and/or segments of tracks) that are poor candidate tracks (or portions and/or segments) for extending tracks, including but not limited to down-weighting the identified poor candidates for consideration during the block 816 feature of identifying segments to be joined.

For example, a portion of a track may have a particular chord progression or chord transition, a particular instrument or combination of instruments, a particular rhythmic characteristic, a certain sound or sounds, a particular musical feel (driving or punchy vs. relaxed or mellow), a particular frequency emphasis or combination of emphasized frequencies, and/or other musical and/or aural features or combinations thereof that a user finds (i) appealing or interesting or (ii) unappealing or even annoying.

In some embodiments, the user's preferences and/or aversions are contextually logged for consideration during the block 816 function of identifying segments for joining. For example, a user may like certain musical or other aural characteristics when listening to music or other audio to relax or get ready for bed, but the user may dislike those same musical or other aural characteristics when listening to music or other audio to focus on work (and vice versa). Music or audio that causes the user to relax or fall asleep would be undesirable when the user is working, and music or audio that causes the user to stay alert and focused would be undesirable when the user is trying to relax or fall asleep. Accordingly, some embodiments further include considering user preferences and/or aversions within the context of the user's current activity (e.g., working, relaxing, sleeping, and so on) when identifying segments for joining to a current track.

By using acoustic and/or musical characteristics of tracks or segments that a user likes (and does not like) to identify other tracks or segments having those same or similar acoustic and/or musical characteristics, the block 816 feature of identifying segments to be joined is able to identify segments for joining that align with the user's preferences and aversions, including the user preferences and aversions in the context of the user's current activity (e.g., working, relaxing, sleeping, etc.).

If another track (or portion or section thereof) has musical and/or other aural characteristics that a user prefers, and that other track is similar enough to a current track for which the system is attempting to identify a section for joining at block 816, then the other track (or portion or section thereof) can be joined with the current track. In some embodiments, the other track (or portion) can be manipulated or modified (e.g., increasing or decreasing the speed, shifting the pitch, altering the key signature, altering an equalization profile for consistent emphasis and de-emphasis of frequencies and/or frequency ranges, increasing or decreasing reverb and/or other audio effects, and so on) to make the other track (or portion or section thereof) musically and/or acoustically compatible with the current track so that the joining of the two tracks/portions is unnoticeable to the listener (or at least difficult to notice).

At block 818, audio envelopes around a join point (i.e., the envelopes of the two segments in the pair) may be cross-correlated. Their broadband envelopes may be used, or envelopes of filtered sub-bands (envelopes may be determined by, e.g., Hilbert transform, peak interpolation, and/or other methods). The cross-correlation may be performed to determine the timeshift required between the identified segments to minimize any perceived discontinuities in the joined audio. Once a maximum in the envelope cross-correlation is found, the required timeshift in samples is known and implemented prior to the joining operation. The identified segments may be quite long (contain a large number of audio samples) and therefore a join point may have to be identified with relatively more precision within the duration of the two similar segments being joined. This join point is the region over which the switch from one audio track to the other occurs (e.g., via a rapid crossfade). This region may be rather brief, with the crossfade lasting 10-500 ms (e.g., not longer than half a second and generally as short as 10 ms) to avoid the perception of overlapped tracks. To determine the join point, the system may look for the lowest-energy (e.g., quietest) point within the segment(s) because it may be desirable to make the join at a point where the audio is quiet rather than loud. Determining a quiet point in the segment(s) to make the join can be done using the sum of the segments (e.g., the overlapped audio from the matching pair of segments following the determined timeshift), or using only one segment alone since the two segments are very similar. The determination of a quiet point can be done, for example, via an envelope of the signal or the raw signal (waveform).

At block 820, two portions of the audio track associated with the identified segments may be joined. For example, a first portion of the audio track may correspond to the audio from the start of the track up to and including a first segment, while a second portion of the audio track may correspond to the audio from the second segment to the end of the track. The joining process may include overlapping (including any determined timeshift) the first and second segments, followed by removing or reducing the loudness to zero a portion of each segment before or after the join point. As a result, the join segment (e.g., the segment in the joined audio output that is the combination of the overlapped pair of segments) may include at least a portion of the first segment and the second segment. Different methods may be used for joining two portions of the audio track. In one embodiment, the two portions of the audio tracks are crossfaded into one another over a short period of time (which may be different from the segment size). In another embodiment, the audio tracks may be joined at coincident zero-crossings within the join segment. In both these embodiments, the exact join point (e.g., center of the crossfade) can be shifted to lower energy points in time nearby, generally within the original join segment.

In some embodiments, the extended audio track may be generated dynamically during a playback of the audio track. For example, a user may, during the playback of the audio track, provide an instruction on a user interface associated with a processing device (e.g., by visually stretching the timeline for playback of an audio track, by using a voice command to extend the track, etc.), and the extended audio track may be dynamically extended. In other embodiments, the user may provide a desired length of the audio track before the beginning of the playback, and the extended audio track may be generated prior to playback. In another embodiment, the user provides no explicit instruction, but the track continues to play indefinitely with dynamic extension until playback is stopped by the user. In yet another embodiment the track may be dynamically extended in response to sensor data or other input not explicitly given by the user. For example, a track may dynamically extend until environmental conditions change as assessed by a microphone or light meter.

The selection of the first and second segments may be based on additional or alternative considerations. For instance, the excessive repetition of the segments may be avoided as it may be undesirable to repeat the same segment back to back more than 2 or 3 times. To address this concern, in some embodiments the previous usage of segment may be considered when selecting the first and second segments (e.g., when picking a peak in the self-similarity matrix). For example, peaks that have previously been used as joins, or in which one of the two segments indicated by the peak has been used in a join, may be down-weighted or removed from consideration when selecting new peaks to use in a join. In some embodiments, joining a segment to itself may be avoided. The selection of segments to join (i.e., peak selection) may also be based on the desired time between joins in the resulting extended track. For example, it may be undesirable to have join points occur too frequently, and so peaks that would create a join shortly after the latest join may be down-weighted in favor of peaks that would allow a longer duration of the original track to play before another join occurs.

In some embodiments, the "intro" (e.g., initial portion of the track) and "outro" (e.g., final portion of the track) of an audio track may be disallowed as sections to be joined. For example, the selection of the first and/or second segment may be limited to audio segments that occur after a time interval (e.g., 1 minute) from the beginning of the audio track and/or before a time interval (e.g., 1 minute) from the end of the audio track.

In some embodiments, some portions of the audio track may be excluded from repetition. For instance, a portion of the audio track may be determined to be an outlier with markedly different characteristics compared to the other portions of the audio track. As an example, in a café ambient sound, a portion may haven audio recording of a breaking glass, which may have to be avoided from repeating in the extended audio track. This portion may then be disallowed as a join point and/or considered as a less favored portion for repetition. Such preference may be expressed by, for example, negative-weighing the one or more segments corresponding to the portion in the self-similarity matrix. For instance, the entries in the self-similarity matrix for the corresponding segments may be set to all zeros. This is just an example of enforcing the preference. Other methods are also within the scope of this disclosure.

In some embodiments, the first join segment may be selected such that the audio track plays unaltered for a period of time before the first alteration occurs. In other embodiments, the track extension may be designed to preserve a structure of the audio track by limiting the joining of segments from within portions of the audio track. In some embodiments, all parts of the audio track may be available to be used for joining segments, minimizing the likelihood that some portions of the audio track may be left out completely.

Figure 9A:
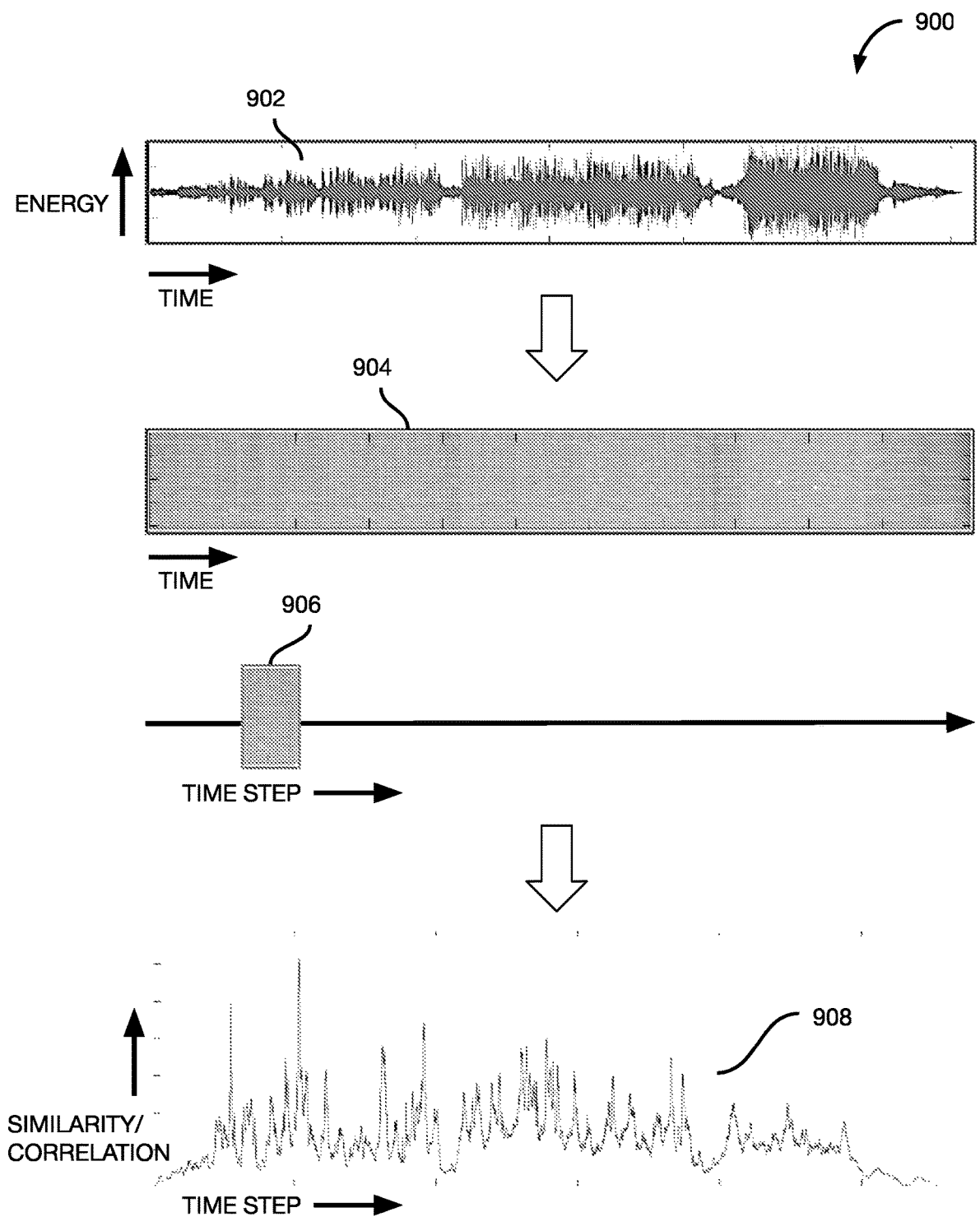
FIG. 9A depicts a process diagram of an illustrative method of generating a self-similarity matrix, according to some embodiments of the present disclosure.

FIG. 9A depicts a process diagram 900 of comparing (e.g., cross-correlating) a segment of an audio track with the entirety of audio track, according to some embodiments of the disclosure. As shown, an audio track 902 may be depicted as a distribution of energy over time. The audio track 902 may be analyzed to extract a feature vector 904. The feature vector 904 may include, e.g., spectrogram, cochleagram, MFCCs, and/or modulation characteristics. A segment 906 of the feature vector may be selected and slid across the feature vector 904 using a time step. A cross-correlation and/or any other type of similarity function may be calculated between the segment 906 and the underlying portion of the feature vector 904. Based on the sliding, a correlation (and/or similarity) function 908 may be generated that may indicate the similarity between the segment 906 and the underlying portion of the feature vector 904. The function 908 may also be referred to as a similarity vector.

The feature vector 904 may be divided into multiple segments (segment 906 is an example of one such segment), and the cross-correlation (and/or similarity) function 908 may be calculated for each segment. The cross-correlation (and/or similarity) function 908 from the multiple segments may then be used to generate a self-similarity matrix. FIG. 9B shows an example self-similarity matrix 910 with M rows $\{r1, \ldots, rM\}$ and T columns $\{c1, \ldots, cT\}$. The rows of the self-similarity matrix 910 may correspond to a number of segments (M). The columns of the self-similarity matrix 910 may correspond to the number of time steps (T). The self-similarity matrix 910 may therefore indicate the similarity relationships between the different portions of the audio track. As shown, the brightness of the entry (or a pixel) at matrix location (m,t) may correspond to the level of similarity between a given segment m and the underlying portion of the audio track at timestep t. The leading diagonal of the self-similarity matrix 910 may show the strongest relationship as the leading diagonal may indicate the similarity analysis between a segment and itself. Therefore, the leading diagonal may be left out in the subsequent peak analysis.

Peak thresholding may be applied to the self-similarity matrix 910 to determine which segments may be suited to be joined to extend an audio track. The peak thresholding may include iterating through the self-similarity matrix 910 to determine the highest peaks (as indicated by brighter pixels of the self-similarity matrix 910). For instance, five highest peaks may be determined and segments corresponding to one of the highest peaks (a peak may be selected based on other considerations such as whether a given segment has been used for joining before and/or the location of the segment within the audio track) may be joined together to extend the audio track. The self-similarity matrix 910 may therefore provide an analytical representation of the similarities within the audio track, and such representation may be used to identify the join points for similar portions to extend the audio track while avoiding discontinuities.

Figure 10A:
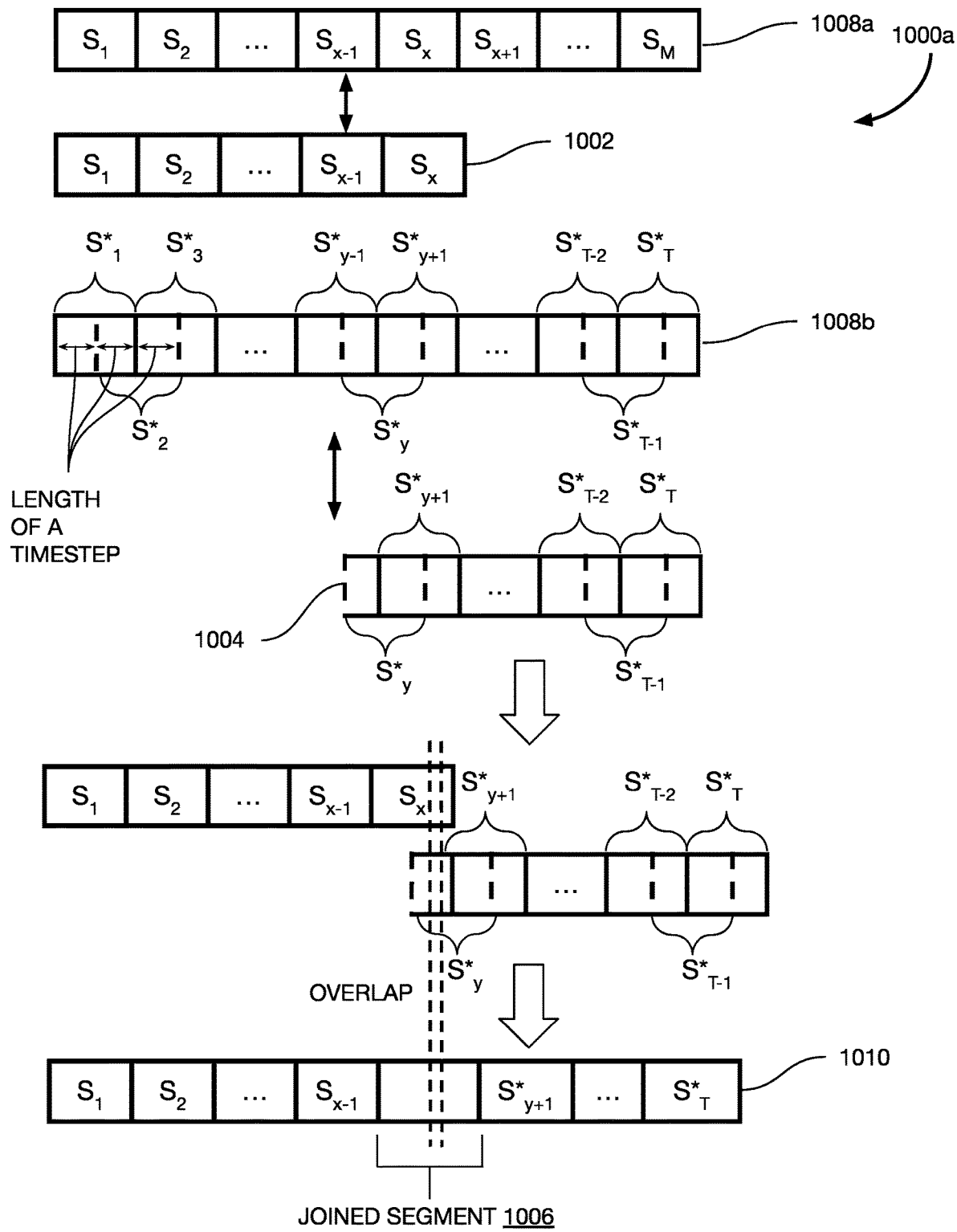
FIG. 10A depicts a process diagram of an illustrative method of joining segments to extend an audio track, according to some embodiments of the present disclosure.

FIG. 10A depicts a process diagram of an illustrative method 1000a of joining segments to extend an audio track, according to some embodiments of the disclosure. For example, an audio track 1008 may be divided into M segments $S_1, S_2, \ldots, S_{x-1}, S_x, S_{x+1}, \ldots, S_M$ (such segmented audio track is shown as 1008a), e.g., by using segmentation of block 802 of FIG. 8. The audio track 1008 may also be divided into T segments $S^*_1, S^*_2, \ldots, S^*_{y-1}, S^*_y, S^*_{y+1}, \ldots, S^*_T$ (such segmented audio track shown as 1008b). The second segmentation to generate the T segments may be based on the number of timesteps (e.g., T timesteps as described with reference to FIGS. 9A-9B). For example, as shown, the first segment $S^*_1$ of the segmented audio track 1008b may be the same as the first segment $S_1$ of the segmented audio track 1008a. However, the second segment S*$_2$ of the segmented audio track 1008b may begin after a timestep (which may be smaller than the segment length of the segmented audio track 1008a because T>M) and therefore sooner than the second segment S$_2$ of the segmented audio track 1008a. The second segment S*$_2$ of the segmented audio track 1008b is shown spanning two timesteps, however, it should be understood that other lengths of the second segment S*$_2$ are within the scope of this disclosure. The third segment S*$_3$ of the segmented audio track 1008b is shown to be the same as the second segment S$_2$ of the segmented audio track 1008a and begins before the second segment S*$_2$ of the segmented audio track 1008b has ended.

Therefore, it should be understood that the comparison granularity for join analysis (e.g., after the join segments are identified) is not limited by the predefined segment size used for generating the self-similarity matrix. The join analysis may leverage the smaller timestep (compared to the predefined segment size) for a more granular comparison to find an optimal join point for identified join segments. Furthermore, the offsetting and the sizing of the segments in the segmented audio track 1008b compared to the segments of the segmented audio track 1008a is not confined to the above example. For instance, the size of the segments in the segmented audio track 1008b may be the length of the timestep itself (e.g., T=M), or many times greater than a timestep (e.g., T=M*10).

A first segment 1002 (S$_x$) and a second segment 1004 (S*$_y$) may have been selected for joining based on, for example, the peak analysis from a self-similarity matrix (e.g., self-similarity matrix 910). The method 1000a of joining a first portion of the audio signal including audio prior to and including the first segment 1002 and a second portion of the audio signal including audio after and including the second segment 1004 may involve skipping the segments between the first segment 1002 and the second segment 1004. In other words, segments S$_{x+1}$, . . . , S*$_{y-1}$ in between S$_x$ and S*$_y$ may be absent from the resulting audio track 1010. Although the resulting audio track shows segments from the segmented audio track 1008a upstream of the joined segment 1006 and segments from the segmented audio track 1008b downstream of the joined segment 1006, this is merely for explanation. Other types of segmentation information may be used to show the resulting audio track 1010. Furthermore, the segmentation information of either the segmented audio track 1008a or the segmented audio track 1008b may not be preserved for the resulting audio track 1010.

It should however be understood that the joining of first portion of the audio signal including audio prior to and including the first segment 1002 with the second portion of the audio signal including the audio including and after the second segment 1004 is merely an example, and other manners of joining are also within the scope of this disclosure. Another example joining may be between audio up to and including the second segment 1004 with the audio after and including the first segment 1002. Therefore, it should generally be understood that the first segment 1002 may not necessarily be the end point of the first portion of the audio signal and that the second segment 1004 may not necessarily be the start point of the second portion of the audio signal.

For joining, audio envelopes (e.g., taken by Hilbert transform of the waveform, root-mean-square signal magnitude over time, or other methods of envelope calculation) between the first segment 1002 and the second segment 1004 may be compared using techniques such as cross-correlation, difference measurement, etc. Portions of the first segment 1002 and the second segment 1004 may overlap to generate a joined segment 1006 in the resulting audio track 1010.

Figure 10B:
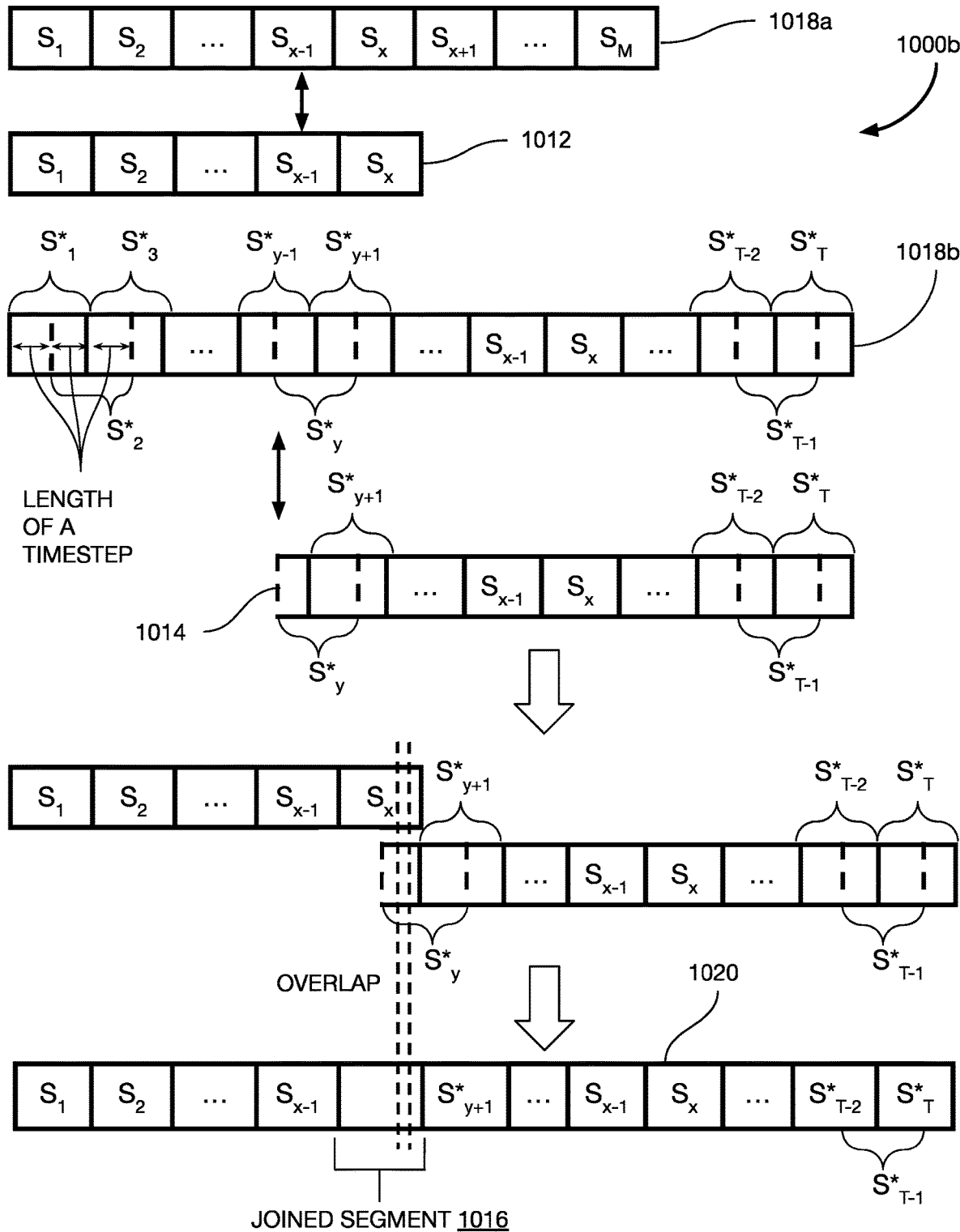
FIG. 10B depicts a process diagram of another illustrative method of joining segments to extend an audio track, according to some embodiments of the present disclosure.

FIG. 10B depicts a process diagram of another illustrative method 1000b of joining segments to extend an audio track, according to an embodiment of the disclosure. For example, an audio track 1018 may be divided into M segments S$_1$, S$_2$, . . . , S$_{x-1}$, S$_x$, S$_{x+1}$, . . . , S$_M$ (such segmented audio track is shown as 1018a), e.g., by using segmentation of block 802 of FIG. 8. The audio track 1018 may also be divided into T segments S*$_1$, S*$_2$, . . . , S*$_{y-1}$, S*$_y$, S*$_{y+1}$, . . . , S*$_T$ (such segmented audio track shown as 1018b). The second segmentation to generate the T segments may be based on the number of timesteps (e.g., T timesteps as described with reference to FIGS. 9A-9B). For example, as shown, the first segment S*$_1$ of the segmented audio track 1018b may be the same as the first segment S$_1$ of the segmented audio track 1018a. However, the second segment S*$_2$ of the segmented audio track 1018b may begin after a timestep (which may be smaller than the segment length of the segmented audio track 1018a because T>M) and therefore sooner than the second segment S$_2$ of the segmented audio track 1018a. The second segment S*$_2$ of the segmented audio track 1018b is shown spanning two timesteps, however, it should be understood that other lengths of the second segment S*$_2$ should be considered within the scope of this disclosure. The third segment S*$_3$ of the segmented audio track 1018b is shown to be the same as the second segment S$_2$ of the segmented audio track 1018a and begins before the second segment S*$_2$ of the segmented audio track 1018b has ended.

As described above, it should be understood that the comparison granularity for join analysis (e.g., after the join segments are identified) is not limited by the predefined segment size used for generating the self-similarity matrix. The join analysis may leverage the smaller timestep (compared to the predefined segment size) for a more granular comparison to find an optimal join point for identified join segments. Furthermore, the offsetting and the sizing of the segments in the segmented audio track 1018b compared to the segments of the segmented audio track 1018a is not confined to the above example. For instance, the size of the segments in the segmented audio track 1018b may be the length of the timestep itself.

A first segment 1012 (S$_x$) and a second segment 1014 (S*$_y$) may be selected for joining based on, for example, the peak analysis from a self-similarity matrix (e.g., self-similarity matrix 910). In this example, a first portion of the audio signal including audio prior to and including the first segment 1012 is joined with a second portion of the audio signal including audio after and including the second segment 1014. The resulting audio track 1010 is longer than the original track 1018 and segments S*$_{y+1}$, . . . , S$_{x-1}$ are repeated after the joined segment 1016. Although the resulting audio track shows segments from the segmented audio track 1018a upstream of the joined segment 1016 and segments from the segmented audio track 1018b downstream of the joined segment 1016, this is merely for explanation. Other types of segmentation information may be used to show the resulting audio track 1020. Furthermore, the segmentation information of either the segmented audio track 1018a or the segmented audio track 1018b may not be preserved for the resulting audio track 1010.

It should however be understood that the joining of first portion of the audio signal including audio prior to and including the first segment 1012 with the second portion of the audio signal including the audio including and after the second segment 1014 is merely an example, and other manners of joining are also within the scope of this disclosure. Another example joining may be between audio up to and including the second segment 1014 with the audio after and including the first segment 1012. Therefore, it should generally be understood that the first segment 1012 may not necessarily be the end point of the first portion of the audio signal and that the second segment 1014 may not necessarily be the start point of the second portion of the audio signal.

For joining, audio envelopes (e.g., taken by Hilbert transform of the waveform, root-mean-square signal magnitude over time, or other methods of envelope calculation) between the first segment 1012 and the second segment 1014 may be compared using techniques such as cross-correlation, difference measurement, etc. Portions of the first segment 1012 and the second segment 1014 may overlap to generate a joined segment 1016 in the resulting audio track.

Figure 10C:
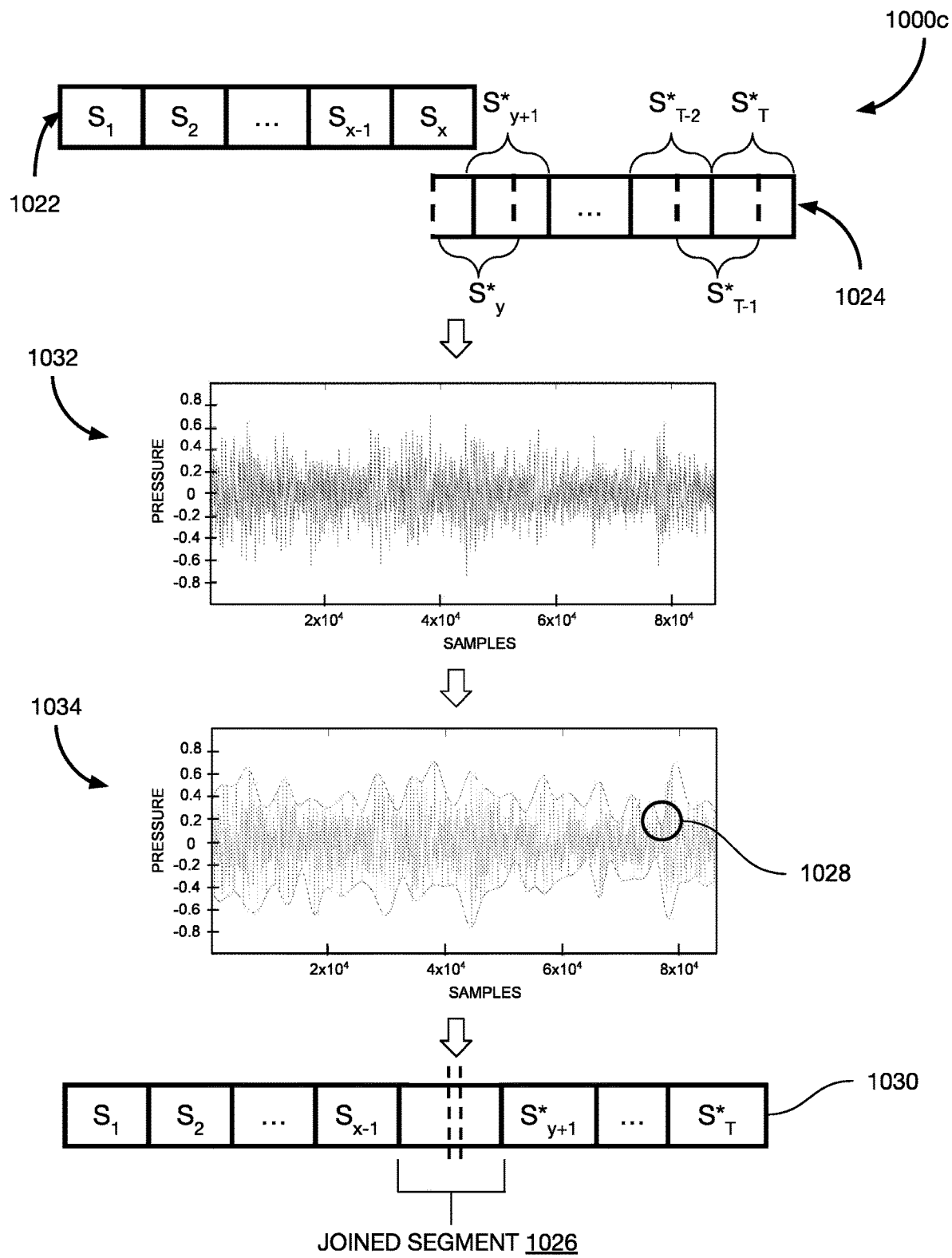
FIG. 10C depicts a process diagram of an illustrative method of calculating join (overlap) points for segments to be joined, according to some embodiments of the present disclosure.

FIG. 10C depicts a process diagram of an illustrative method 1000c of calculating an optimal join (overlap) point for segments to be joined, according to some embodiments of the present disclosure. A first portion 1022 of an audio track is shown having a segment $S_x$ that may have to be joined with segment $S^*_y$ of a second portion 1024 of the audio track. To determine the point for joining $S_x$ and $S^*_y$, the audio signals may be summed (and/or combined in any other way) to generate a waveform 1032. Using the waveform 1032, an envelope of the waveform 1034 may be generated. Using the envelope of the waveform 1034, a low point 1028 may be identified corresponding to a point with a relatively lower energy level when the audio signals from the two segments $S_x$ and $S^*_y$ are combined. The low point 1028 may therefore be used to identify a join point within the joined segment 1026 to create the extended audio track 1030.

Aspects of the above-described systems and methods for creating an extended track enable several novel features.

For example, rather than downloading a 3-hour long audio track (or streaming an audio track for 3 hours), a user device can instead download a 15 minute track and use one or more aspects of the above-described track extension methods to extend the 15 minute track to a full 3 hours of playback while offline.

In another example, in some embodiments, a track could be extended for a very long duration of time (e.g., several hours, several days, weeks, months, or even perpetually) using the above described track extension methods and/or combinations of features of the above described track extension features. In operation, the track could be extended for a very long duration of time by continuing to apply method 800 in an ongoing manner by repeating steps 814 through 820. For example, after segmenting a track, individual segments could be joined together (perhaps in order or in a randomized manner) and played back, with further joining before the playback is complete, ad infinitum, until the system receives an instruction from the user to stop playing the track.

In some embodiments, characteristics of the track could change throughout the day based on the time of day and/or sensor inputs. For example, an extended track could morph over time from sleep-oriented audio at night, to focus-oriented audio during the day, to relax-oriented audio during the evening, and so on. Transitioning the track between different oriented audio could be based on, for example, the time of day, one or more biometric sensors (e.g., on a smartwatch or similar), one or more message(s) from a user's computing device indicating that the user is at work, message(s) from other computing devices or systems indicating that a user is home (e.g., location-based notifications), configured user preferences that personalize when and where the user desires certain types of audio. For example, a biometric sensor on a user's smartwatch can indicate whether the user is active, resting, or sleeping. And the system can transition the track between different oriented audio to match the user's current state (e.g. active, resting, sleeping, and so on), or to respond when the user's state changes. For example, biosensor data may track a user's stage of sleep, and transition the characteristics of the segments being used when the sleep stage changes. In another example, location-based information may be used to transition the track by, for example, transitioning the audio to focus-oriented audio when the user is at a location where the user typically works, transitioning the track to relaxation-oriented audio when the user is at a location where the user typically relaxes, and transitioning the track to sleep-oriented audio when the user is at a location where the user typically sleeps.

In some embodiments, a user may "lock in" a current orientation of audio for a duration of time requested by the user or indicated by sensor inputs. For example, when the track is transitioning to (or has transitioned to) audio that the user feels will work well for their current task, the user can indicate (e.g., in input via a graphical user interface or a voice command via a microphone interface) a desire to keep the audio consistent with its current musical and/or aural characteristics for a specific duration of time (30/60/90 minutes or some other duration of time) or until the user later indicates a desire for the musical and/or aural characteristics to change. In another example, if the user is trying to focus, and biosensor data indicates they achieved increased focus in the last minute, then the music heard in the last minute may be prioritized (up-weighted) in the segment selection process going forward.

While the musical and/or aural characteristics are "locked in," the system implements the track extension methods described herein in a more focused manner to ensure that segments selected from the track (and/or segments selected from other tracks) are perhaps more consistent with the current musical and/or aural characteristics than they might otherwise be. In some embodiments, implementing track extension in this more focused manner may include one or more of (i) increasing the weightings of candidate segments and/or tracks that have the same or substantially similar musical and/or aural characteristics as the currently playing track or segment in the block 816 step of identifying segments to be joined, and/or (ii) eliminating any tracks or segments from the block 816 step that have musical and/or aural characteristics that deviate from the musical and/or aural characteristics of the currently playing track or segment by more than a threshold amount. By increasing the weighting of certain candidate segments and/or tracks and removing some tracks and/or segments from the pool of candidate segments altogether, the block 816 step of identifying segments to be joined while the system is operating pursuant to a "lock in" command from the user increases the likelihood that the segments identified for joining will be consistent with the musical and/or aural characteristics of the currently playing track or segment as requested by the user.

D. NON-AUDITORY NEUROSTIMULATION AND METHODS FOR ANESTHESIA RECOVERY

Techniques for neural stimulation through audio and/or non-audio stimulation are additionally disclosed. The techniques may be performed by a processing device and may include receiving an audio signal from an audio source and receiving a desired mental state for a user. An element of the audio signal that contains modulation characteristics corresponding to the desired mental state may be identified. An acoustic envelope of the element may be determined. One or more signals may be generated based on at least a rate and phase of the envelope. The one or more signals may be transmitted to one or more non-audio output devices to generate one or more non-audio outputs. The non-audio outputs may occur concurrently with audio outputs. A relative timing of the one or more non-audio outputs and an output of the audio signal may be coordinated using one or more of predetermined models and/or sensor data.

The neural stimulation of a patient through audio and/or non-audio stimulation may assist the patient before, during, and after anesthesia is administered to the patient. One method may include administering rhythmic stimulation having a sedative effect prior to administration of the anesthesia to the patient. Another method may include administering rhythmic stimulation having a stimulative effect after administration of the anesthesia has concluded. The rhythmic stimulation may include (i) one or more audio outputs generated by one or more audio playback devices that minimize the audio's impact on a patient's situational awareness and provides audible sound only to the patient via a limited sound field or headphones, and/or (ii) one or more non-audio outputs generated by non-audio stimulation devices. The one or more audio playback devices may include, for example, one or more of bone-conduction headphones, audio headphones, and audio speakers (e.g., passive speakers, smart speakers, etc.). The one or more non-audio stimulation devices may include, for example, one or more wearables, a connected vibrating bed, an electrical brain-stimulation device, and one or more lights. The modifying may occur while the patient is conscious or unconscious, and may be performed by one or more of a manual selection by a caregiver or an automatic selection based on one or more sensors. One or more characteristics of the rhythmic stimulation may be adjusted via (i) manual input by the patient and/or a caregiver, and/or (ii) automatic input based on one or more sensors. The one or more characteristics may include, for example, gain and modulation depth.

i. Overview

The present disclosure additionally describes systems, methods, apparatuses and non-transitory computer executable media configured to generate multimodal stimulation (e.g., with multiple input channels to the body and/or the brain) targeted to affect a desired mental state for a user. As described below, models and/or sensor data may be used to guide stimulation parameters and to find audio features conducive to producing a desired mental state, and transferring such features to either a stimulus in another sensory modality (e.g., touch/vibration, light/vision, taste/chemoreception, smell/olfaction, temperature), or a stimulating signal (electrical or magnetic stimulation).

Non-audio modulation may be created to enforce audio modulation at a particular rate (e.g., to target a particular mental state), even if the audio contains modulation energy at many rates. The relative phase (timing/delay) of modulation across the modalities may be a factor. The combined effect on the brain of the multimodal stimulation (e.g., auditory and non-auditory) may be adjusted by changing aspects of the non-audio modulation, such as phase (i.e., relative to the audio modulation), waveform shape, rate and/or depth. This may increase the entrainment due to multimodal stimulation if desired.

In various examples described herein, neurostimulation may be delivered by a non-audio signal in combination with an audio signal. According to such examples, the non-audio signal may be based on the audio signal such that both the non-audio signal and the audio signal produce the same desired mental state. The non-audio signal may affect the brain differently than the audio signal, and delivery of both the non-audio and audio signals concurrently may affect the brain differently than would delivery of either signal alone. The combination of signals may be more effective than either signal alone at producing or sustaining a mental state in the user.

Further, a use of audio and/or non-audio neurostimulation for recovery from anesthesia is described herein. In particular, a procedure is described that outlines a process for using audio and/or non-audio stimulation to initiate cognition after anesthesia is administered. This stimulation may be delivered, for example, through audio using traditional headphones/speakers, non-auditory sensory modalities (e.g., light, touch), and/or non-sensory neural stimulation (e.g., transcranial direct-current stimulation).

Modulation characteristics of signals may include depth of modulation at a certain rate, the rate itself, modulation depth across all rates (i.e., the modulation spectrum), phase at a rate, among others. These modulation characteristics may be from a broadband portion of a signal or in sub-bands (e.g., frequency regions, such as bass vs. treble) of the signal. Audio/audio element, as used herein, may refer to a single audio element (e.g., a single digital file), an audio feed (either analog or digital) from a received signal, or a live recording. Modulation characteristics may exist in a non-audio signal, for example the output of a flashing light may be described in terms of modulation rate, depth, phase, waveshape, and other modulation characteristics. Fluctuations in intensity over time of sensory (sound, light) and non-sensory (electrical current, magnetic field strength) signals can be quantified in this way.

In various exemplary embodiments described herein, the presently disclosed techniques may be effective to affect a desired mental state when audio stimulation is provided at predetermined frequencies, which are associated with known portions of the cochlea of the human ear and may be referenced in terms of the cochlea, or in terms of absolute frequency. Furthermore, the presently disclosed techniques may provide for a selection of modulation characteristics configured to target different patterns of brain activity. These aspects are subsequently described in detail.

In various exemplary embodiments described herein, audio and/or non-audio stimulation may be generated to change over time according to a stimulation protocol to affect patterns of neural activity in the brain to affect mental state, behavior, and/or mood. Modulation may be added to audio (e.g., mixed) which may in turn be stored and retrieved for playback at a later time. Modulation may be added (e.g., mixed) to audio for immediate (e.g., real-time) playback. Modulated audio playback may be facilitated from a playback device (e.g., smart speaker, headphone, portable device, computer, etc.) and may be single or multi-channel audio. Users may facilitate the playback of the modulated audio through, for example, an interface on a processing device (e.g., smartphone, computer, etc.).

In various examples described herein, audio may also be analyzed, and this analysis may be used to generate non-audio stimulation which may be delivered by one or more non-audio stimulation devices. These aspects are subsequently described in more detail below.

The present disclosure will now be described more fully hereinafter with reference to the accompanying drawings, which form a part hereof, and which show, by way of non-limiting illustration, certain examples. Subject matter may, however, be described in a variety of different forms and, therefore, covered or claimed subject matter is intended to be construed as not being limited to any examples set forth herein. Among other things, subject matter may be described as methods, devices, components, or systems. Accordingly, examples may take the form of hardware, software, firmware or any combination thereof (other than software per se). The following detailed description is, therefore, not intended to be taken in a limiting sense.

Methods described herein, including those with reference to one or more flowcharts, may be performed by one or more processing devices (e.g., smartphone, computer, playback device, etc.). The methods may include one or more operations, functions, or actions as illustrated in one or more blocks. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation. Dashed lines may represent optional and/or alternative steps.

ii. Example Multimodal Stimulation System

Neuromodulation via brain entrainment to a rhythmic stimulus may be more effective if several inputs to the brain are being utilized simultaneously. However, cross-sensory stimulus pairs may have different physical transmission and physiological transduction times, which may result in discrepancies in relative processing latencies in the order of tens of milliseconds. The brain may then perform "temporal recalibration" to make the perceptions coherent, but the neural bases of such operations are only recently being uncovered. Nonetheless, a phase/time difference between inputs may change the entrainment effect on the brain.

Therefore, the modulation parameters in the multiple inputs should be coordinated to produce maximum effect by their combination. For example, since light travels faster than sound, and since the optical pathway in the brain is more direct to the cortex than the auditory pathway in the brain, it is known that a flashing light should precede a modulated sound in phase, to have both signals coincide (be phase aligned) in the cortex.

Figure 11:
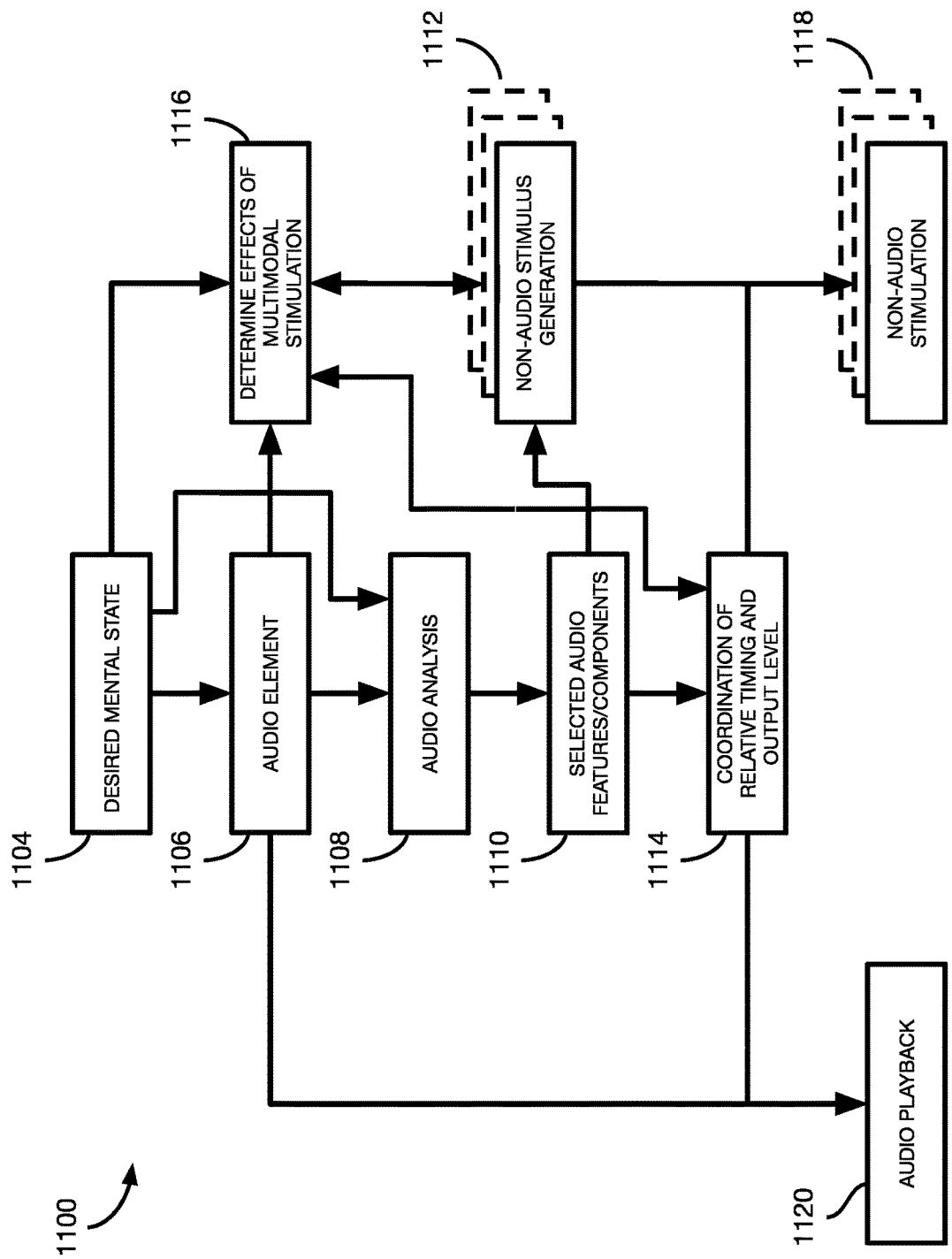
FIG. 11 depicts a flow diagram of an illustrative method for coordinating modulation in multiple input modalities to the central nervous system, according to an exemplary embodiment.

FIG. 11 depicts a flowchart illustrating an example method 1100 for coordinating modulation across multiple input modalities to the central nervous system to effectively induce and/or modify mental states by noninvasive brain stimulation. The method 1100 may include one or more operations, functions, or actions as illustrated in one or more blocks 1104-1120. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation. The method 1100 may be implemented by one or more processing devices such as the processing device of FIG. 17 and/or the one or more processing devices shown in FIG. 18. The method 1100 may increase the combined effect of the multiple input modalities on entrainment to produce a desired mental state for a user. In addition, combining audio and non-audio stimulation may be used to increase the neuromodulation effect beyond upper limits of what would be acceptable (e.g., aesthetically or physiologically) to a user for a single stimulation modality (e.g., audio). Once the input modalities (i.e., locations on the body and thus transmission latencies to the brain) are identified, predetermined and/or dynamic phase parameters may be used to coordinate the time of arrival of the signals to the brain.

Figure 17:
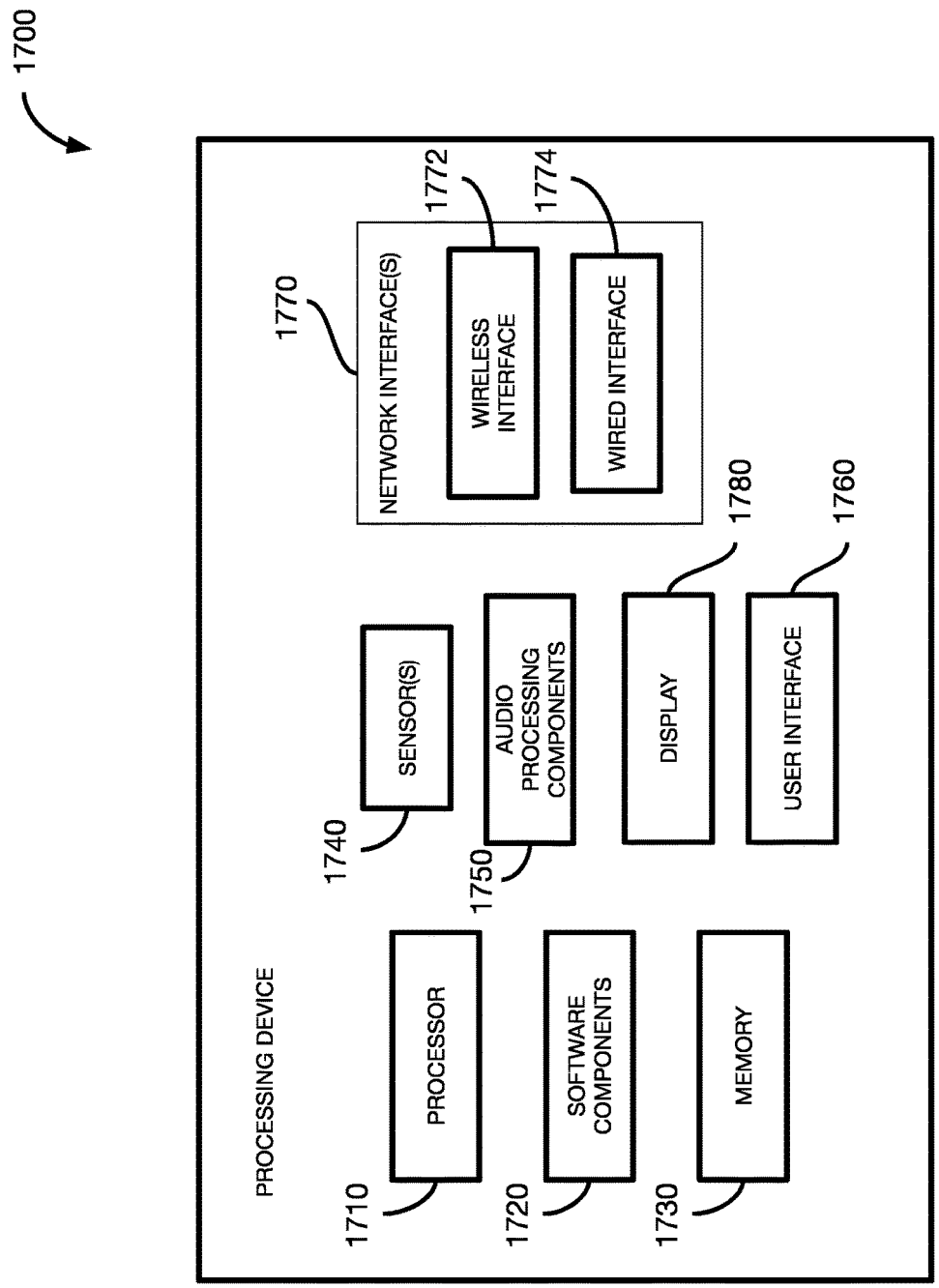
FIG. 17 depicts a functional block diagram of a processing device according to example embodiments of the present disclosure.

The method 1100 may be initiated on a processing device such as, for example, the processing device of FIG. 17, which may include one or more of a smartphone, laptop, computer, playback device, etc. In block 1104, an indication of a desired mental state of a user is received at the processing device. The desired mental state may be selected explicitly (e.g. by the user) or may be selected automatically based on one or more parameters (e.g., an application that infers that a user wants to go to sleep due to the time of day, etc.). Non-limiting examples of a desired mental state may include focus, relax, sleep, and meditate. Each of these example desired mental states may be further distinguished by a target activity and duration. For example, focus may be distinguished by deep work, creative flow, study and read, and light work; relax may be distinguished by chill, recharge, destress, and unwind; sleep may be distinguished by deep sleep, guided sleep, sleep and wake, and wind down; and meditate may be distinguished by unguided and guided. The duration of the mental state may be specified, for example, by a time duration (e.g., minutes, hours, etc.), or a duration triggered by an event (e.g., waking, etc.). The indication may be received via a user interface on a processing device such as, for example, through an interface on the brain.fm™ application executing on an iPhone™ or Android™ device. Alternatively and/or additionally, the indication may be received over a network from a different processing device.

In block 1106, an audio element is received at the processing device from an audio source. The audio element may be selected by the user and/or the processing device. The desired mental state (e.g., received in block 1104) may be used in the selection of the audio element. Additionally and/or alternatively, the audio element may be created with reference to the desired mental state and/or for other reasons (e.g., entertainment). The audio element may be, for example, a digital audio file retrieved by the processing device from local storage on the processing device or from remote storage on a connected device. In an example, the digital audio file is streamed to the processing device from a connected device such as a cloud server for an online music service (e.g., Spotify, Apple Music, etc.). In another example, the audio element may be received by the processing device from an audio input such as a microphone. The audio source can include, for example, an audio signal, digital music file, musical instrument, or environmental sounds. The audio element can be in the form of one or more audio elements read from a storage medium, such as, for example, an MP3 or WAV file, received as an analog signal, generated by a synthesizer or other signal generator, or recorded by one or more microphones or instrument transducers, etc. The audio elements may be embodied as a digital music file (.mp3, .wav, .flac, among others) representing sound pressure values, but could also be a data file read by other software which contains parameters or instructions for sound synthesis, rather than a representation of sound itself. The audio elements may be individual instruments in a musical composition, groups of instruments (bussed outputs), but could also be engineered objects such as frequency sub-bands (e.g., bass frequencies vs treble frequencies). The content of the audio elements may include music, but also non music such as environmental sounds (wind, water, cafe noise, and so on), or any sound signal such as a microphone input.

In an example embodiment, to achieve better brain stimulation, a wide variety of audio elements may be used, which may span different or complementary portions of the audio frequency spectrum, or cover a broad range of the spectrum. Accordingly, the audio elements may be selected such that they have a wide (i.e., broadband) spectral audio profile—in other words, the audio elements can be selected such that they include many frequency components. For example, the audio elements may be selected from music composed from many instruments with timbre that produces overtones across the entire range of human hearing (e.g., 20-20 kHz).

In block 1108, the received audio may be analyzed to identify and/or determine one or more features/characteristics of the audio element. One or more aspects of block 1108 are further discussed with respect to FIG. 12.

In block 1110, features/components of the received audio that are identified and/or determined are extracted from the audio signal. The features/components may be simple (e.g., beat markers) or they may be more complex (e.g., extracted instruments, sub-band envelopes, modulation spectra, etc.).

In blocks 1112, non-audio stimulus for use in one or more non-audio stimulation devices may be generated using the extracted audio features/components. This process may use information such as the type and/or location of each of the one or more non-audio stimulation devices and the desired mental state to generate the non-audio stimulus. This information may be either determined implicitly (e.g., from received audio features) or received explicitly (e.g., from the user or program). Information about the desired mental state may be used to guide non-audio stimulus generation. For example, if the desired mental state is sleep, the shape of a tactile waveform may be adjusted to be more soothing than a tactile stimulus for exercise. Many non-audio stimulus types may be created and used together with or without the original audio.

In block 1114, relative timing (e.g., phase of modulation across modalities) and output level across the multiple stimuli may be coordinated. The relative timing may be based on, at least, location/position information of the one or more non-audio stimulation devices and/or the one or more audio playback devices. For example, a phase shift applied to a vibration device on a user's ankle may be greater than a phase shift applied to a similar device on the head based on how long the stimulus from the vibration device takes to reach the cortex. In addition, waveform shape and/or other signal parameters may be different from audio based on the non-audio stimulation device and sensory modality. For example, an envelope of an audio signal may be extracted and/or determined. The envelope may follow the music, or it may be shaped by one or more instruments' attack sustain decay release (ASDR) envelope. A waveform shape most effective on the non-audio modality may be different (e.g., triangle wave, sawtooth, etc.) than what is effective for an audio modality. In some examples, it may be beneficial to follow the timing of the audio modulation without exactly copying the shape of the envelope/waveform.

In block 1116, a determination of effects of multimodal stimulation may be used to determine and/or adjust the relative timing of block 1114. The determination may be based on, for example, one or more of a model/rules or sensor data. In an example, the model/rules of the effects of multimodal stimulation may be simple. For example, a model/rules may include ensuring rhythmic stimuli are synchronized by penalizing for more rather than less peaks (local envelope maxima). In another example, the model/rules may be complex. For example, the model/rules may be based on a research-based brain model of neural oscillations with effects of stimulus history or memory.

In another example, sensor data may be used in addition to or as a replacement of a model as long as the sensor data value is a truthful indicator (even indirectly) of the desired mental state (and thus can be used to guide the coordinating of the multiple stimulation signals). One difference from a model is that in the case of sensor data the parameter optimization process may need to prioritize smoothness and efficiency, so as not to have the stimulus jump around in parameter space. This might produce context effects in human listeners that are not desirable. The sensor data may be, for example, biosensor data (e.g., heart rate, blood pressure, breathing) or it may be transformed or combined sensor data estimating mental states (e.g., stress score, focus estimates).

Through analysis of sensor data at block 1116, coordination between the different stimulation signals and the properties of the non-audio stimulation may be optimized. For example, brainwave states may be determined via one or more of electroencephalogram (EEG) and magnetoencephalogram (MEG) data and modulation characteristics of the non-audio stimulus may be adjusted, including phase shift relative to the audio, but also waveform shapes, amplitudes, etc. across different stimulating modalities to have a desired impact on the brain. Varying the modulation characteristics of non-audio stimulation according to sensor data in addition to or instead of audio may enable the dynamic variation of only the non-audio modality to avoid disrupting aesthetics of music. Carrier frequencies in the non-audio modality (tactile carrier frequencies, or colors of light) may also be varied.

The output of block 1116 may be feedback (e.g., error/control signals) provided to one or more of blocks 1112 and block 1114 (e.g., from a single value of an estimated effect to simulated EEG data). The feedback error/control signals may be used to modify timing and/or non-audio stimulus parameters. Solving for the desired model output (based on desired mental state) may be done with one or more machine learning (ML) methods such as gradient descent.

In blocks 1118, non-audio stimulus may be generated by the one or more non-audio stimulation devices and delivered to the user. The one or more non-audio stimulation devices may be any type of device that delivers non-audio stimulation to a user. For example, the one or more non-audio stimulation devices may include a wearable device that provides vibrotactile stimulation (e.g., on a wrist or ankle), a chair, bed, or other active furniture, brightness modulation of a screen, a transcranial electrical current stimulation device, and a one or more lights for photo-stimulation.

In block 1120, audio stimulus may be generated by one or more audio devices and delivered to the user via an audio playback device. It should be noted that blocks 1118 and 1120 may be used concurrently (i.e., multimodal entrainment), block 1118 may be used without block 1120 (i.e., unimodal non-audio entrainment), and block 1120 may be used without block 1118 (i.e., unimodal audio entrainment). The flexibility of turning on and off either modality provides a number of benefits for users. For example, a user may wear a vibrating wristband synced to an audio output and may be able to mute the audio temporarily but still get an ongoing benefit of the tactile modulation.

Figure 12:
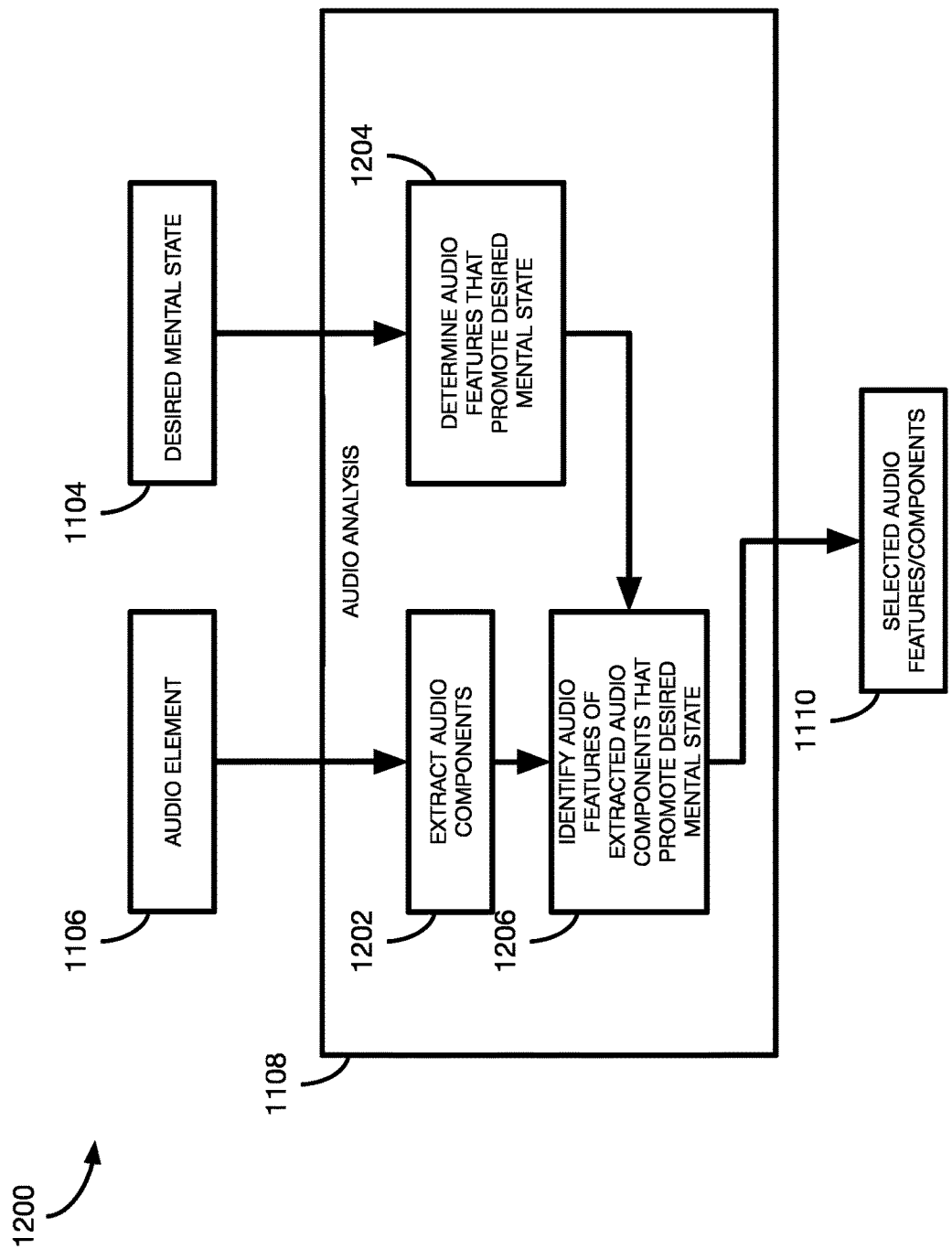
FIG. 12 depicts a flow diagram illustrating details of an audio analysis, according to an exemplary embodiment.

FIG. 12 depicts an example flowchart 1200 illustrating details of the audio analysis performed in block 1108 and may include one or more additional steps. At block 1202, one or more audio components are extracted from the received audio element 1106. These audio components may include frequency sub-bands, instruments (e.g., extracted from a mix), or any other part which may be separated out from the audio, or feature extracted from the audio.

At block 1204, one or more audio features that promote the desired mental state may be determined. These one or more audio features may be based on a user model that may prescribe regions in the modulation-characteristic space that are most effective for a desired mental state. The user model may define predicted efficacy of music as a function of dimensions such as modulation rate, modulation depth, audio brightness, audio complexity, or other audio features. The user model may be based on prior research that relates modulation characteristics to mental states. For example, if the user says they have ADHD and are of a particular age and gender, then the user model may incorporate this information to determine desired modulation characteristics for a particular target mental state of the user. The determination may, for example, be based on a stored table or function which is based on prior research about ADHD (e.g., users with ADHD require a relatively high modulation depth). Another non-limiting example for defining and/or modifying a user model may be based on reference tracks and ratings provided by a user. The reference tracks may be analyzed to determine their modulation characteristics. The determined modulation characteristics along with the ratings of those tracks may be used to define or modify the user model.

In an example, the user model may be updated over time to reflect learning about the user. The user model may also incorporate an analysis of various audio tracks that have been rated (e.g., {for effectiveness {focus, energy, persistence, accuracy}, or satisfaction}, positively or negatively). The inputs to generate a user model may include ratings (e.g., scalar (X stars), binary (thumbs up/down)), audio characteristics (e.g., modulation characteristics, brightness, etc.) For example, a user known to have ADHD may initially have a user model indicating that the target audio should have higher modulation depth than that of an average target track. If a user subsequently provides a reference track with a positive indication, and it is determined that the reference track has a low modulation depth (e.g., 0.2 out of 1), then the target modulation depth may be updated in the user model (e.g., to an estimate that a low depth is optimal). If the user subsequently provides three more reference tracks with positive indications, and it is determined that the tracks have modulation depths of 0.8, 0.7, and 0.9, then the target modulation depth may be further updated in the user model (e.g., reverting to an estimate that a high depth is optimal). In this example, the user model represents estimated effectiveness as a function of modulation depths from 0-1.

The user model may predict ratings over the modulation characteristic space. For example, if each input track is a point in high-dimensional space (e.g., feature values) each of which has been assigned a color from blue to red (e.g., corresponding to rating values); then the prediction of ratings may be determined by interpolating across known values (e.g., target input tracks) to estimate a heatmap representation of the entire space. In another example, regions of the space may be predicted to contain the highest rating values via linear regression (i.e., if the relationships are simple) or machine learning techniques (e.g., using classifiers, etc.).

The user model may be distinctive both in terms of the features used (e.g., modulation features relevant to effects on the brain and performance, rather than just musical features relevant to aesthetics) and in terms of the ratings, which may be based on effectiveness to achieve a desired mental state such as, for example, productivity, focus, relaxation, etc. rather than just enjoyment.

The user model may be treated like a single reference input track if the output to the comparison is a single point in the feature space (e.g., as a "target") to summarize the user model. This may be done by predicting the point in the feature space that should give the highest ratings and ignoring the rest of the feature space. In this case the process surrounding the user model may not change.

In some examples, a user model may not be required. For example, if multiple reference tracks and ratings are provided as input, the processing device may forgo summarizing them as a model and instead work directly off this provided data. For example, each library track may be scored (e.g., predicted rating) based on its distance from the rated tracks (e.g., weighted by rating; being close to a poorly rated track is bad, etc.). This may have a similar outcome as building a user model but does not explicitly require a user model.

In an example where only one reference track is used as input, it may be desirable to forgo a user model altogether, and directly compare the reference track to one or more target tracks. This is similar to a user model based only on the one reference track. If the reference track and the one or more target tracks are compared directly, they may be represented in the same dimensional space. Thus, the audio analysis applied to the reference track should result in an output representation that has the same dimensions as the audio analysis that is applied to the one or more target tracks.

In block 1206, the one or more audio features may be identified from the extracted audio components. For example, it might be known (via user model or not) that modulations in the range $\leq 1$ Hz, with a particular waveform and depth, are most effective for inducing sleep. Given a user's goal of wanting to sleep (block 1104), the determination is made in block 1204 to use modulation rates of $\leq 1$ Hz of a particular waveform and depth. In block 1206 the system searches for which audio components extracted from the audio element (block 1106) best match the modulation properties targeted by block 1204. The audio features that contain modulation may include the envelope of the audio waveform of the broadband or sub-band signals or other audio parameters. For example, modulation may be calculated in RMS (root mean square energy in signal); loudness (based on perceptual transform); event density (complexity/business); spectrum/spectral envelope/brightness; temporal envelope ('out-line' of signal); cepstrum (spectrum of spectrum); chromagram (what pitches dominate); flux (change over time); autocorrelation (self-similarity as a function of lag); amplitude modulation spectrum (how is energy distributed over temporal modulation rates); spectral modulation spectrum (how is energy distributed over spectral modulation rates); attack and decay (rise/fall time of audio events); roughness (more spectral peaks close together is rougher; beating in the ear); harmonicity/inharmonicity (related to roughness but calculated differently); and/or zero crossings (sparseness). Extraction of these features may be performed, for example, as multi-timescale analysis (different window lengths); analysis of features over time (segment-by-segment); broadband or within frequency sub-bands (i.e., after filtering); and/or second order relationships (e.g., flux of cepstrum, autocorrelation of flux).

In an example case, the desired mental state (block 1104) might be Focus, and this might be determined (block 1204) to require modulation rates of 12-20 Hz with a peaked waveform shape. The input audio element (block 1106) is decomposed into audio components (block 1202) including sub-band envelopes, cepstra, and other features; in this example case, among these components there is a particular high-frequency sub-band's envelope which contains modulation energy with a strong component at 14 Hz. This audio component is identified in block 1206 and is then used to create the non-audio stimulation. The output of block 1206 may be the selected audio features/components of block 1110.

Figure 13:
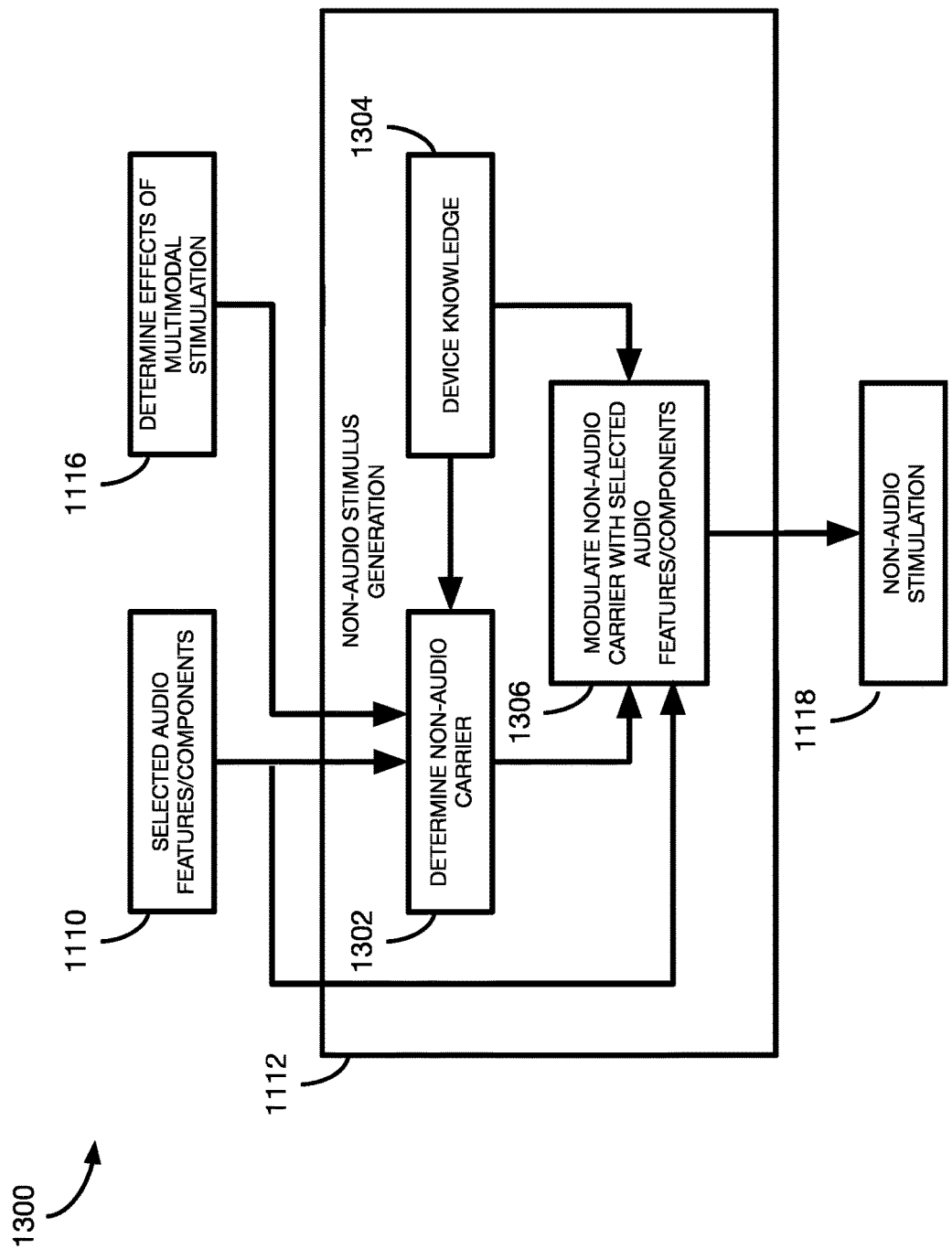
FIG. 13 depicts a flow diagram illustrating details of a generation of non-audio stimulus, according to an exemplary embodiment.

FIG. 13 depicts an example flowchart 1300 illustrating details of the generation of non-audio stimuli performed in block 1112. The selected audio features/components of block 1110 can be one input to block 1112. Another input to block 1112 can be feedback (e.g., error/control signals) provided to block 1112 and may be simple or complex (e.g., from a single value of an estimated effect to simulated EEG data). The feedback error/control signals may be used to modify timing and or non-audio stimulus parameters.

In block 1302, a non-audio carrier may be determined based on one or more of device information from block 1304, the selected audio features/components of block 1110, and feedback from block 1116. For example, if the non-audio stimulation device is a haptic wristband and the extracted audio features are rapid modulations, when determining the non-audio carrier (block 1302), there may be constraints on the range of vibratory frequencies which should be used by the wristband to carry the modulations extracted from the audio (e.g., based on the rate of modulation, waveshape, and/or other factors). Further, the range of modulated frequencies may be modified based on a determination of the effects of the multimodal stimulation (block 1116). In block 1306, the non-audio carrier may be modulated with the selected audio features/components (block 1110) to produce a signal that may be transmitted to a non-audio stimulation device which generates non-audio stimulation from the signal (block 118).

In an example, the audio analysis performed in block 1108 of the audio element received in block 1106 may identify characteristics that promote a desired mental state in block 1204 (e.g., focus) in a high-frequency sub-band envelope as shown in FIG. 12. For example, very regular and pronounced 16 Hz envelope modulations (desirable for a focused mental state) may have been found in a particular high-frequency sub-band due to a fast bright instrument (e.g., hi-hat). These 16 Hz envelope modulations may comprise the selected audio features/components 1110.

In an example, a low-frequency (e.g., 30-300 Hz) sub-band of the same audio element may be determined to be the non-audio carrier determined in block 1302. In another example, block 1302 may include the generation of a non-audio carrier. For example, the non-audio carrier may be one or more stable vibration rates tuned to a sensitivity of the relevant region of the body, or may be a shifting vibrational rate that follows the dominant pitch in the music. Information about the one or more non-audio devices in block 1304 may be used to generate an effective output signal. In an example, a tactile device (e.g., vibrating wristband) may be known to work well between 30 Hz and 300 Hz, so the non-audio stimulus may be created within this passband.

In an example, different portions of audio frequency may be mapped to different outputs in the non-audio sensory modality. For example, modulation in high frequencies versus low frequencies may be mapped to different parts of the visual field (which would stimulate left vs right hemispheres selectively), or wrist vs ankle stimulation. There often many modulation rates in a piece of audio. In music used primarily for entrainment this may be deliberate (e.g., to target relax and sleep rates simultaneously). This characteristic may be transferred to the non-audio modality either by combining the rates into a complex waveform or by delivering the different rates to different sub-regions of the non-audio modality (e.g., visual field areas, wrist vs ankle, etc.).

Instead of the non-audio signal simply following the audio envelope, desired modulation rates may be extracted and/or determined from the audio envelope and used to generate the non-audio stimulus. For example, a piece of audio may be complex music with added modulation at 16 Hz for focus. The audio envelope from the selected audio features/components of block 1110 may have a strong 16 Hz component but will also contain other aspects of the audio. The system may determine that 16 Hz is the dominant modulation rate and drive non-audio stimulation with a 16 Hz simple wave (e.g., sine, square, etc.). Multiple modulation rates may be extracted and/or determined from the audio, for example, in separate frequency bands or the same frequency band (i.e., by decomposition of cochlear envelopes).

In contrast to existing systems that analyze audio and produce non-audio stimulation (e.g., music visualizers), the system does not aim to match the music in every aspect. Instead, regular rhythmic stimulus may be generated to drive entrainment at a particular modulation rate. While the phase of the modulation must be tightly controlled across the two sensory modalities, the signals themselves may be quite different. For example, tactile stimulation may be generated by modulating a carrier such as a low frequency suitable for tactile stimulation (e.g., 70 Hz) by the entraining waveform (e.g., a 12 Hz triangle wave phase-locked to the 12 Hz component in the audio envelope). In another example, the non-audio modality may not be directly driven by the cycle-by-cycle amplitude of the audio, but instead the system may find the desired rate and phase of modulation in the audio, align the non-audio signal to it, and drive the brain strongly at that rate regardless of the audio. For example, "weak" beats in audio may be ignored in favor of having the non-audio signal stimulate to a regular amplitude on each cycle.

Perceptual coherence (i.e., information from the different senses represents the same event in the world) may be improved by using low frequencies in the music, or subharmonics of the dominant fundamental frequencies. Perceptual coherence is desirable not only for aesthetic reasons, but also functional reasons (i.e., less distracting to have one thing versus two things going on) and neural reasons (i.e., representation in the brain coincides; likely to enhance entrainment).

Figure 14:
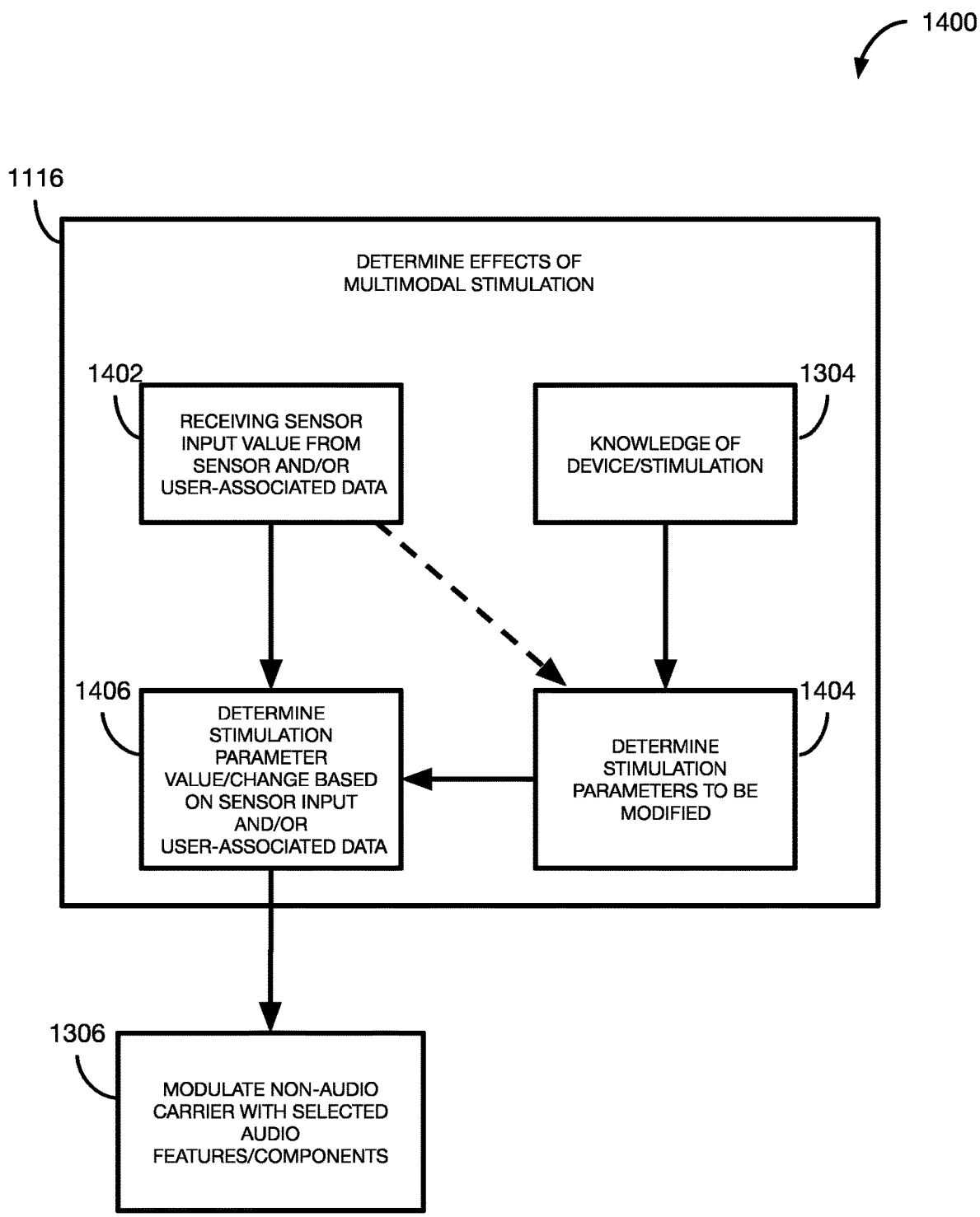
FIG. 14 depicts a flow diagram illustrating details of using sensor data to determine effects of multimodal stimulation, according to an exemplary embodiment.

FIG. 14 depicts a flowchart 1400 illustrating details of an example using sensor data to determine effects of multimodal stimulation as performed in block 1116. In some examples, sensors may inform the system about the user's mental state, brain activity, user behavior, or the like. The sensor data should be responsive to, directly or indirectly, changes in the multimodal stimulation. At block 1402, a sensor-input value may be received from a sensor. The sensor may be on the processing device or it may be on an external device and data from the sensor may be transferred to the processing device. In one example, the sensor on a processing device, such as an accelerometer on a mobile phone, may be used to determine how often the phone is moved and may be a proxy for productivity. In another example, the sensor on an activity tracker (external device), for example an Oura ring or Apple watch, may be used to detect if the user is awake or not, how much they are moving, etc.

In some embodiments, the sensors may be occasional-use sensors responsive to a user associated with the sensor. For example, a user's brain response to the relative timing between light and sound modulation may be measured via one or more of EEG and MEG during an onboarding procedure which may be done per use or at intervals such as once per week or month.

In some embodiments, behavioral/performance testing may be used to calibrate the sensors and/or to compute sensor-input values. For example, a short experiment for each individual to determine which timing across stimulation modalities is best for the user by measuring performance on a task. Similarly, external information may be used to calibrate the sensors and/or to compute sensor-input values. For example, weather, time of day, elevation of the sun at user location, the user's daily cycle/circadian rhythm, and/or location. In an example case, for a user trying to relax, a sensor might read a user's heart rate variability (HRV) as an indicator of arousal/relaxation, and this feedback signal may be used to optimize the parameters of the non-audio stimulus and the coordination of the two stimulation modalities. The external information of the time of day may be taken into account by the algorithm predicting arousal from HRV, in that the relationship between them varies based on time of day. Of course, each of these techniques may be used in combination or separately. A person of ordinary skill in the art would appreciate that these techniques are merely non-limiting examples, and other similar techniques may also be used for calibration of the sensors.

In example embodiments, the sensor-input value may be obtained from one or more sensors such as, for example, an accelerometer (e.g., phone on table registers typing, proxy for productivity); a galvanic skin response (e.g. skin conductance); video (user-facing: eye tracking, state sensing; outward-facing: environment identification, movement tracking); microphone (user-sensing: track typing as proxy for productivity, other self-produced movement; outward-sensing: environmental noise, masking); heart rate monitor (and heart rate variability); blood pressure monitor; body temperature monitor; EEG; MEG (or alternative magnetic-field-based sensing); near infrared (fnirs); or bodily fluid monitors (e.g., blood or saliva for glucose, cortisol, etc.). The one or more sensors may include real-time computation. Non-limiting examples of a real-time sensor computation include: the accelerometer in a phone placed near a keyboard on table registering typing movements as a proxy for productivity; an accelerometer detects movements and reports user started a run (e.g. by using the CMMotionActivity object of Apple's iOS Core ML framework), and microphone detects background noise in a particular frequency band (e.g., HVAC noise concentrated in bass frequencies) and reports higher levels of distracting background noise.

The received sensor-input value may be sampled at predefined time intervals, or upon events, such as the beginning of each track or the beginning of a user session or dynamically on short timescales/real-time: (e.g., monitoring physical activity, interaction with phone/computer, interaction with app, etc.).

In an example embodiment, block 1402 may include receiving user-associated data in addition and/or alternatively to the previously described sensor-input value from the sensor (not shown). Alternatively, the block 1402 may include receiving only the sensor-input value or user-associated data.

In example embodiments, user-associated data may include self-report data such as a direct report or a survey, e.g., ADHD self-report (ASRS survey or similar), autism self-report (AQ or ASSQ surveys or similar), sensitivity to sound (direct questions), genre preference (proxy for sensitivity tolerance), work habits re. music/noise (proxy for sensitivity tolerance), and/or history with a neuromodulation. Self-report data may include time-varying reports such as selecting one's level of relaxation once per minute, leading to dynamic modulation characteristics over time in response. User-associated data may include behavioral data/attributes such as user interests, a user's mental state, emotional state, etc. Such information may be obtained from various sources such as the user's social media profile. User-associated data may include factors external to but related to the user such as the weather at the user's location; the time after sunrise or before sunset at the user's location; the user's location; or whether the user is in a building, outdoors, or a stadium.

At block 1404, one or more parameters of coordination between the multiple stimulation modalities (relative timing/phase, relative power/depth, etc.) and/or parameters of the non-audio stimulation (i.e., modulation-characteristic values such as rate, waveform shape, etc.) may be determined. This determining may be based on the stimulation being provided (audio and/or non-audio) or predetermined based on knowledge of the device and/or stimulation (e.g., from block 1304). For example, in a case where light and sound are being delivered to the user, two determined stimulation parameters in block 1404 might be the relative phase between light and sound modulation, and the depth of light modulation; but in a case where only light is being delivered (uni-modal stimulation), the determined stimulation parameters in block 404 might instead be the depth of light modulation alone. The sensor input used for feedback in block 1402 may also contribute to determining which stimulation parameters should be selected for adjustment by the system. For example, noisy data from a sensor might invalidate the device knowledge from block 1304 as to which stimulation parameters the system expected to use; after receiving real data from the sensor from block 1402, the system may override the determination it would otherwise have made in block 1404. In block 1406, the determined stimulation parameters may be adjusted by the system via a feedback signal. The modified stimulation is delivered to the user which may result in a modified user state and sensor data, and thereby closing a feedback loop.

The mapping of sensor-input values and stimulation parameters may correlate each sensor-input value to a respective stimulation parameter value. For example, in a case where the sensor is an EEG headset measuring neural phase-locking (synchrony, entrainment), and a determined stimulation parameter is phase across light and sound modulation, a mapping may exist which enforces that, if neural entrainment is low, the phase difference between light and sound is shifted (i.e., "increased," but phase is circular so an increase becomes a decrease after 180 degrees). If neural entrainment is high, the phase difference may not be changed as much or at all. Such a mapping may be based on absolute sensor values, on values relative to the user or other users (e.g., zero-mean data, % of max), and/or on changes in values (e.g., time-derivative of sensor data). The mapping may be based on a predetermined or real-time computed map. Non-limiting examples of mappings include: a phone with an accelerometer that detects movement and reports an estimate of user productivity and mapping this productivity estimate to light modulation depth such that the level of non-audio modulation increases if estimated productivity slows down. Other examples exist. The mapping may be stored in a data table as shown in the example below in table 2 or stored as a function, such as, for example, $f(x)=x^2$ where x is the sensor-input value and f(x) is the modulation characteristic value.

TABLE 2

| Sensor input values (Neural Phase-Locking value, power) | Stimulation parameters (shift in phase difference between light and sound modulation, deg/min) |
|---|---|
| 20 | 90 |
| 30 | 80 |
| 40 | 70 |
| 50 | 60 |
| 60 | 50 |
| 70 | 40 |
| 80 | 20 |
| 90 | 10 |
| 100 | 0 |
| 110 | 0 |
| 120 | 0 |
| 130 | 0 |
| 140 | 0 |
| 150 | 0 |
| 160 | 0 |
| 170 | 0 |
| 180 | 0 |
| 190 | 0 |
| 200 | 0 |

In an example, modulation rate (e.g., of all stimulation modalities), phase (i.e., difference between stimulation modalities), depth (i.e., of one or more stimulation modalities, or the relative levels between them), and waveform shape (i.e., of the non-audio stimulation modality) may be four non-exclusive modulation characteristics (i.e., stimulation parameters). Modulation rate may be the speed of the cyclic change in energy, and may be defined, for example, in hertz. Phase is the particular point in the full cycle of modulation, and may be measured, for example, as an angle in degrees or radians. Depth may indicate the degree of amplitude fluctuation in the audio signal. In amplitude modulation, depth may be expressed as a linear percent reduction in signal power or waveform envelope from peak-to-trough, or as the amount of energy at a given modulation rate. Waveform may express the shape of the modulation cycle, such as a sine wave, a triangle wave or some other custom wave. These modulation characteristics may be extracted and/or determined from the broadband signal or from sub-bands after filtering in the audio-frequency domain (e.g., bass vs. treble), by taking measures of the signal power over time or by calculating a waveform envelope (e.g., the Hilbert envelope).

A stimulation protocol may provide one or more of a modulation rate, phase, depth and/or waveform for the modulation to be applied to audio data that may be used to induce neural stimulation or entrainment. Neural stimulation via such a stimulation protocol may be used in conjunction with a cochlear profile to induce different modes of stimulation in a user's brain. A stimulation protocol can be applied to audio and/or non-audio stimulation. For example, a stimulation protocol for modulated light would have the same description as that for audio, describing modulation rate, phase, and depth, over time (only, of illumination/brightness rather than sound energy).

At block 1406, one or more of the relative timing and characteristics of non-audio output may be adjusted based on the one or more stimulation parameter values determined in 1406. The one or more of the relative timing and characteristics of non-audio output may be adjusted by varying one or more of a modulation rate, phase, depth and/or waveform in real-time, at intervals, or upon events, such as the beginning of each track or the beginning of a user session. As described above, the adjustment may be in the form of feedback (e.g., error/control signals) to one or more of block 1112 and block 1114. If some or all of these parameters are described as a stimulation protocol, these adjustments could take the form of modifying the stimulation protocol.

In some embodiments, the neuromodulation via brain entrainment to a rhythmic sensory stimulus described herein, whether unimodal or multimodal, may be used to assist in sleep, to aid in athletic performance, and in medical environments to assist patients undergoing procedures (e.g., anesthesia, giving birth, etc.).

iii. Example Method of Use of Sensory Neuromodulation for Recovery from Anesthesia Induction and emergence from anesthesia may be a difficult process for patients and healthcare workers, and long recovery times may limit the rate of care that may be provided. Difficulties around induction and emergence from general anesthesia are a burden on healthcare workers, and central to a patient's experience. Anxiety prior to a procedure, and confusion upon regaining consciousness, are common experiences that negatively affect both patients and staff. Presurgical anxiety may result in difficulty with intubation and longer presurgical delay periods, burdening nurses and slowing the pace of care. Post surgically, the duration and quality of a patient's recovery from anesthesia affects healthcare providers and patients, both of whom desire to minimize the time spent in the recovery room. Lengthy recovery periods may involve amnesic episodes, delirium, agitation, cognitive dysfunction or other emergence phenomenon, which place strain on patients and staff. Longer recoveries also place strain on the patient's caretaker (e.g., relatives waiting to take them home) and burden the healthcare facility, which may be limited in how quickly procedures may occur based on space available in the recovery area.

Perioperative music has been used effectively to control anxiety and pain associated with surgeries; however, the music is typically selected to be either relaxing or familiar, with no regard for how it drives brain activity. Conventional work has focused on the preoperative period and has not considered how stimulative music might be used to kickstart cognition postoperatively following emergence from anesthesia. As an example, stimulative music may be characterized as audio with a peak (e.g., or local maximum) in modulation energy (e.g., as measured by a modulation spectrum or similar representation) in the range of 12-40 Hz. Typical music does not contain distinct rhythmic events at rates above 12 Hz, and thus does not contain peaks at these higher rates. Examples of stimulative music include music made purposely to drive rhythmic neural activity (e.g., brain entrainment) at these high rates, such as, for example, the tracks Rainbow Nebula and Tropical Rush developed by Brain.fm. Binaural beats (a type of sound therapy that drives neural entrainment but does not contain such modulation in the signal itself) has been proposed for perioperative use, but for relaxation only rather than stimulation. Accordingly, it may be desirable to use the rhythmic stimulation described above for induction and emergence, and/or to provide stimulative music to aid recovery from the unconscious state.

Figure 15:
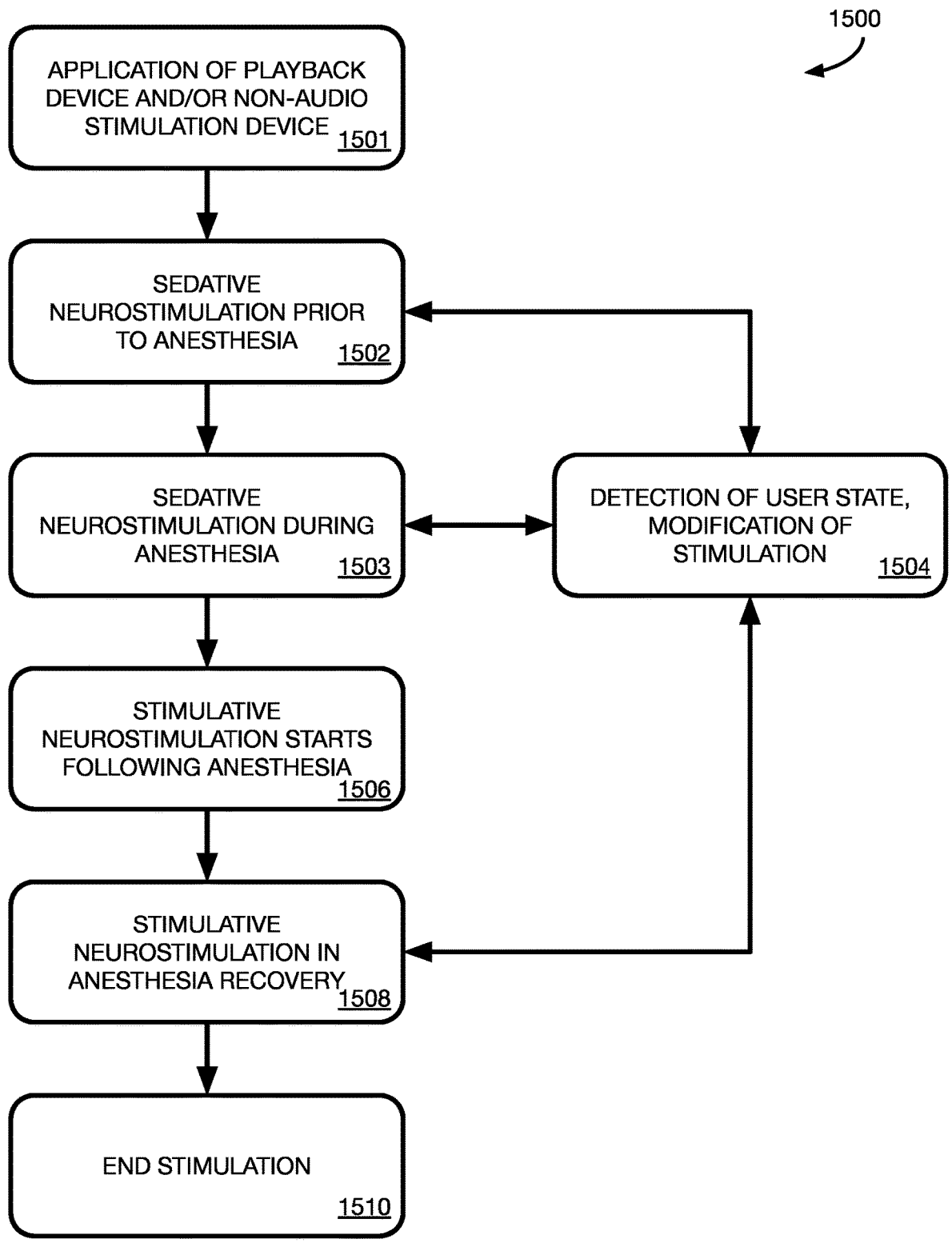
FIG. 15 depicts a flow diagram of an illustrative method for using rhythmic stimulation to improve patient satisfaction and performance before, during, and after anesthesia, according to an exemplary embodiment.

Referring now to FIG. 15, a flowchart illustrating a method 1500 for using rhythmic stimulation to improve patient satisfaction and performance before, during, and after anesthesia is shown. Neuromodulation using rhythmic stimulation may reduce anxiety and improve relaxation during periods of induction and unconsciousness and may speed up emergence and recovery postoperatively.

In an example, one or more pieces of audio may be selected for playback at different points in the anesthesia process for sedative and/or stimulative properties. The audio may be delivered via one or more audio playback devices. In some examples, playback devices that permit a patient to maintain situational awareness while minimizing disturbances for caregivers and fellow patients is desired (e.g., bone-conduction headphones, pass-through headphones, nearfield speakers, etc.). As described above, accompanying non-audio stimulation may be delivered by one or more non-audio output devices (e.g., wearables, connected vibrating bed, lights, etc.) to further benefit the user. Audio and non-audio delivery may be accomplished via the same device, or different devices. Audio and non-audio stimulation files, instructions, programs, or other information needed to generate the stimulation (e.g., .mp3 file) may be stored on the stimulating device, or may be stored on a separate device and transmitted to the stimulation device. In an example, a pair of bone-conduction headphones may be connected and/or contain a memory card with a stimulating music track and a sedative music track. A button on the headphones may switch between the two tracks. Hospital staff may be instructed to press the button once when anesthesia is ceased following surgery and once again after the patient is discharged and returns their headphones. A similar example may use a vibrating wristband instead of headphones.

The audio and/or non-audio stimulation may be performed in sequence with the medical procedure and may be modulated in a desired way. In block 1501, a patient may be provided a personal playback device (e.g., headphones) and/or a non-audio stimulation device (e.g., vibrating wrist band). In block 1502, the patient may be given sedative audio stimulation (and/or non-audio stimulation) prior to administration of anesthesia. In an example, the audio and/or non-audio stimulation may be started just prior (e.g., less than 2 minutes) to administration of intravenous (IV) anesthesia to ensure that the audio and/or non-audio stimulation will be maximally novel and effective while the administration of anesthesia is being started (a highly anxiety-inducing event for many patients). The audio stimulation and/or non-audio stimulation may be modulated as desired. For example, some oscillations may be enforced while others may be dampened using uneven time signatures in music (e.g., 5/4 subdivided as 2-3-2-3). Additionally and/or alternatively, sedative audio and/or non-audio stimulation may also be administered during the procedure (i.e. while anesthesia is being administered) as indicated in block 1503.

In block 1504, one or more characteristics of the audio stimulation and/or non-audio stimulation may be adjusted prior, during, or after the procedure. For example, based on information obtained from one or more sensors, the characteristics of the audio and/or non-audio stimulation may be adjusted.

In block 1506, once the procedure is finished and the administration of the anesthesia (e.g., through an IV) has stopped, the audio stimulation (and/or non-audio stimulation) may be switched to have a stimulative effect to assist in emergence and recovery from the anesthesia.

In block 1508, as the patient recovers from anesthesia, audio and/or non-audio stimulation may continue, which may be responsive to the user's state via sensors (as in the previous stages before and during their procedure as indicated in block 1504). For example, as the user's level of arousal increases, a patient may move more, which may be detected by accelerometers in their headphones; the detection of arousal (e.g., movement) may be a trigger to the stimulation protocol to modify the output (e.g., to decrease the volume level in the headphones so that volume is loudest when the patient is unconscious and less overbearing as the patient becomes aroused.

In block 1510, the audio playback and/or non-audio stimulation may be ended, or the playback device (e.g., headphones) and/or stimulation device may be removed or disabled, when it is determined that the user is conscious and sufficiently recovered from anesthesia. This may be done manually by an operator (e.g., post-anesthesia care nurse, or the patient themselves) or automatically using input data from sensors to detect the patient's state and the playback device and/or non-audio stimulation device.

The one or more characteristics of the audio and/or non-audio stimulation (e.g., gain/depth, modulation, tempo, type of audio) may be modified manually by the patient and/or caregivers (e.g., when a patient is asleep) via, for example, a button and/or device such as a tablet. For example, a caregiver may manually switch the type of the audio and/or non-audio stimulation to stimulative once a procedure is finished.

Additionally or alternatively, the one or more characteristics of the audio and/or non-audio stimulation may be controlled automatically so that it is hands-free for the patient and/or caregiver. The automation may be accomplished using one or more methods, such as geolocation of a patient/device, WiFi, a physical sensor (e.g., in a bed), and an infrared (IR) sensor. These may be housed in the audio and/or non-audio stimulation device, or in separate devices. For example, the audio and/or non-audio stimulation may automatically switch to have a stimulative effect when the patient is unconscious and wake-up is desired (e.g., following cessation of anesthesia). Gain/depth of the audio stimulation may be controlled automatically (e.g., audio may be at its highest volume when a patient is most unconscious and ramps down over time). This may increase the effectiveness of the audio stimulation while a patient is under anesthesia as the brain may have a reduced firing rate and response to auditory stimuli is much weaker. Similar automatic control of the non-audio stimulation may be used, although the gain/depth control may be different for different modalities.

The switch in stimulation type (e.g., from sedative to stimulative) in block 706 may be done by an operator (e.g., the physician), may be based on time, may be based on sensors (e.g., EKG, pulse-ox, breathing rate), and/or triggered by connection to external environment (e.g., location inside the hospital, movement between speaker arrays, etc.). In an example, accelerometer data and/or EEG readings from one or more devices may detect a patient's return to consciousness and the modulation depth and gain of a piece of audio stimulation, or even the type of audio stimulation (e.g., from highly stimulating to more pleasant) may be changed. For example, audio stimulation with high gain/depth may be played when a patient is unconscious. Upon determining that the patient is about to regain consciousness, the audio stimulation may be switched to music that is very low gain/depth and is therefore pleasant, and it may ramp up from there to kickstart cognition.

iv. Example Clinical Study

Using sensory neuromodulation for recovery from anesthesia is being studied in an ongoing clinical study (registered at clinicaltrials.gov, ID NCT05291832) entitled, "A Randomized, Double-Blind, Placebo-Controlled Study to Explore Perioperative Functional Audio for Anxiety and Cognitive Recovery from Propofol Anaesthesia in Patients Undergoing Endoscopic Procedures," and incorporated in U.S. Patent. App. No. 63/268,168, both of which are incorporated by reference herein in their entirety. The study includes a double-blinded randomized controlled trial with 220 patients undergoing elective colonoscopy or endoscopy procedures. The patients are assigned at random to hear either rhythmic auditory stimulation (music) or an active control placebo using spectrally-matched noise (i.e., sound that produces the same levels of activity at the cochlea but not expected to drive neural entrainment). Bone-conduction headphones are used by the patients for playback of the music (or matched noise). The music (or matched noise) is first administered in pre-operation waiting and consists of sedative music (or matched noise) until the propofol administration ceases, at which time the sedative music (or matched noise) will be switched to stimulative music (or matched noise).

Figure 16A:
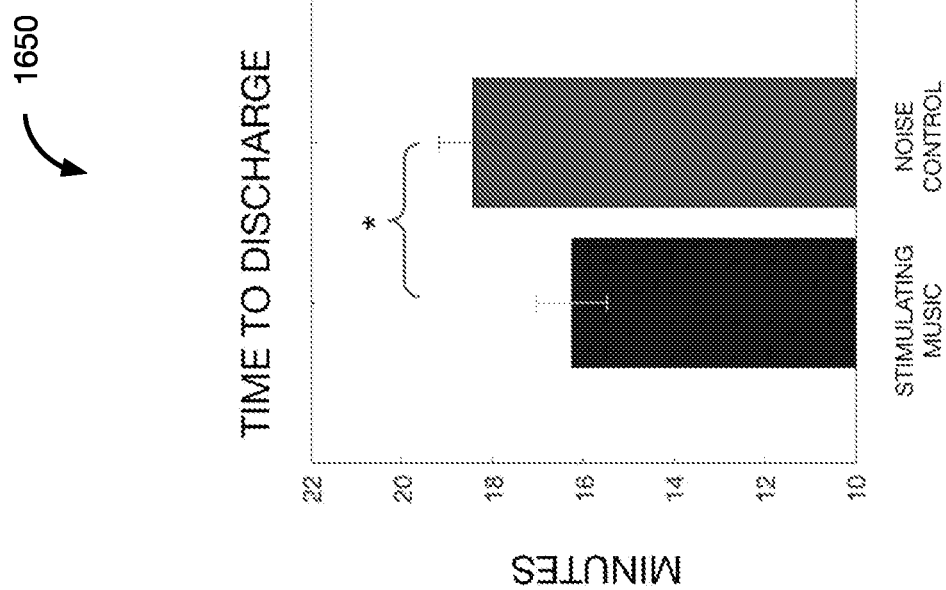
FIG. 16A depicts a plot showing a patient's willingness to recommend audio they received to aid recovery during the emergence from anesthesia to family and friends if undergoing the same procedure, according to an exemplary embodiment.
Figure 16B:
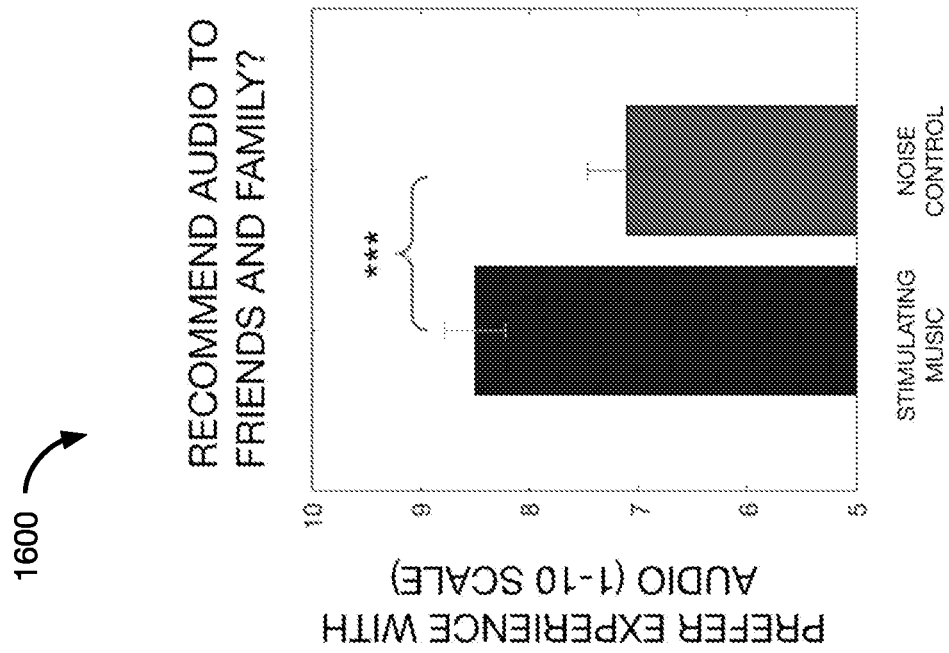
FIG. 16B depicts a plot showing an average time to discharge a patient once the patient is in recovery, according to an exemplary embodiment.

FIGS. 16A and 16B show preliminary results from the clinical study evaluating benefits of using stimulative music to aid recovery during the emergence from anesthesia. As part of the clinical study, participants are provided a survey to evaluate their recovery experience. FIG. 16A is a plot 1600 showing the patient's willingness to recommend the audio they received to family and friends if undergoing the same procedure. On the y-axis of the plot 1600, 10 represents the highest willingness to recommend audio, 5 represents no difference from the standard procedure without audio. As can be seen by the plot 1600, patients who were administered stimulative music to recover from anesthesia were more likely to recommend the procedure with stimulative music over matched noise to their friends and family, and were much more likely to recommend the music over no audio (standard procedure). Statistical analysis with a t-test on these data showed that the results are highly statistically significant (with a 0.2% probability of having occurred by chance).

FIG. 16B is a plot 1650 showing the average time to discharge a patient once they are in recovery (i.e., the time spent in postoperative care). As can be seen by plot 1650, patients who were administered stimulative music to recover from anesthesia spent on average ~13% less time in recovery than those that received matched noise. Statistical analysis with a t-test on these data showed a statistically significant difference (with a <5% probability of having occurred by chance). This result is practically of great importance as recovery time is often one of the biggest limiting factors on the rate of elective surgery at a facility since protocols often require an empty recovery bed prior to initiating a procedure.

Additional examples of the presently described method and device embodiments are suggested according to the structures and techniques described herein. Other non-limiting examples may be configured to operate separately or may be combined in any permutation or combination with any one or more of the other examples provided above or throughout the present disclosure.

E. EXAMPLE DEVICES AND SYSTEMS

FIG. 17 shows a functional block diagram of an example processing device 1700 that can implement any of the previously described methods, including but not limited to method 100 (FIG. 1), method 400 (FIG. 4), method 600 (FIG. 6), process flows 710 (FIG. 7A) and 720 (FIG. 7B), method 800 (FIG. 8), process 900 (FIG. 9), method 1000a (FIG. 10A), method 1000b (FIG. 10B), method 1100 (FIG. 11), method 1200 (FIG. 1200), method 1300 (FIG. 1300), and/or method 1400 (FIG. 1400).

The processing device 1700 includes one or more processors 1710, software components 1720, memory 1730, one or more input sensors 1740, audio processing components (e.g. audio input) 1750, a user interface 1760, a network interface 1770 including wireless interface(s) 1772 and/or wired interface(s) 1774, and a display 1780. The processing device may further include audio amplifier(s) and speaker(s) for audio playback. In one case, the processing device 1700 may not include the speaker(s), but rather a speaker interface for connecting the processing device to external speakers. In another case, the processing device 1700 may include neither the speaker(s) nor the audio amplifier(s), but rather an audio interface for connecting the processing device 1700 to an external audio amplifier or audio-visual playback device. In some embodiments, the processing device may further optionally include non-audio stimulation elements such as, for example, a vibration bed, an electrical brain-stimulation element, one or more lights, etc. In another case, the processing device 1700 may not include non-audio stimulation elements, but rather an interface for connecting the processing device 1700 to an external stimulation device.

In some examples, the one or more processors 1710 include one or more clock-driven computing components configured to process input data according to instructions stored in the memory 1730. The memory 1730 may be a tangible, non-transitory computer-readable medium configured to store instructions executable by the one or more processors 1710. For instance, the memory 1730 may be data storage that can be loaded with one or more of the software components 1720 executable by the one or more processors 1710 to achieve certain functions. In one example, the functions may involve the processing device 1700 retrieving audio data from an audio source or another processing device. In another example, the functions may involve the processing device 1700 sending audio data to another device or a playback device on a network. In another example, the functions may include or involve the processing device 1700 sending audio data and/or stimulation data to another device (e.g., a playback device, stimulation device, etc.) on the network.

The audio processing components 1750 may include one or more digital-to-analog converters (DAC), an audio preprocessing component, an audio enhancement component or a digital signal processor (DSP), and so on. In one embodiment, one or more of the audio processing components 1750 may be a subcomponent of the one or more processors 1710. In one example, audio content may be processed and/or intentionally altered by the audio processing components 1750 to produce audio signals. The produced audio signals may be further processed and/or provided to an amplifier for playback.

The network interface 1770 may be configured to facilitate a data flow between the processing device 1700 and one or more other devices on a data network, including but not limited to data to/from other processing devices, playback devices, stimulation devices, storage devices, and the like. As such, the processing device 1700 may be configured to transmit and receive audio content over the data network from one or more other devices in communication with the processing device 1700, network devices within a local area network (LAN), or audio content sources over a wide area network (WAN) such as the Internet. The processing device 1700 may also be configured to transmit and receive sensor input over the data network from one or more other devices in communication with the processing device 1700, network devices within a LAN or over a WAN such as the Internet. The processing device 1700 may also be configured to transmit and receive audio processing information such as, for example, a sensor-modulation-characteristic table over the data network from one or more other devices in communication with the processing device 1700, network devices within a LAN or over a WAN such as the Internet.

As shown in FIG. 17, the network interface 1770 may include wireless interface(s) 1772 and wired interface(s) 1774. The wireless interface(s) 1772 may provide network interface functions for the processing device 1700 to wirelessly communicate with other devices in accordance with a communication protocol (e.g., any wireless standard including IEEE 802.11a/b/g/n/ac, 802.15, 4G and 5G mobile communication standards, and so on). The wired interface(s) 1774 may provide network interface functions for the processing device 1700 to communicate over a wired connection with other devices in accordance with a communication protocol (e.g., IEEE 802.3). While the network interface 1770 shown in FIG. 17 includes both wireless interface(s) 1772 and wired interface(s) 1774, the network interface 1770 may in some embodiments include only wireless interface(s) or only wired interface(s).

The processing device may include one or more sensor(s) 1740. The sensors 1740 may include, for example, inertial sensors (e.g., accelerometer, gyroscope, and magnetometer), a microphone, a camera, or a physiological sensor such as, for example, a sensor that measures heart rate, blood pressure, body temperature, EEG, MEG, Near infrared (fNIRS), or bodily fluid. In some example embodiments, the sensor may correspond to a measure of user activity on a device such as, for example, a smart phone, computer, tablet, or the like.

The user interface 1760 and display 1780 can be configured to facilitate user access and control of the processing device. Example user interface 1760 includes a keyboard, touchscreen on a display, navigation device (e.g., mouse), microphone, etc. In some embodiments, the user may provide instructions via the user interface 1760 to extend an audio track to a desired length.

In some embodiments, the processor 1710 may be configured to receive a mapping of sensor-input values and modulation-characteristic values, wherein each sensor-input value corresponds to a respective modulation-characteristic value. This aspect is similar to block 110 of the method 100. The processor 1710 may be configured to receive an audio input from an audio source (not shown), wherein the audio input comprises at least one audio element, each comprising at least one audio parameter. This aspect is similar to block 120 of the method 100. In some embodiments, the processor 1710 may be configured to receive a mapping of sensor-input values and stimulation parameters.

In some embodiments, the processor 1710 may be configured to identify an audio-parameter value of the audio parameter. This aspect is similar to block 130 of the method 100. The processor 1710 may be configured to receive a sensor input 1740 from a sensor (not shown). This aspect is similar to block 140 of the method 100.

In some embodiments, the processor 1710 may be configured to select from the mapping of sensor-input values and modulation-characteristic values, a modulation-characteristic value that corresponds to the sensor-input value. This aspect is similar to block 150 of the method 100. In some embodiments, the processor 1710 may be configured to select from the mapping of sensor input values and stimulation parameters, a modulation-characteristic value that corresponds to a sensor-input value.

In some embodiments, the processor 1710 may be configured to generate an audio output based on the audio-parameter value and the modulation-characteristic value. This aspect is similar to block 160 of the method 100. The processor 1710 may be configured to play the audio output. This aspect is similar to block 170 of the method 100. In some embodiments, the processor 1710 is configured to generate one or more of an audio output or other stimulus output based on the audio-parameter value and the modulation characteristic value, and the processor 1710 is also configured to initiate playback of audio input and/or application of non-audio stimulus output.

Figure 18:
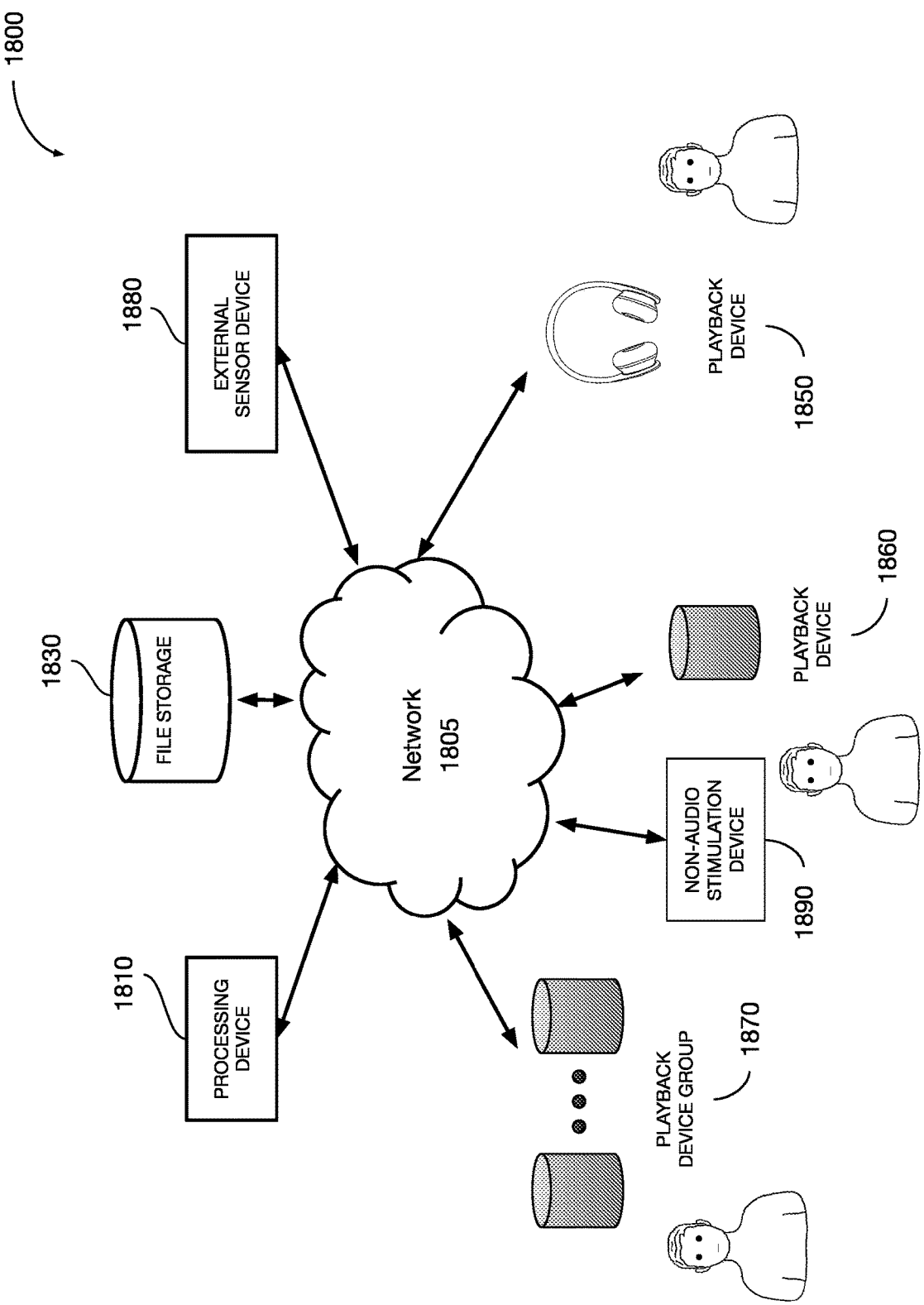
FIG. 18 depicts an example system with various components according to example embodiments of the present disclosure.

Aspects of the present disclosure may exist in part or wholly in, distributed across, or duplicated across one or more physical devices. FIG. 18 shows one such example system 1800 in which aspects and features of various embodiments of the present inventions may be practiced. The system 1800 illustrates several devices (e.g., computing device 1810, audio processing device 1820, file storage 1830, playback devices 1850, 1860, non-audio stimulation device 1890, and playback device group 1870) interconnected via a data network 1805. Although the devices are shown individually, the devices may be combined into fewer devices, separated into additional devices, and/or removed based upon an implementation. The data network 1805 may be a wired network, a wireless network, or a combination of both.

In some example embodiments, the system 1800 can include an audio processing device that can perform various functions, including but not limited to audio processing. In an example embodiment, the system 1800 can include a computing device 1810 that can perform various functions, including but not limited to, aiding the processing by the audio processing device 1820. In an example embodiment, the computing devices 1810 can be implemented on a machine such as the previously described device 1700.

In an example embodiment, the system 1800 can include a storage 1830 that is connected to various components of the system 1800 via a network 1805. The connection can also be wired (not shown). The storage 1830 can be configured to store data/information generated or utilized by the presently described techniques. For example, the storage 1830 can store the mapping of sensor-input values and modulation-characteristic values, as previously discussed with respect to the step 110 (FIG. 1). The storage 1830 can also store the audio output generated in the step 170 (FIG. 1). In further examples, the storage 1830 can store the set of one or more target audio tracks, as previously discussed with respect to the steps 430 (FIG. 4) and 640 (FIG. 6). The storage 1830 can also store the audio track in the step 430 (FIG. 4). For example, the storage 1830 may store an audio track prior to the execution of the method 800 (FIG. 8) and an extended audio track generated by the method 800 (FIG. 8).

In an example embodiment, the system 1800 can include one or more playback devices 1850, 1860 or a group of playback devices 1870 (e.g. playback devices, speakers, mobile devices, etc.). In some embodiments, these devices can be used to playback the audio output, as previously described in the step 180 (FIG. 1) and in the step 460 (FIG. 4). In some example embodiments, a playback device may include some or all of the functionality of the computing device 1810, the audio processing device 1820, and/or the file storage 1830. As described previously, a sensor can be based on the audio processing device 1820 or it can be an external sensor device 1880 and data from the sensor can be transferred to the audio processing device 1820.

F. CONCLUSIONS

Additional examples of the presently described method and device embodiments are suggested according to the structures and techniques described herein. Other non-limiting examples may be configured to operate separately or can be combined in any permutation or combination with any one or more of the other examples provided above or throughout the present disclosure.

It will be appreciated by those skilled in the art that the present disclosure may be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The terms "including" and "comprising" should be interpreted as meaning "including, but not limited to." If not already set forth explicitly in the claims, the term "a" should be interpreted as "at least one" and the terms "the, said, etc." should be interpreted as "the at least one, said at least one, etc."

The present disclosure is described with reference to block diagrams and operational illustrations of methods and devices. It is understood that each block of the block diagrams or operational illustrations, and combinations of blocks in the block diagrams or operational illustrations, may be implemented by means of analog or digital hardware and computer program instructions. These computer program instructions may be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks may occur out of the order noted in the operational illustrations. For example, two blocks shown in succession may be executed substantially concurrently or the blocks may sometimes be executed in the reverse order, depending upon the functionality/acts involved.

For the purposes of this disclosure a non-transitory computer readable medium (or computer-readable storage medium/media) stores computer data, which data may include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which may be used to tangibly store the desired information or data or instructions and which may be accessed by a computer or processor.

For the purposes of this disclosure the term "server" should be understood to refer to a service point which provides processing, database, and communication facilities. By way of example, and not limitation, the term "server" may refer to a single, physical processor with associated communications and data storage and database facilities, or it may refer to a networked or clustered complex of processors and associated network and storage devices, as well as operating software and one or more database systems and application software that support the services provided by the server. Cloud servers are examples.

For the purposes of this disclosure, a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or $2^{nd}$, $3^{rd}$, $4^{th}$, or $5^{th}$ generation (2G, 3G, 4G or 5G) cellular technology, Bluetooth, 802.11b/g/n, or the like. Network access technologies may enable wide area coverage for devices, such as client devices with varying degrees of mobility, for example. In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

It is the Applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. Tangible, non-transitory computer-readable media comprising program instructions, wherein the program instructions, when executed by one or more processors, cause a computing system to perform functions comprising:
   segmenting an individual audio track into a plurality of audio segments;
   determining similarities between individual audio segments of the plurality of audio segments;
   after receiving a request to generate an extended audio track, generating the extended audio track in an ongoing manner until determining to stop generating the extended audio track such that the extended audio track has a duration that is longer than a duration of the individual audio track from which the extended audio track was generated, wherein generating the extended audio track comprises joining together at least a first portion of the individual audio track that includes a first audio segment with a second portion of the individual audio track that includes a second audio segment, and wherein the joining together is based at least in part on one or more similarities between the first audio segment and the second audio segment;
   generating a modulated extended audio track by modulating one or more frequency components of the extended audio track; and
   while generating the modulated extended audio track by modulating one or more frequency components of the extended audio track, varying one or more modulation characteristics based at least in part on one or more sensor inputs, wherein the modulation characteristics comprise one or more of modulation rate, phase, depth, or waveform shape.

2. The tangible, non-transitory computer-readable media of claim 1, wherein generating the modulated extended audio track comprises modulating one or more frequency components of the extended audio track according to a first stimulation protocol.

3. The tangible, non-transitory computer-readable media of claim 1, wherein generating the modulated extended audio track is based at least in part on one or more sensor inputs and on a mapping of sensor-input values and modulation-characteristic values, wherein individual sensor-input values correspond to respective modulation-characteristic values.

4. The tangible, non-transitory computer-readable media of claim 1, wherein varying one or more modulation characteristics based at least in part on the one or more sensor inputs is based on a mapping of sensor-input values and modulation-characteristic values, wherein individual sensor-input values correspond to respective modulation-characteristic values.

5. The tangible, non-transitory computer-readable media of claim 1, wherein the functions further comprise:
   while generating the modulated extended audio track, switch from generating the modulated extended audio track according to a first stimulation protocol to generating the modulated extended audio track according to a second stimulation protocol after receiving one or more inputs, wherein the one or more inputs comprise at least one of (i) a user input or (ii) a sensor input.

6. The tangible, non-transitory computer-readable media of claim 1, wherein the first portion of audio and the second portion of audio comprise overlapping portions of the individual audio track.

7. The tangible, non-transitory computer-readable media of claim 1, wherein the individual audio track is a first audio track in a group of two or more audio tracks comprising the first audio track and a second audio track, and wherein generating the extended audio track further comprises:
   joining together a portion of the first audio track with a portion of the second audio track based at least in part on one or more similarities between an audio segment of the first audio track and an audio segment of the second audio track.

8. The tangible, non-transitory computer-readable media of claim 1, wherein the functions further comprise:
   causing playback of the modulated extended audio track via one or more speakers.

9. The tangible, non-transitory computer-readable media of claim 1, wherein determining to stop generating the extended audio track comprises one of (i) determining that the computing system has been generating the extended audio track for a pre-configured duration of time or (ii) determining that the computing system has received a command to stop generating the extended audio track.

10. The tangible, non-transitory computer-readable media of claim 1, wherein determining similarities between individual audio segments of the plurality of audio segments comprises:
   for individual audio segments, cross-correlating a feature vector corresponding to the individual audio segment with feature vectors corresponding to other audio segments in the plurality of audio segments;
   generating a self-similarity matrix based on the cross-correlations that represents similarities between the individual audio segments; and
   selecting a first audio segment from the plurality of audio segments to join together with a second audio segment of the plurality of audio segments based on one or more similarities between one or more aspects of the first audio segment and one or more aspects of the second audio segment represented in the self-similarity matrix.

11. The tangible, non-transitory computer-readable media of claim 1, wherein the functions further comprise:
detecting one or more sensor inputs from one or more sensors, wherein the one or more sensors comprise at least one of an inertial sensor, a microphone, a camera, or a physiological sensor.

12. The tangible, non-transitory computer-readable media of claim 1, wherein the computing system comprises one or more of a smartphone or a computer server in communication with a smartphone.

13. A method performed by a computing system, the method comprising:
segmenting an individual audio track into a plurality of audio segments;
determining similarities between individual audio segments of the plurality of audio segments;
after receiving a request to generate an extended audio track, generating the extended audio track in an ongoing manner until determining to stop generating the extended audio track such that the extended audio track has a duration that is longer than a duration of the individual audio track from which the extended audio track was generated, wherein generating the extended audio track comprises joining together at least a first portion of the individual audio track that includes a first audio segment with a second portion of the individual audio track that includes a second audio segment, and wherein the joining together is based at least in part on one or more similarities between the first audio segment and the second audio segment;
generating a modulated extended audio track by modulating one or more frequency components of the extended audio track; and
while generating the modulated extended audio track by modulating one or more frequency components of the extended audio track, varying one or more modulation characteristics based at least in part on one or more sensor inputs, wherein the modulation characteristics comprise one or more of modulation rate, phase, depth, or waveform shape.

14. The method of claim 13, wherein generating the modulated extended audio track comprises modulating one or more frequency components of the extended audio track according to a first stimulation protocol.

15. The method of claim 13, wherein:
generating the modulated extended audio track is based at least in part on one or more sensor inputs and on a mapping of sensor-input values and modulation-characteristic values, wherein individual sensor-input values correspond to respective modulation-characteristic values; and
varying one or more modulation characteristics based at least in part on the one or more sensor inputs is based on a mapping of sensor-input values and modulation-characteristic values, wherein individual sensor-input values correspond to respective modulation-characteristic values.

16. The method of claim 13, further comprising:
while generating the modulated extended audio track, switch from generating the modulated extended audio track according to a first stimulation protocol to generating the modulated extended audio track according to a second stimulation protocol after receiving one or more inputs, wherein the one or more inputs comprise at least one of (i) a user input or (ii) a sensor input.

17. The method of claim 13, wherein the first portion of audio and the second portion of audio comprise overlapping portions of the individual audio track.

18. The method of claim 13, wherein the individual audio track is a first audio track in a group of two or more audio tracks comprising the first audio track and a second audio track, and wherein generating the extended audio track further comprises:
joining together a portion of the first audio track with a portion of the second audio track based at least in part on one or more similarities between an audio segment of the first audio track and an audio segment of the second audio track.

19. The method of claim 13, wherein determining to stop generating the extended audio track comprises one of (i) determining that the computing system has been generating the extended audio track for a pre-configured duration of time or (ii) determining that the computing system has received a command to stop generating the extended audio track.

20. The method of claim 13, wherein determining similarities between individual audio segments of the plurality of audio segments comprises:
for individual audio segments, cross-correlating a feature vector corresponding to the individual audio segment with feature vectors corresponding to other audio segments in the plurality of audio segments;
generating a self-similarity matrix based on the cross-correlations that represents similarities between the individual audio segments; and
selecting a first audio segment from the plurality of audio segments to join together with a second audio segment of the plurality of audio segments based on one or more similarities between one or more aspects of the first audio segment and one or more aspects of the second audio segment represented in the self-similarity matrix.

* * * * *